US010267039B2

(12) United States Patent
Bergman et al.

(10) Patent No.: US 10,267,039 B2
(45) Date of Patent: *Apr. 23, 2019

(54) CEILING SYSTEMS

(71) Applicant: ARMSTRONG WORLD INDUSTRIES, INC., Lancaster, PA (US)

(72) Inventors: Todd M. Bergman, Lititz, PA (US); Francis Testa, Philadelphia, PA (US); James R. Waters, Lancaster, PA (US); Christopher D. Gaydos, Lititz, PA (US); Brian L. Springer, Lancaster, PA (US); Lori Jo L. Shearer, Millersville, PA (US); Scott L. Huntzinger, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,779

(22) Filed: Jan. 23, 2018

(65) Prior Publication Data

US 2018/0148928 A1    May 31, 2018

Related U.S. Application Data

(63) Continuation-in-part of application No. 15/169,103, filed on May 31, 2016, now Pat. No. 9,874,013,
(Continued)

(51) Int. Cl.
*E04B 9/04* (2006.01)
*E04B 9/06* (2006.01)
(Continued)

(52) U.S. Cl.
CPC ............... *E04B 9/10* (2013.01); *E04B 9/04* (2013.01); *E04B 9/0435* (2013.01);
(Continued)

(58) Field of Classification Search
CPC .......... E04B 9/0435; E04B 9/28; E04B 9/245; E04B 9/001; E04B 9/10; E04B 9/067;
(Continued)

(56) References Cited

U.S. PATENT DOCUMENTS 419,388 A    1/1890 White et al.
2,045,311 A    6/1936 Roos
(Continued)

FOREIGN PATENT DOCUMENTS

CA    1229462    11/1987
CA    2127983    12/1997
(Continued)

OTHER PUBLICATIONS

International Search Report for corresponding PCT/US2013/58015, dated Dec. 11, 2013. WO.
(Continued)

*Primary Examiner* — Rodney Mintz
(74) *Attorney, Agent, or Firm* — Craig M. Sterner

(57) ABSTRACT

A ceiling system in one embodiment includes an overhead support grid comprised of a plurality of intersecting grid support members and a ceiling tile mountable to the grid. Retaining clips support the ceiling tile from the grid which may be concealed from view. The retaining clips each include a cavity that receives a grid support member and a pair of resilient mounting elements configured to lockingly engage a support member. The mounting elements are laterally movable in response to inserting the support member into the cavity of the retaining clip. In one embodiment, the movable elements include locking tabs which create a snap-fit interlock with the grid support member for securing the ceiling tile to the grid.

17 Claims, 41 Drawing Sheets

Related U.S. Application Data which is a continuation of application No. 14/423,817, filed as application No. PCT/US2013/058015 on Sep. 4, 2013, now Pat. No. 9,353,522, application No. 15/877,779, filed on Jan. 23, 2018, which is a continuation-in-part of application No. 15/420,440, filed on Jan. 31, 2017, now Pat. No. 9,909,311, which is a continuation of application No. 15/163,042, filed on May 24, 2016, now Pat. No. 9,556,613, application No. 15/877,779, filed on Jan. 23, 2018, which is a continuation-in-part of application No. 14/661,413, filed on Mar. 18, 2015, now Pat. No. 9,938,717.

(60) Provisional application No. 61/696,424, filed on Sep. 4, 2012.

(51) Int. Cl.
| | | |
|---|---|---|
| *E04B 9/10* | (2006.01) | |
| *E04B 9/22* | (2006.01) | |
| *E04B 9/24* | (2006.01) | |
| *E04B 9/26* | (2006.01) | |
| *E04B 9/36* | (2006.01) | |
| *F16B 2/24* | (2006.01) | |
| *F16B 5/12* | (2006.01) | |

(52) U.S. Cl.
CPC ............ *E04B 9/0464* (2013.01); *E04B 9/067* (2013.01); *E04B 9/225* (2013.01); *E04B 9/241* (2013.01); *E04B 9/26* (2013.01); *F16B 2/243* (2013.01); *F16B 5/125* (2013.01); *E04B 9/064* (2013.01); *E04B 9/36* (2013.01)

(58) Field of Classification Search
CPC .. E04B 1/948; B32B 7/12; B32B 3/02; B32B 2419/00; B32B 2307/10; E04C 2/38; E04F 13/0896
See application file for complete search history.

(56) References Cited

U.S. PATENT DOCUMENTS

| | | | |
|---|---|---|---|
| 2,066,255 A | 12/1936 | Dempsey | |
| 2,126,956 A | 8/1938 | Gilbert | |
| 2,335,303 A | 11/1943 | Olsen | |
| 2,859,469 A | 11/1958 | Stockdale | |
| 2,898,640 A | 8/1959 | Dail | |
| 3,032,833 A | 5/1962 | Stanley | |
| 3,149,693 A | 9/1964 | Keller et al. | |
| 3,380,206 A | 4/1968 | Barnett | |
| 3,456,411 A | 7/1969 | Cacossa | |
| 3,513,613 A | 5/1970 | Jones et al. | |
| 3,708,935 A | 1/1973 | Kossuth | |
| 3,748,804 A | 7/1973 | De George | |
| 3,869,760 A | 3/1975 | Meyer | |
| 3,919,443 A | 11/1975 | Porter | |
| 3,969,865 A | 7/1976 | Andersen | |
| 4,026,081 A | 5/1977 | Delaney et al. | |
| 4,040,213 A | 8/1977 | Capaul | |
| 4,117,642 A | 10/1978 | Eckert | |
| 4,155,206 A | 5/1979 | Player | |
| 4,241,555 A | 12/1980 | Dickins et al. | |
| 4,284,447 A | 8/1981 | Dickins et al. | |
| 4,546,587 A | 10/1985 | Mosch | |
| 4,586,308 A | 5/1986 | Jennings | |
| 4,640,064 A | 2/1987 | Goodworth, II | |
| 4,830,140 A | 5/1989 | Fridh et al. | |
| 4,926,606 A | 5/1990 | Hanson | |
| 4,991,370 A | 2/1991 | Gailey et al. | |
| 5,001,879 A | 3/1991 | Paliwoda | |
| 5,079,042 A | 1/1992 | Frings | |
| 5,085,022 A | 2/1992 | Paliwoda | |
| 5,174,849 A * | 12/1992 | Capaul ................ B32B 13/02 156/253 |
| 5,182,893 A | 2/1993 | Goodworth | |
| 5,202,174 A * | 4/1993 | Capaul ................ B32B 13/02 156/291 |
| 5,236,757 A | 8/1993 | Probst et al. | |
| 5,313,759 A | 5/1994 | Chase, III | |
| 5,349,796 A | 9/1994 | Meyerson | |
| 5,401,133 A | 3/1995 | Kuchler | |
| 5,486,394 A | 1/1996 | Stough | |
| 5,507,125 A | 4/1996 | McClure | |
| 5,609,007 A | 3/1997 | Eichner | |
| 5,628,159 A | 5/1997 | Younts | |
| 6,079,177 A | 6/2000 | Halchuck | |
| 6,145,264 A | 11/2000 | Dallaire | |
| 6,305,137 B1 | 10/2001 | Rebman | |
| 6,467,228 B1 | 10/2002 | Wendt et al. | |
| 6,610,160 B2 | 8/2003 | Harrison | |
| 6,964,137 B2 | 11/2005 | Frascari | |
| 7,010,894 B1 | 3/2006 | Cappelle | |
| 7,037,572 B2 | 5/2006 | Gleeson | |
| 7,536,836 B2 | 5/2009 | Moser | |
| 7,765,762 B2 | 8/2010 | Gulbrandsen et al. | |
| 7,779,964 B2 | 8/2010 | Birch | |
| 7,836,652 B2 | 11/2010 | Futterman | |
| 7,937,903 B2 | 5/2011 | McGee et al. | |
| 8,176,701 B2 | 5/2012 | Cullen | |
| 8,359,802 B1 | 1/2013 | Burnett et al. | |
| 8,544,229 B2 | 10/2013 | Kilgore et al. | |
| 8,635,828 B2 | 1/2014 | Bahnmiller | |
| 8,684,134 B2 | 4/2014 | Dugan et al. | |
| 8,770,345 B2 | 7/2014 | Dugan et al. | |
| 8,925,677 B2 | 1/2015 | Dugan et al. | |
| 9,279,253 B1 | 3/2016 | Gaydos | |
| 9,290,931 B2 | 3/2016 | Grace | |
| 9,347,220 B1 | 5/2016 | Gaydos et al. | |
| 9,556,613 B1 | 1/2017 | Gaydos | |
| 9,739,057 B2 | 8/2017 | Bergman | |
| 9,874,013 B2 * | 1/2018 | Bergman ............. E04B 9/0435 |
| 9,909,311 B2 * | 3/2018 | Gaydos ............... E04B 9/0435 |
| 9,938,717 B2 * | 4/2018 | Gaydos ................. E04B 9/28 |
| 2002/0014051 A1 | 2/2002 | Fraval et al. | |
| 2002/0096243 A1 | 7/2002 | Harrison | |
| 2003/0145547 A1 | 8/2003 | Kliegle et al. | |
| 2003/0154686 A1 | 8/2003 | Platt | |
| 2004/0055239 A1 | 3/2004 | Hang | |
| 2005/0193668 A1 | 9/2005 | Hamilton | |
| 2005/0217194 A1 | 10/2005 | Krantz-Lilienthal et al. | |
| 2006/0096213 A1 | 5/2006 | Griffin et al. | |
| 2007/0033902 A1 | 2/2007 | Waters et al. | |
| 2007/0044407 A1 | 3/2007 | Elliott | |
| 2007/0125042 A1 | 6/2007 | Hughes et al. | |
| 2007/0193131 A1 | 8/2007 | Ortiz | |
| 2008/0155927 A1 | 7/2008 | Wendt et al. | |
| 2009/0000248 A1 | 1/2009 | Waters et al. | |
| 2009/0004459 A1 | 1/2009 | Kipp et al. | |
| 2009/0151134 A1 | 6/2009 | Neuhofer, Jr. | |
| 2009/0173030 A1 | 7/2009 | Gulbrandsen et al. | |
| 2009/0239059 A1 | 9/2009 | Kipp et al. | |
| 2009/0239429 A1 | 9/2009 | Kipp et al. | |
| 2010/0139189 A1 | 6/2010 | Lalonde | |
| 2010/0176616 A1 | 7/2010 | Boss | |
| 2010/0257808 A1 | 10/2010 | Baxter et al. | |
| 2011/0076470 A1 | 3/2011 | Zaveri Mitul | |
| 2011/0078970 A1 | 4/2011 | Boyd | |
| 2011/0179740 A1 | 7/2011 | Padmanabhan | |
| 2012/0137615 A1 | 6/2012 | Wendt | |
| 2013/0067833 A1 | 3/2013 | Agueera Riquelme | |
| 2014/0000979 A1 | 1/2014 | Dugan et al. | |
| 2014/0202788 A1 | 7/2014 | Hansen | |
| 2015/0040506 A1 | 2/2015 | Baxter et al. | |
| 2015/0330074 A1 | 11/2015 | Bergman | |
| 2016/0002916 A1 | 1/2016 | Grace | |
| 2016/0138265 A1 | 5/2016 | Gaydos | |
| 2016/0273217 A1 | 9/2016 | Huntzinger | |
| 2016/0273218 A1 * | 9/2016 | Gaydos ..................... E04B 9/28 |
| 2017/0067252 A1 | 3/2017 | Duschl | |
| 2017/0342710 A1 * | 11/2017 | Gaydos ................. E04B 9/0435 |

(56) References Cited

U.S. PATENT DOCUMENTS

FOREIGN PATENT DOCUMENTS

| | | |
|---|---|---|
| CN | 1207151 | 6/2005 |
| CN | 102251618 | 11/2011 |
| DE | 3502635 | 7/1986 |
| EP | 0979908 | 2/2000 |
| EP | 1489241 | 12/2004 |
| FR | 2214800 | 8/1974 |
| FR | 2516129 A1 | 5/1983 |
| GB | 703753 A | 2/1954 |
| GB | 2152091 | 7/1985 |
| NL | 1034759 | 5/2009 |
| WO | WO 2005/59267 | 6/2005 |
| WO | WO 2009099664 | 8/2009 |
| WO | WO 2010098889 | 9/2010 |
| WO | WO 2014/143660 | 9/2014 |

OTHER PUBLICATIONS

CN Search Report for corresponding CN Application No. 2013800460314, dated Jan. 20, 2016. CN.
International Search Report for Corresponding Application PCT/US2016/22804, dated Jun. 15, 2016, WO.

\* cited by examiner

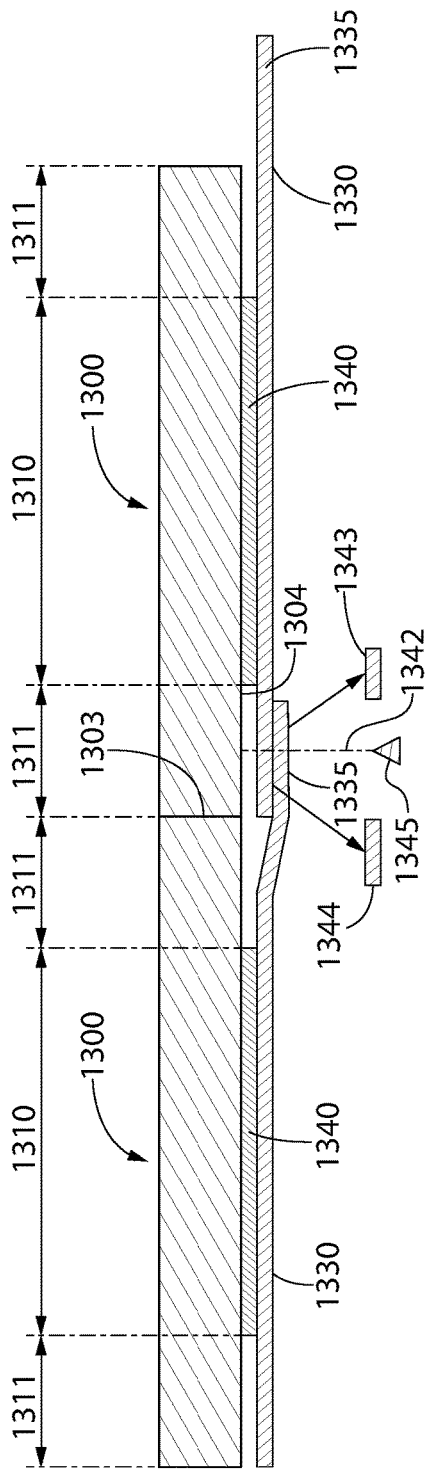
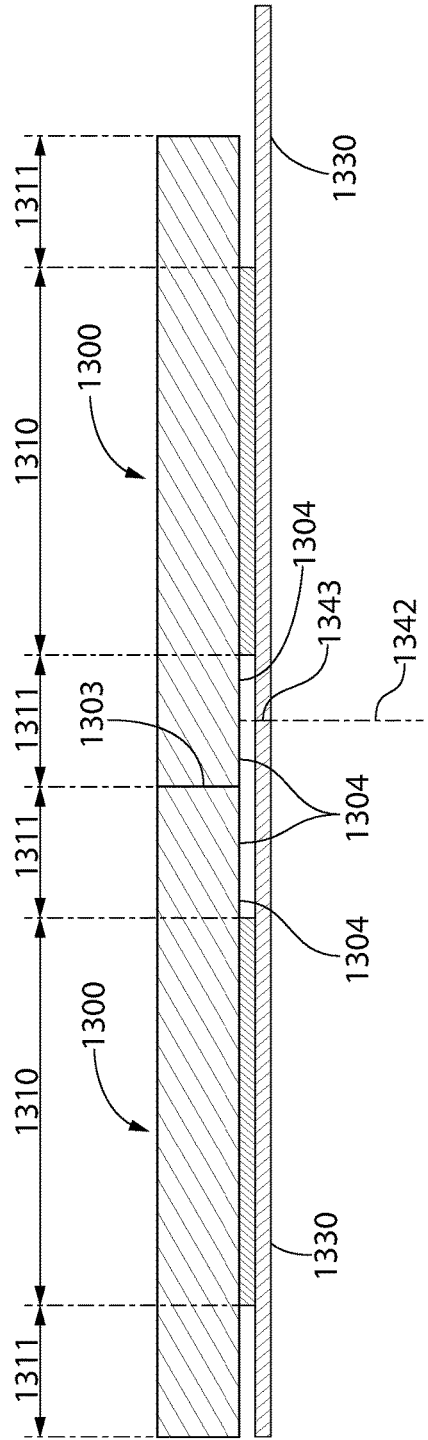

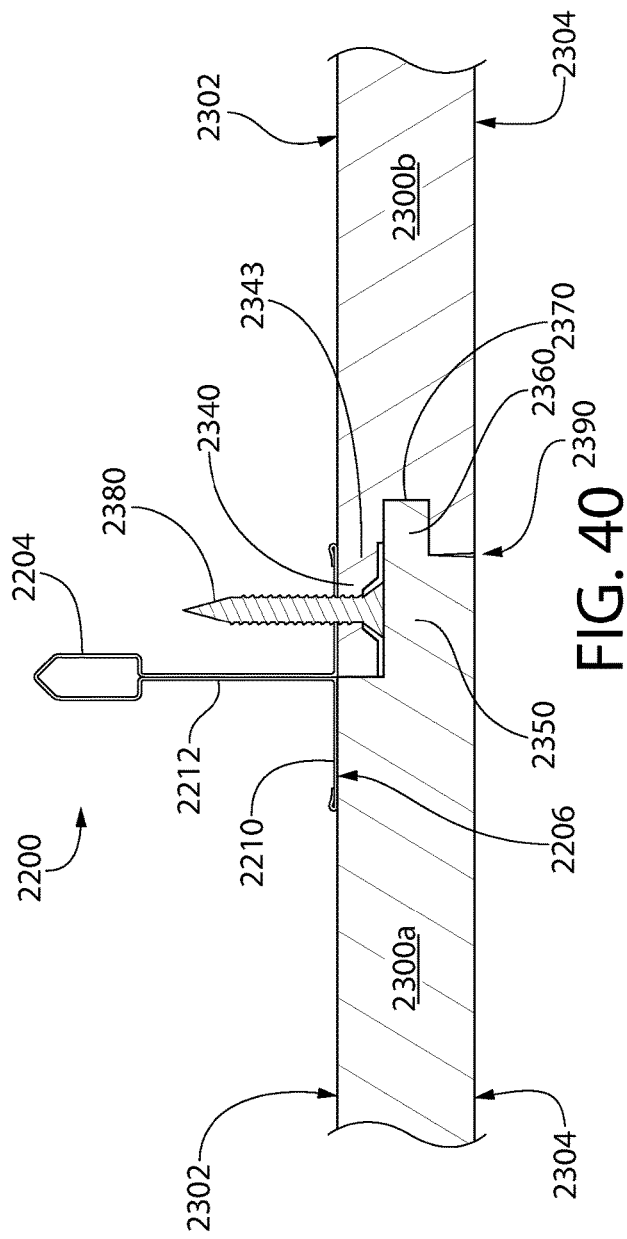
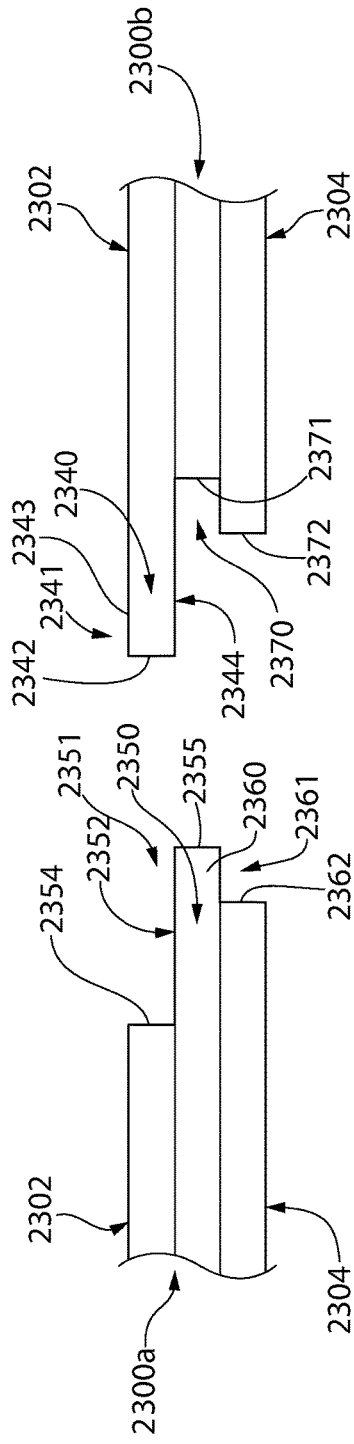
FIG. 40
FIG. 41

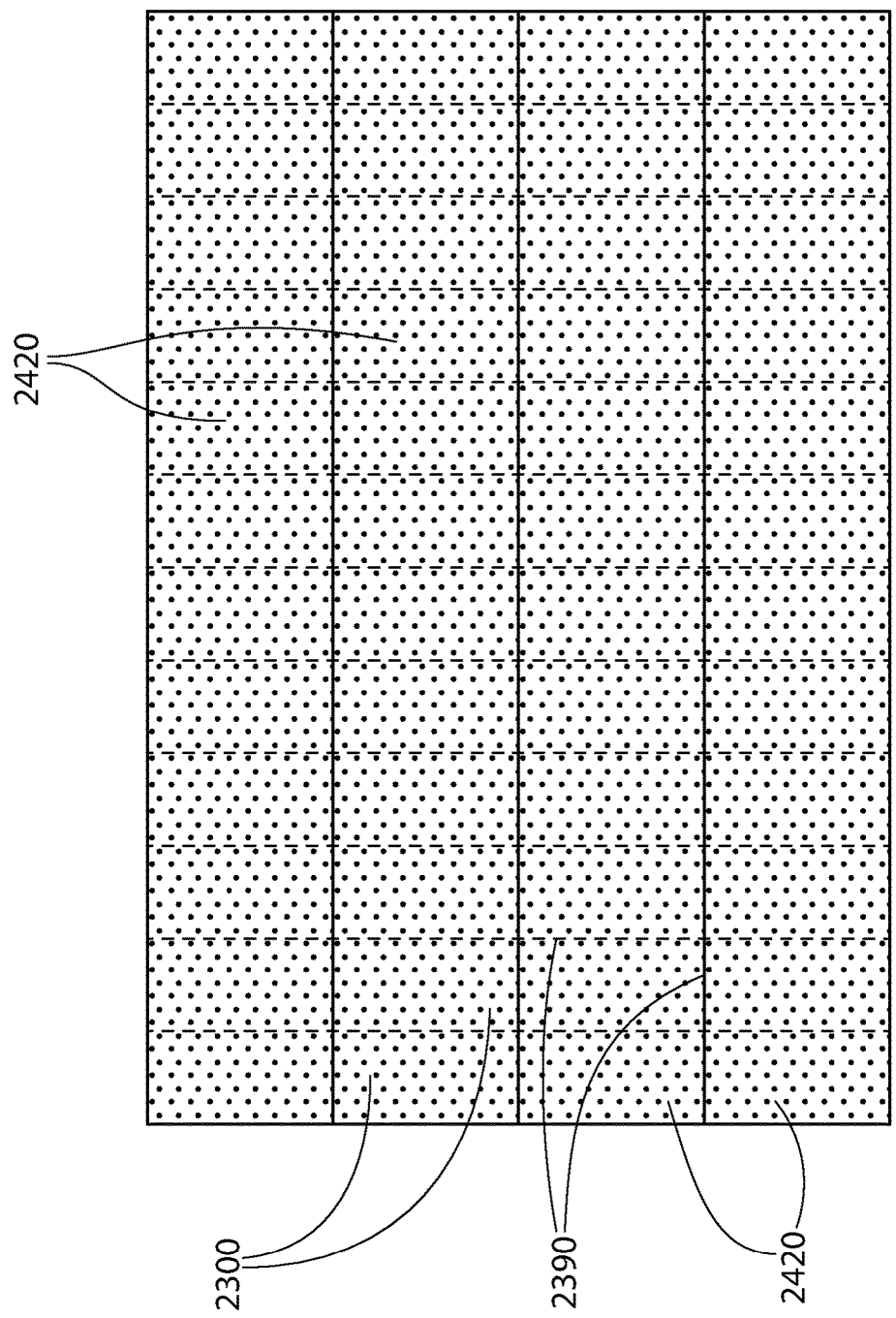

CEILING SYSTEMS

CROSS-REFERENCE TO RELATED APPLICATIONS

The present application is a continuation-in-part of U.S. patent application Ser. No. 15/169,103 filed May 31, 2016, which is a continuation of U.S. patent application Ser. No. 14/423,817 filed Feb. 25, 2015 and issued as U.S. Pat. No. 9,353,522, which is a U.S. national stage application under 35 U.S.C. § 371 of PCT/US2013/058015 filed Sep. 4, 2013, which claims the benefit of U.S. Provisional Patent Application No. 61/696,424 filed Sep. 4, 2012.

The present application is also a continuation-in-part of U.S. patent application Ser. No. 15/420,440 filed Jan. 31, 2017, which is a continuation of U.S. patent application Ser. No. 15/163,042, filed May 24, 2016 and issued as U.S. Pat. No. 9,556,613.

The present application is also a continuation-in-part of U.S. patent application Ser. No. 14/661,413, filed Mar. 18, 2015.

The foregoing listed applications are incorporated herein by reference in their entireties.

FIELD OF THE INVENTION

The present invention relates to ceiling systems, and more particularly to ceiling systems having a concealed support grid enabled by a retaining clip system.

BACKGROUND OF THE INVENTION

One type of ceiling system includes ceiling panels or tiles that are installed in a support grid which may be suspended from or directly installed to a suitable overhead building support structure. Such ceiling systems may be designed to partially or completely conceal the support grid from view.

An improved ceiling system with concealed support grid is desired.

As additional background, numerous types of suspended ceiling systems and methods for mounting ceiling panels have been used. One type of system includes a suspended support grid including an array of intersecting grid support members configured to hang a plurality of individual ceiling panels therefrom. It is desirable in some cases to conceal the support grid for providing the appearance of a monolithic ceiling. It is further desirable to apply a facing scrim or sheet to the bottom surface of the ceiling panels for concealing the joints between the ceiling panels.

As additional background, a number of different materials have been used for creating seamless ceilings having a monolithic appearance. One such material is drywall. Drywall or wall board panels are surface mounted to a support surface or grid formed of wood or metal which are affixed to an overhead building structure to support the panels. Panels are affixed to the grid using fasteners. Highly visible joints formed between adjoining panels typically have relatively wide gaps which must be taped and spackled with drywall joint compound to cover the joints and fastener heads. This process is time consuming and expensive generally involving several iterations of spackling and sanding to achieve a smooth finish to conceal the joints. Furthermore, drying time must be allowed between coats of joint compound before sanding. The ceiling installation may take as long as five days in some cases and requires completion by skilled craftsman which increases installation costs. The finished joints and drywall are only now ready for applying a finish coat or paint.

The foregoing drywall ceiling installation also requires attachment of the ceiling panels to a rigid support surface or grid. Such monolithic ceiling systems may not always be suitable for attachment to suspended grid support systems, thereby limiting the number of applications in which drywall may be used. Moreover, drywall cannot deliver comparable acoustical performance to other ceiling materials such as acoustical ceiling tiles or panels which many times is desired in occupied spaces.

An improved monolithic ceiling system is therefore desired.

SUMMARY OF THE INVENTION

The present invention provides a ceiling system in which individual ceiling elements may be mounted to overhead support members in a secure and stable manner. In one embodiment, without limitation, a specially configured retaining clip is provided that is mountable in a track-like mounting system formed in the ceiling tile comprised of a plurality of elongated channels. The retaining clips and channels permit the ceiling tiles to be installed in a manner that conceals the support grid from view. Advantageously, the shape of ceiling tiles that may be used is not restricted by the arrangement and pattern of the grid support members, as further described herein, According to an exemplary embodiment, a ceiling system includes a longitudinally-extending grid support member mountable from an overhead structure, a ceiling tile including a mounting channel extending at least partially between first and second opposing peripheral sides of the ceiling tile, and a retaining clip slideably disposed in the mounting channel of the ceiling tile. The retaining clip includes a pair of opposing and resiliently deformable mounting elements. The mounting elements are spaced apart to define a cavity configured to receive the grid support member at least partially therein. The mounting elements are laterally spreadable in response to inserting the grid support member into the cavity of the retaining clip, wherein the retaining clip is configured to lockingly engage the grid support member when in a locked position fully inserted into the cavity of the retaining clip for securing the ceiling tile to the grid support member. The grid support member is concealed from view beneath the ceiling tile.

According to another exemplary embodiment, a retaining clip attachable to a grid support member of a ceiling system is provided for supporting a ceiling tile. The retaining clip includes a mounting flange configured for attachment to the ceiling tile, and a pair of opposing resiliently deformable upright mounting wings configured for attachment to the grid support member. The mounting wings extend upwards from the mounting flange and are spaced apart to define an upwardly open cavity configured to receive the grid support member at least partially therein. The mounting wings are laterally deformable between undeflected and deflected positions in response to inserting the grid support member into the cavity of the retaining clip. The mounting wings include locking tabs which lockingly engage the grid support member when in a mounted position inside the cavity of the retaining clip.

A method for mounting a ceiling tile to a grid support member of a ceiling system is provided. The method includes: providing a grid support member mountable from an overhead support structure; providing a ceiling tile including a horizontally elongated mounting channel, the channel being open through a top surface of the ceiling tile; slideably inserting a retaining clip into the mounting channel through a peripheral side of the ceiling tile; sliding the retaining clip to a desired mounting position; vertically aligning an open cavity of a retaining clip with the grid support member; inserting the grid support member into the cavity of the retaining clip; laterally displacing a pair resiliently deformable locking tabs positioned in the cavity with the grid support member; and lockingly engaging the locking tabs with the grid support member for securing the ceiling tile to the grid support member.

A ceiling system is provided which conceals the ceiling support grid and ceiling panel joints. The joints may be concealed with overlapping field cut facings or scrims forming seams between adjoining facings which are laterally offset from the joint. A double-cut seam may be made in the field creating tight seams between the facings with no appreciable gaps.

To achieve the foregoing seam arrangement, in one embodiment the ceiling panels in their factory-supplied, pre-installed condition may be shipped to the field installation site with a pre-attached facing sheet which is adhesively bonded to only a central region on the bottom surface of the ceiling panel body (i.e. surface which will be visible and facing towards the room below the ceiling system). The perimeter portions of the facing sheet on all sides are not bonded to the annular peripheral region on the bottom surface of the panel body surrounding the central region. In one implementation, the facing sheet extends beyond at least one first peripheral edge of the ceiling panel forming a cantilevered flap. The facing sheet does not extend beyond the opposite peripheral edge of the panel in one embodiment. Each ceiling panel may have this facing arrangement.

During field installation, the facing sheet flap of the first ceiling panel overlays a peripheral edge and perimeter portion of an adjoining second ceiling panel. This creates a double thickness of unbounded facing sheets which may then be severed along a cut line to form a seam between the mating facing sheets of each panel. Following the seam formation, the unsecured perimeter portions of the two adjoining facing sheets adjacent to the ceiling panel joint may then be adhesively bonded to the peripheral portions of the ceiling panels with a field applied and/or activated adhesive to complete the installation. In some embodiments, an inactivated adhesive may be pre-applied in the factory to the annular peripheral region of the bottom surface of each ceiling panel. The adhesive may be activated in the field via a heat gun, ultraviolet radiation, application of pressure, or other means depending on the type of adhesive used. Advantageously, the present ceiling system does not require complete installation of the facing sheets in the field which are prone to misalignment problems. The factory partially pre-installed facing sheets ensure proper orientation and layout of the facings with respect to each panel while the unsecured perimeter portions allow field cutting and adjustment of seams between facing sheets.

In one embodiment, a ceiling system includes: a longitudinally extending grid support member including a bottom surface; a first and second ceiling panel mounted below the grid support member, each ceiling panel including an acoustic panel body having a top surface, opposing bottom surface defining a horizontal plane, plurality of peripheral edges extending therebetween defining a perimeter, a central region of the bottom surface spaced inwards from the peripheral edges, and an annular peripheral region of the bottom surface surrounding the central region and lying between the central region and the peripheral edges; a longitudinally-extending joint formed between adjoining first peripheral edges of each of the first and second ceiling panels; a first facing sheet adhered to the central region of the first ceiling panel with a factory-applied adhesive layer, and an annular perimeter portion of the first facing sheet being un-adhered to the peripheral region of the first ceiling panel adjacent to the joint; wherein the perimeter portion of the first facing sheet adjacent to the joint extends laterally outwards beyond the first peripheral edge of the first ceiling panel forming a first cantilevered flap, and the perimeter portion of the first facing sheet opposite the joint does not extend beyond a second peripheral edge of the first ceiling panel opposite the first peripheral edge; a second facing sheet adhered to the central region of the second ceiling panel with a factory-applied adhesive layer, and an annular perimeter portion of the second facing sheet being un-adhered to the peripheral region of the second ceiling panel adjacent to the joint; wherein the perimeter portion of the second facing sheet adjacent to the joint does not extend beyond the first peripheral edge of the second ceiling panel, and the perimeter portion of the second facing sheet opposite the joint extends laterally outwards beyond a second peripheral edge of the second ceiling panel opposite the first peripheral edge forming a second cantilevered flap; wherein the first cantilevered flap of the first facing sheet extends across the joint to the second panel such that the cantilevered flap is positioned on the peripheral region of the second ceiling panel.

In one embodiment, a factory-fabricated ceiling panel in a condition before installation includes: a rectilinear acoustical panel body comprising a top surface and a bottom surface; a first panel edge and an opposing second panel extending between the top and bottom surfaces; a third panel edge and an opposing fourth panel extending between the top and bottom surfaces, the first panel edge and the second panel edge each being perpendicular and adjacent to the third and fourth panel edges; a perimeter defined by the first, second, third, and fourth panel edges; the bottom surface of the panel body comprising a central region spaced inwards from the peripheral edges and an annular peripheral region surrounding the central region, the annular peripheral region extending between the central region and the first, second, third, and fourth peripheral edges; a rectilinear facing sheet adhered to the central region of the bottom surface with a factory-applied adhesive layer, wherein an annular perimeter portion of the facing sheet is not adhered to the bottom surface of the acoustical panel body along the annular peripheral region of the bottom surface of the panel body; wherein the facing sheet along the first panel edge extends outwards beyond the first panel edges forming a cantilevered facing flap; and wherein the facing sheet along the second panel edge does not extend outwards beyond the second panel edge.

A method for installing a ceiling system is disclosed. The method includes: providing first and second ceiling panels to a jobsite, each panel in a factory supplied condition including an acoustic panel body having a top surface, opposing bottom surface, plurality of peripheral edges extending therebetween defining a perimeter, and a facing sheet adhered to a central region of bottom surface with a factory-applied adhesive, the facing sheet being un-adhered to an annular peripheral region of the bottom surface surrounding the central region, wherein the facing sheet includes a cantilevered flap extending beyond a first peripheral edge of the panel body, and the facing sheet includes an un-adhered perimeter portion in the peripheral region which does not extend beyond a second peripheral edge of the panel body opposite the first peripheral edge; positioning the first and second ceiling panels beneath a longitudinally-extending grid support member; abutting the first peripheral edge of the first ceiling panel with the flap of facing sheet against the second peripheral edge of the second ceiling panel without the flap of facing sheet, thereby forming a joint; locating the flap of the first ceiling panel over the peripheral region of the second ceiling panel; overlapping the flap of the first ceiling panel with the un-adhered perimeter portion of the facing sheet of the second ceiling panel in the peripheral region of the second ceiling panel, thereby forming a double thickness of facing sheets; cutting through the double thickness of facing sheets along a line to create an abutment seam, wherein an end segment the flap and an end segment of the un-adhered perimeter portion of the facing sheet of the second ceiling panel in the peripheral region are severed; removing the end segments of the flap and facing sheet, thereby leaving remaining portions of the flap and the un-adhered perimeter portion of the facing sheet of the second ceiling panel in the peripheral region; and adhering the remaining portions of the flap and the un-adhered perimeter portion of the facing sheet of the second ceiling panel to the peripheral region of the second ceiling panel; wherein the joint between the first and second ceiling panels is concealed by the facing sheet of the first ceiling panel.

A faced ceiling system is provided which conceals the ceiling support surface or grid with ceiling panels having specially configured peripheral edges that overlay the bottom surface or face of the grid support members. The ceiling panels in certain embodiments may include edge portions configured to mount to and conceal the exposed ceiling support surface or grid faces. In certain non-limiting embodiments, the ceiling panels may be acoustical tiles or panels.

In one embodiment, the ceiling system includes ceiling panels having a composite peripheral hybrid edge detail including a combination of a tongue-and-groove and shiplap configurations. The hybrid edges of adjoining panels are configured to both interlock via the tongue-and-groove portion of the edge detail and hide the ceiling panel support surfaces or grid faces via the shiplap portion of the edge detail.

The ceiling panels may be perimeter mounted to the support surface or grid. In one implementation, lateral extensions of the ceiling panel define an upper shiplap edge profile and mounting flanges for direct surface mounting of the ceiling panel to and hiding the ceiling support surface or grid. When the panels are assembled together in the ceiling system, a lower shiplap edge profile formed on the peripheral edge of adjoining panels in turn conceals the mounting flanges, thereby hiding any exposed fastening elements that may be used to mount the ceiling panel to the support surface or grid. Advantageously, less than the total number of peripheral edges of the ceiling panel need to be affixed to the support surface or grid in some embodiments for properly supporting the ceiling panel; the remaining edges being supported by the tongue-and-groove interlock formed with adjoining panels. This saves both installation time and fastener costs.

In one embodiment, a ceiling system includes a ceiling support structure having a downward facing support surface, and a plurality of ceiling panels attached to the ceiling support structure. The ceiling panels each have a top surface facing the ceiling support structure, an opposing bottom surface, and a plurality of peripheral edges extending between the top and bottom surfaces. A pair of adjoining first and second ceiling panels is mutually engaged along first and second mating peripheral edges respectively, the first and second peripheral edges each having a hybrid edge detail including a tongue-and-groove portion and a shiplap portion. The shiplap portion of the first ceiling panel defines a laterally extending mounting flange attached to the ceiling support structure. The shiplap portion of the second ceiling panel covers the mounting flange of the first ceiling panel. The tongue-and-groove portions of the first and second ceiling panels are interlocked, wherein the second peripheral edge of the second ceiling panel is supported via the tongue-and-groove interlock with the first ceiling panel.

In one embodiment, a ceiling panel with hybrid edge detail includes a body including a top surface, a bottom surface, opposite first and second longitudinal sides extending between the top and bottom surfaces, and opposite third and fourth lateral sides extending between the top and bottom surfaces. The first longitudinal side has a first peripheral edge including a shiplap portion and a tongue-and-groove portion. The third lateral side has a third peripheral edge including a shiplap portion and a tongue-and-groove portion. The shiplap and tongue-and-groove portions of the first and third peripheral edges are arranged to engage complementary configured shiplap and tongue-and-groove portions of adjoining ceiling panels for forming an interlocked ceiling system.

A method for concealing a ceiling support structure is provided. The method includes: providing a plurality of ceiling panels each having a top surface and an opposing bottom surface, the panels each having opposing first and second peripheral sides, the first peripheral side having a hybrid edge detail comprising a tongue-and-groove feature and a laterally extending shiplap feature adjacent the top surface, the second peripheral side having a hybrid edge detail comprising a tongue-and-groove feature and a stepped shiplap feature; attaching the first ceiling panel to the ceiling support structure; engaging the tongue-and-groove of the second peripheral side of a second ceiling panel with the tongue-and-groove feature of the first peripheral side of the first ceiling panel; and engaging the stepped shiplap feature of the second peripheral side of the second ceiling panel with the laterally extending shiplap feature of the first peripheral side of the first ceiling panel; wherein the second peripheral side of the second ceiling panel is supported by first peripheral side of the first ceiling panel.

After installation of the ceiling panels, a final facing may be installed to ceiling panels to further conceal the exposed panel-to-panel joints in furtherance of creating a monolithic ceiling appearance. In one embodiment, the facing may be installed in the field (i.e. jobsite) to cover a plurality of installed or hung ceiling panels. This type facing system is distinguishable from facing materials which are sometimes applied to the exposed bottom surfaces of a single panel or tile at the factory.

In one embodiment, a faced ceiling system includes a ceiling support structure, and a plurality of ceiling panels attached to the ceiling support structure. The ceiling panels each have a width, a length, a top surface facing the ceiling support structure, an opposing bottom surface facing an interior space below the ceiling panels, and a plurality of peripheral edges extending between the top and bottom surfaces. A plurality of joints is formed between mating peripheral edges of adjoining ceiling panels. A final facing is supported by the bottom surfaces of at least two ceiling panels; the facing covering at least a portion of the at least two ceiling panels and the joint formed therebetween to conceal the joint. The facing has a width larger than at least one of the width and length of the ceiling panels.

In some implementations, the peripheral edges of the ceiling panels have a hybrid edge detail including a tongue-and-groove portion and a shiplap portion. The tongue-and-groove portions between mating peripheral edges of adjoining ceiling panels are interlocked. The shiplap portions between mating peripheral edges of adjoining ceiling panels comprise an upper shiplap feature on one ceiling panel and a lower shiplap feature on the mating ceiling panel engaging the upper shiplap feature. In one embodiment, the facing is adhesively bonded to the ceiling panels. In some embodiments, the bottom surfaces of the panels may be treated to prepare the surfaces for adhesive bonding.

In another embodiment, a ceiling system with field-applied facing includes a grid support system comprising a plurality of orthogonally intersecting longitudinal and lateral grid support member defining an array of grid openings, and a plurality of ceiling panels attached to the grid support system. Each ceiling panel includes a pair of opposed longitudinal peripheral edges and a pair of opposed lateral peripheral edges. Joints are formed between each ceiling panel and mating longitudinal and lateral peripheral edges of adjoining ceiling panels. The peripheral edges of the ceiling panels have a hybrid edge detail including a tongue-and-groove portion and a shiplap portion. The tongue-and-groove portions between mating peripheral edges of adjoining ceiling panels are interlocked. The shiplap portions between mating peripheral edges of adjoining ceiling panels comprise an upper shiplap feature on one ceiling panel and a lower shiplap feature on the mating ceiling panel engaging the upper shiplap feature. A final facing sheet of material is adhesively bonded to bottom surfaces of a plurality of ceiling panels, wherein the facing has a continuous extent in at least one direction covering and concealing a plurality of joints between adjoining ceiling panels.

A method for facing a ceiling system is provided. The method includes: mounting an orthogonal array of ceiling panels to ceiling support structure, each ceiling panel including top and bottom surfaces, a pair of opposed longitudinal peripheral edges, and a pair of opposed lateral peripheral edges, the peripheral edges of the ceiling panels having a hybrid edge detail including a tongue-and-groove portion and a shiplap portion; forming a plurality of longitudinal joints between laterally adjoining peripheral edges of the ceiling panels; and bonding a final facing to the bottom surfaces of the ceiling panels, wherein the facing has a continuous extent in at least one direction covering and concealing the plurality of the longitudinal joints. In one embodiment, the method further comprises applying a surface treatment to the bottom surfaces of the ceiling panels before bonding the final facing. In one embodiment, the bonding step comprises applying an adhesive layer to the treated bottom surfaces to bond the final facing to the ceiling panels.

BRIEF DESCRIPTION OF THE DRAWINGS

The features of the exemplary embodiments of the present invention will be described with reference to the following drawings, where like elements are labeled similarly, and in which:

FIGS. 23-27 are side elevation cross-sectional views illustrating sequential steps in a method for installing the ceiling system of FIG. 16 to conceal the joint formed between two ceiling panels;

FIG. 40 is an enlarged detail of one of the joints between adjoining ceiling panels in FIG. 7;

FIG. 41 is an exploded view thereof with the grid support member showing the hybrid shiplap and tongue-and-groove edge details of the panels;

FIGS. 45-47 are bottom plan views of the faced ceiling system of FIG. 44 showing sequential steps in attaching the facing system to the ceiling panels.

Figure 1:
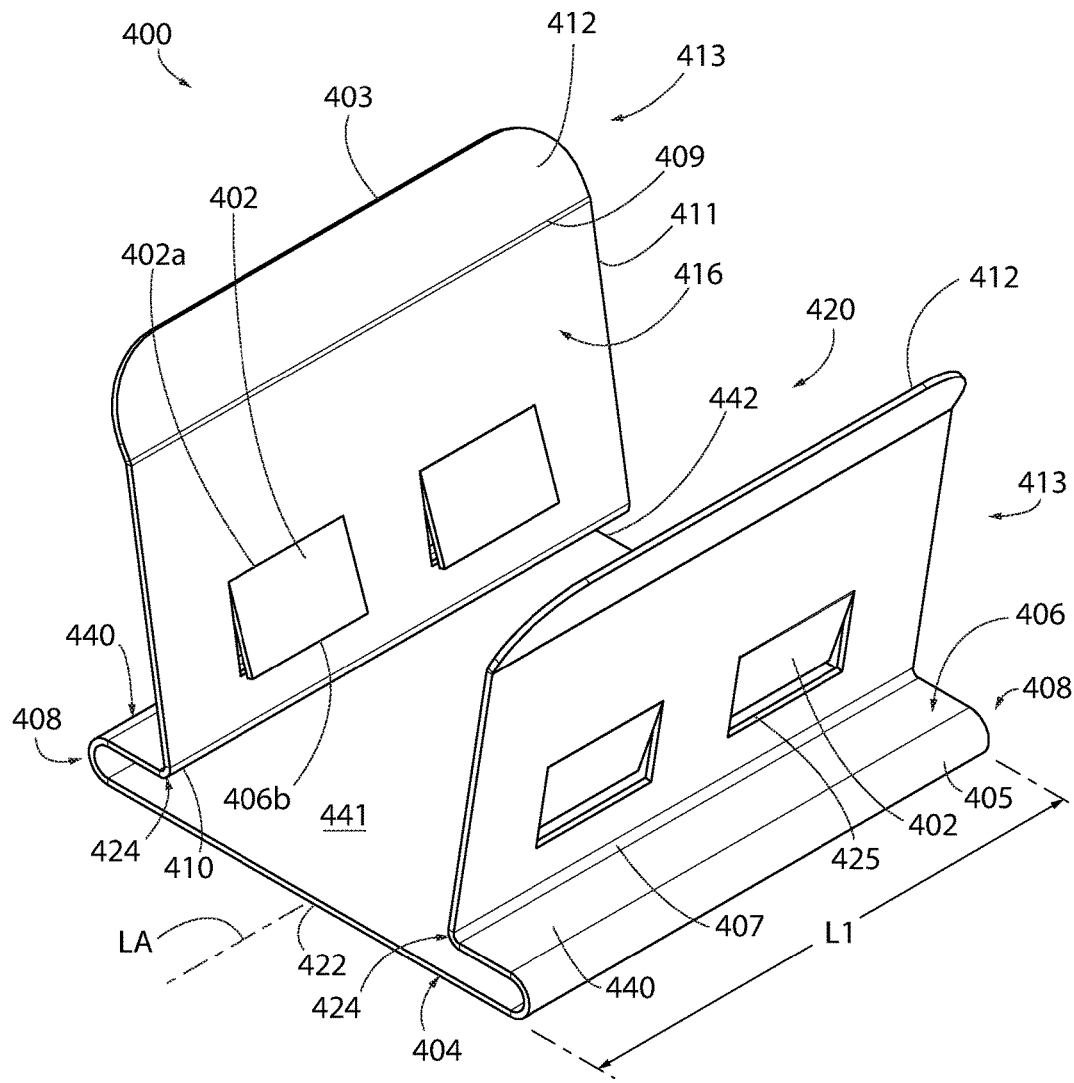
FIG. 1 is a perspective view of a ceiling tile retaining clip for use in a ceiling system according to the present disclosure.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Multiple inventive concepts are described herein and are distinguished from one another using headers in the description that follows. Specifically, FIGS. 1-15 are relevant to a First Inventive Concept, FIGS. 16-32 are relevant to a Second Inventive Concept, and FIGS. 33-47 are relevant to a Third Inventive Concept. These Inventive Concepts should be considered in isolation from one another. It is possible that there may be conflicting language or terms used in the description of the First through Third Inventive Concepts. For example, it is possible that in the description of the First Inventive Concept a particular term may be used to have one meaning or definition and that in the description of the Second Inventive Concept the same term may be used to have a different meaning or definition. In the event of such conflicting language, reference should be made to the disclosure of the relevant Inventive Concept being discussed. Similarly, the section of the description describing a particular Inventive Concept being claimed should be used to interpret claim language when necessary.

First Inventive Concept—Concealed Grid Ceiling System

FIGS. 8-13 depict an exemplary ceiling system 100 according to one embodiment of the present disclosure for forming a concealed grid. The ceiling system 100 includes a support grid 200 comprised of a plurality of longitudinally-elongated, intersecting grid support members 202 and at least one ceiling tile 300 mounted to the support members with retaining clips 400. In one embodiment, grid support members 202 may be horizontally oriented when installed. It will be appreciated, however, that other suitable mounted orientations of support members 202 may be used such as vertical and angled or slanted (i.e. between 0 and 90 degrees to horizontal). Accordingly, although support members 202 may be described in one exemplary orientation herein as horizontal, the invention is not limited to this orientation alone and other orientations may be used.

Grid support members 202 are arranged to form an array of grid openings 208 which define a grid spacing S2 that corresponds to a mounting channel spacing S1 in the ceiling tile 300. Accordingly, spacing S2 is substantially equal to spacing S1 to allow the grid support members 202 to engage retaining clips 400 located in the mounting channels 330 of the ceiling tile, as further described herein. In some embodiments, the grid support members 202 (and concomitantly mounting channels 330) may be arranged in an orthogonal pattern wherein support members intersect at right angles to form rectilinear grid openings 208 such as squares or rectangles (in top plan view). Other shapes of grid openings 208 are possible. The terminal ends 230 of at least some of the grid support members 202 may be configured to interlock with other transversely oriented grid support members 202 at right angles (see, e.g. FIG. 13) to form the rectilinear grid pattern in a manner well known to those skilled in the art without further elaboration. Any suitable interlocking mechanism and configuration may be used.

In transverse cross section (with additional reference to FIG. 15), grid support members 202 may have a generally inverted T-shaped configuration when in an installed position either suspended from or directly attached to an overhead ceiling support structure via an attachment mechanism such as without limitation fasteners, hangers, wires, cables, rods, struts, etc. Grid support members 202 may include a longitudinally-extending horizontal bottom flange 210, a bulbous top stiffening channel 220, and a vertical web 212 extending upwards from the flange to the stiffener. The grid support members 202 each define a longitudinal axis LA and axial direction. Web 212 may be centered between opposing side ends of flange 212 in one embodiment. Bottom flange 210 defines upward facing bearing surfaces 204 configured and arranged to engage retaining clip 400. Bearing surfaces 204 are disposed on each side of web 212 and extend laterally from the web outwards to longitudinally extending opposed lateral edges 214 of the bottom flange 210. Bottom flange 210 further defines a bottom surface 206 facing downwards towards the ceiling tile 300 and a room or space below the support grid. Bottom surface 206 defines a first horizontal reference plane P1 of the overhead support grid 200 which is spaced vertically above a second horizontal reference plane P2 defined by the bottom surface 304 of the ceiling tile.

Grid support members 202 may be made of metallic or non-metallic material suitable to engage clips 400 and support the dead or weight load of ceiling tiles 100 without undue deflection. In some preferred but non-limiting embodiments, support members 110 may be made of metal including aluminum, titanium, steel, or other.

Referring to FIGS. 5-10, ceiling tiles 300 each include a top surface 302, bottom surface 304, and peripheral sides 306, 308, 310, and 312 each defining a peripheral edge. The distance between opposing peripheral sides defines widths and/or lengths of the ceiling tile 300. In one embodiment, the peripheral sides may have a straight edge (see, e.g. FIG. 6) in side profile to form straight butt joints with adjacent tiles in the ceiling system 100. Other suitable edge profiles, however, such as angled, tegular, rabbeted, etc. are possible.

Top and bottom surfaces 302, 304 may be substantially planar or flat, or alternatively may include various surface features, textures, and patterns such as perforations, wavy raised surfaces, undulating surface contours, linear grooves and ridges, or other. Accordingly, the top and bottom surfaces 302, 304 are not limited to any particular surface profile. In one embodiment, the top surface of 302 of the ceiling tile 300 may be flat which may serve as a reference surface for locating the mounting channels 330 at a uniform position in each ceiling tile during manufacture.

Ceiling tiles 300 may have substantially uniform thickness T1 wherein top surface 302 is substantially parallel to bottom surface 304 between the peripheral sides 306, 308, 310, and 312. In other possible embodiments, top and bottom surfaces 302, 304 may be angled with respect to each other to form a reveal between adjacent ceiling tiles wherein one or more peripheral sides 306, 308, 310, or 312 project below the bottom surface 304 of an adjacent ceiling tile 300.

With continuing reference to FIGS. 5-10, ceiling tiles 300 include a plurality of longitudinally-extending recessed mounting channels 330 formed through and penetrating top surface 302 so that the channels are open in an upwards direction facing the overhead support grid 200. Channels 330 extend longitudinally across the tile and parallel to the top and bottom surfaces 302, 304. Each channel 330 penetrates at least one peripheral edge formed by peripheral sides 306, 308, 310, or 312 of ceiling tile 300 to allow insertion of a retaining clip 400 through a side of the ceiling tile into the channel. In one embodiment, as shown for example in FIG. 5, the channels 330 are arranged to penetrate each peripheral side 306, 308, 310, or 312. In this embodiment, each channel 330 further penetrates two opposing peripheral sides 306, 308, 310, or 312, which maximizes the possible insertion and mounting locations of retaining clip 400 on ceiling tile 300.

Figure 5:
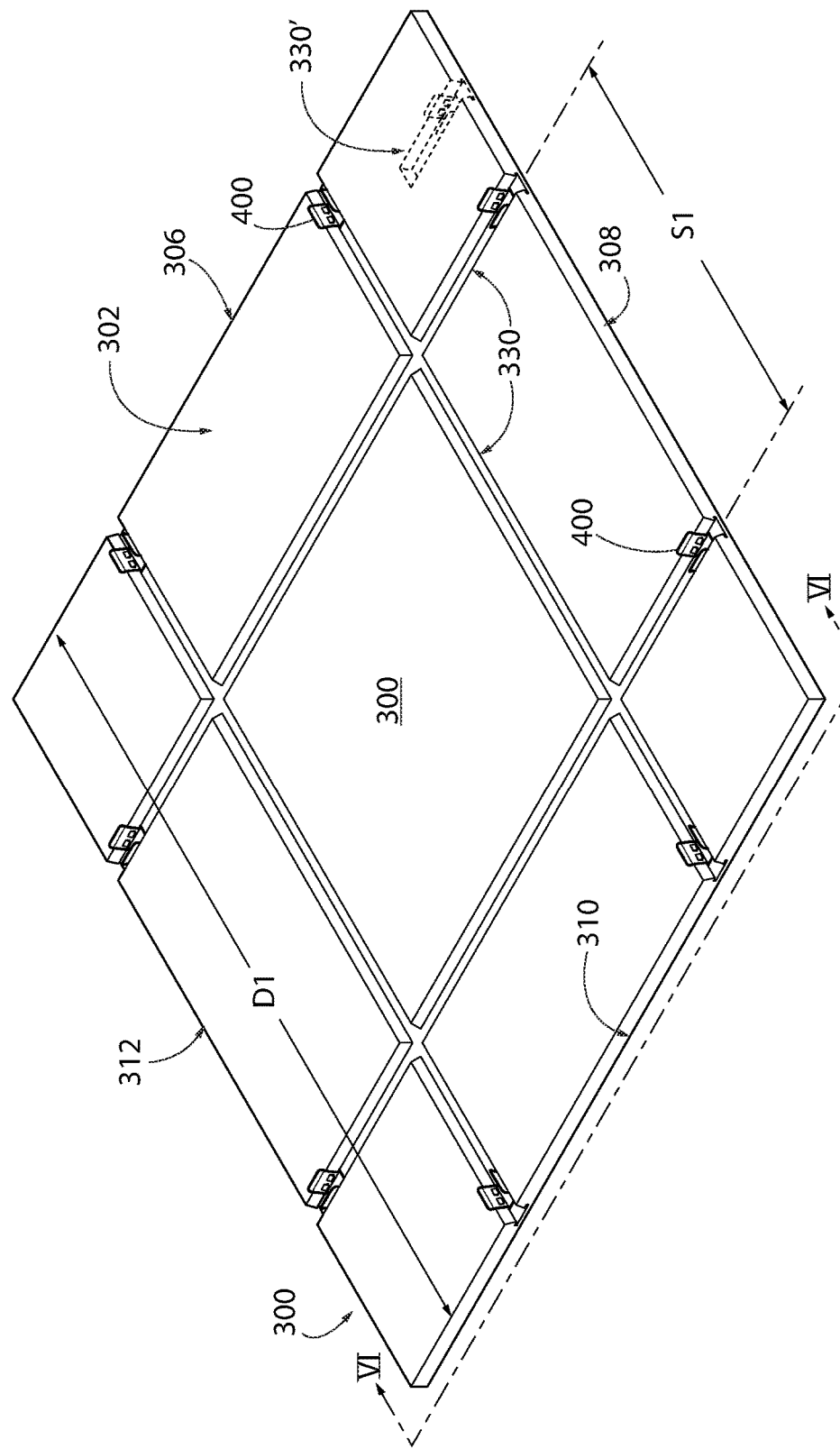
FIG. 5 is a top perspective view of a ceiling tile with retaining clips of FIG. 1 mounted therein.

It will be appreciated that in other possible configurations and arrangements of channels 330, however, that some or all of the channels may extend horizontally/laterally only partially across the width/length of the ceiling tile 300 from one peripheral side 306, 308, 310, or 312, as represented by channel 330' shown in dashed lines in FIG. 5. This partial channel 330' terminates at a dead end, which limits the maximum lateral insertion distance of the retaining clip 400 into the channel. This arrangement further limits the range of possible ceiling tile mounting locations for retaining clip 400, which may be desirable in some particular applications.

Each channel 330 includes an open top 331, an upper receptacle 332 including two opposing sidewalls 333, and a lower retaining clip mounting receptacle 334. In one embodiment, sidewalls 333 may be sloped or angled with respect to a vertical centerline CV2 defined by the channel 330. Accordingly, sidewalls 333 may each be disposed at an angle A3 to vertical centerline CV2 between 0 and 90 degrees. The angled sidewalls 333 allow the retaining clip 400 to expand laterally outwards into a gap G formed between the sidewalls and resiliently flexible mounting elements such as upright wings 413 of the clip when mounting the ceiling tile 300 to a grid support member 202, as further described herein. The gap G may be wedge-shaped. In other possible embodiments, the sidewalls may be arranged parallel to vertical centerline CV2 (e.g. perpendicular to top surface 320) as represented by the dashed line 333' in FIG. 7 provided sufficient lateral space is created between the opposing sidewalls to allow the retaining clip 400 enough room to expand laterally by a sufficient amount to lock the retaining clip to the grid support member 202.

Figure 2:
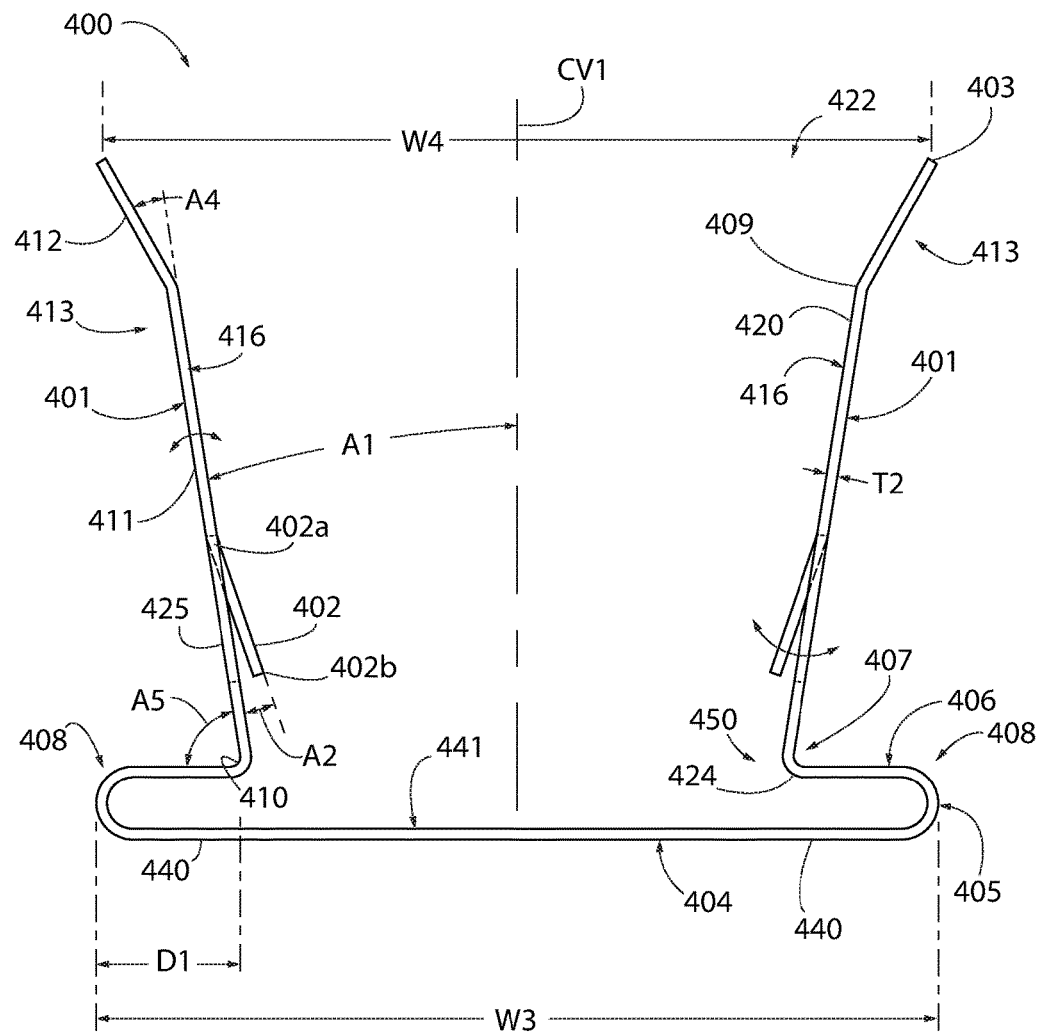
FIG. 2 is a side elevation view thereof.
Figure 3:
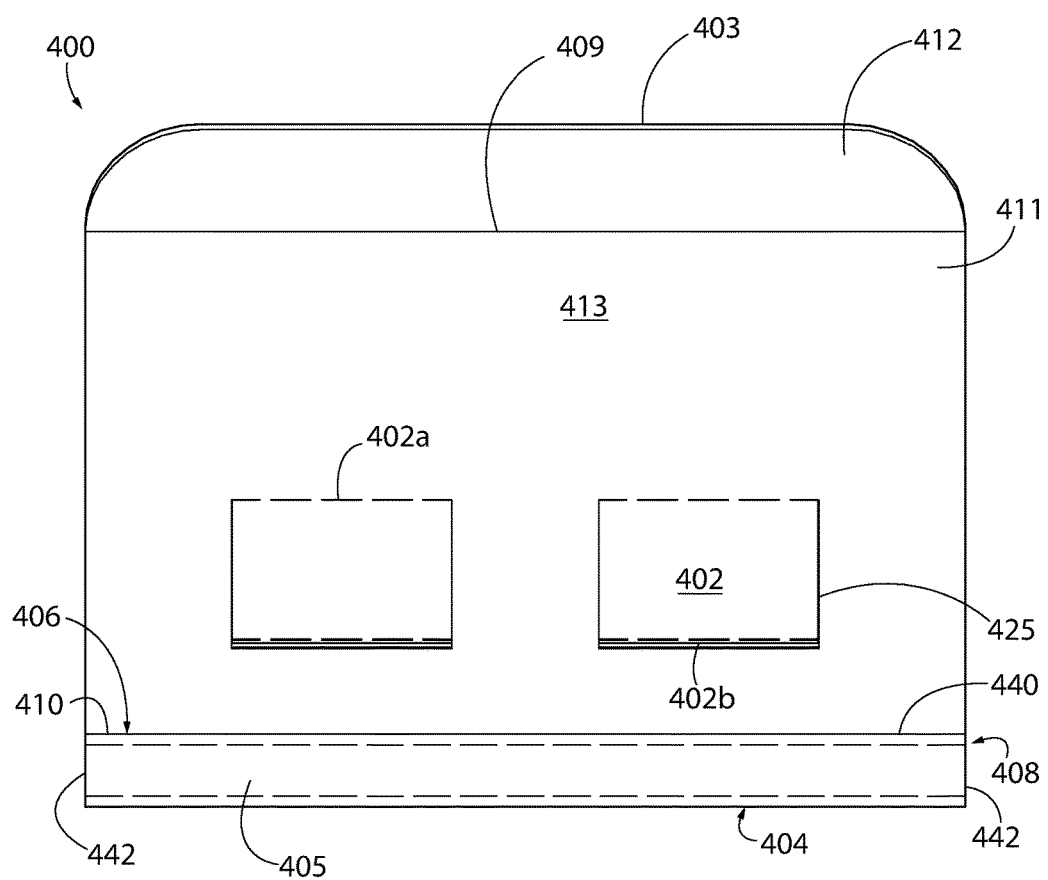
FIG. 3 is an end elevation view thereof.
Figure 4:
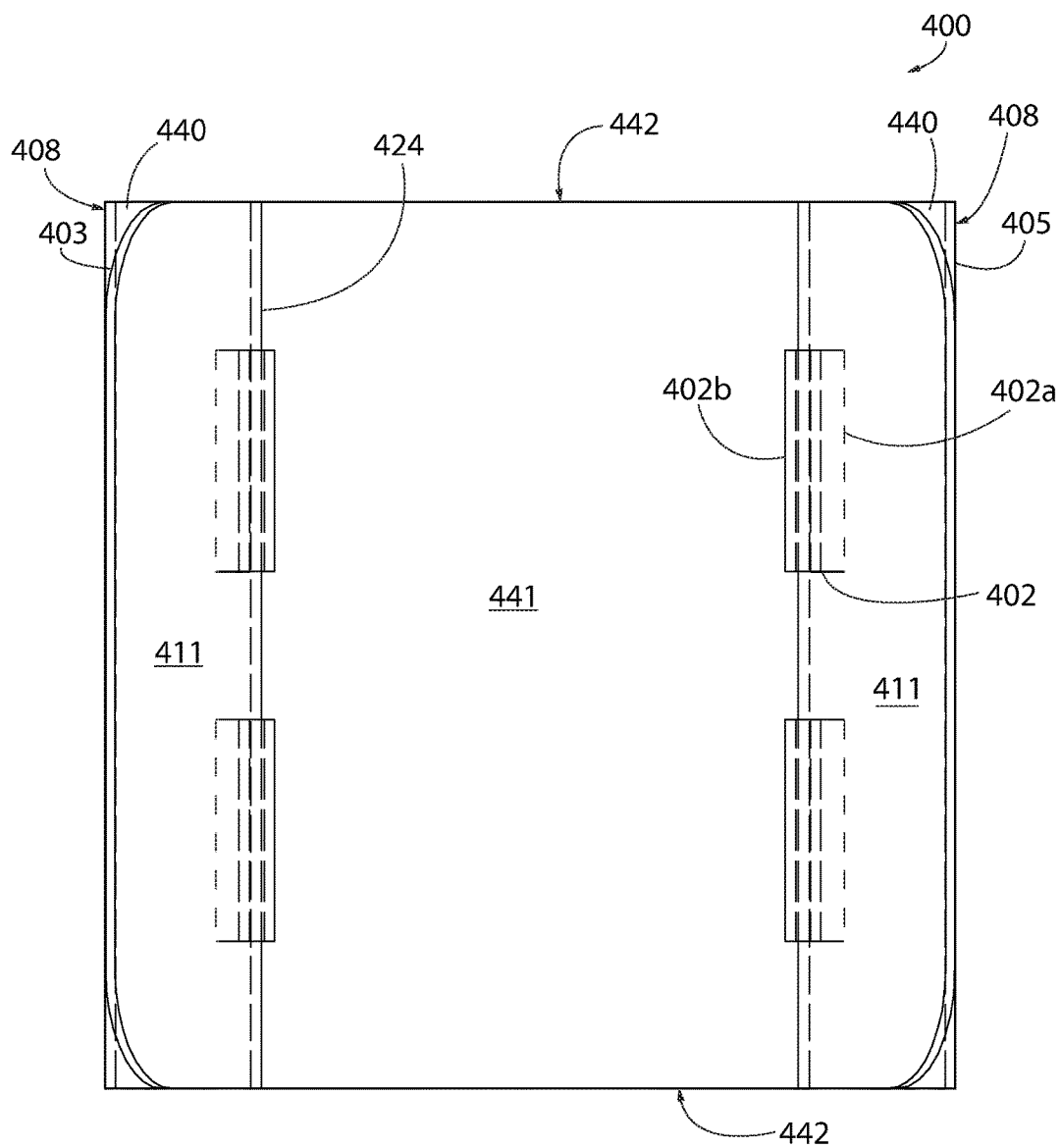
FIG. 4 is top plan view thereof.
Figure 7:
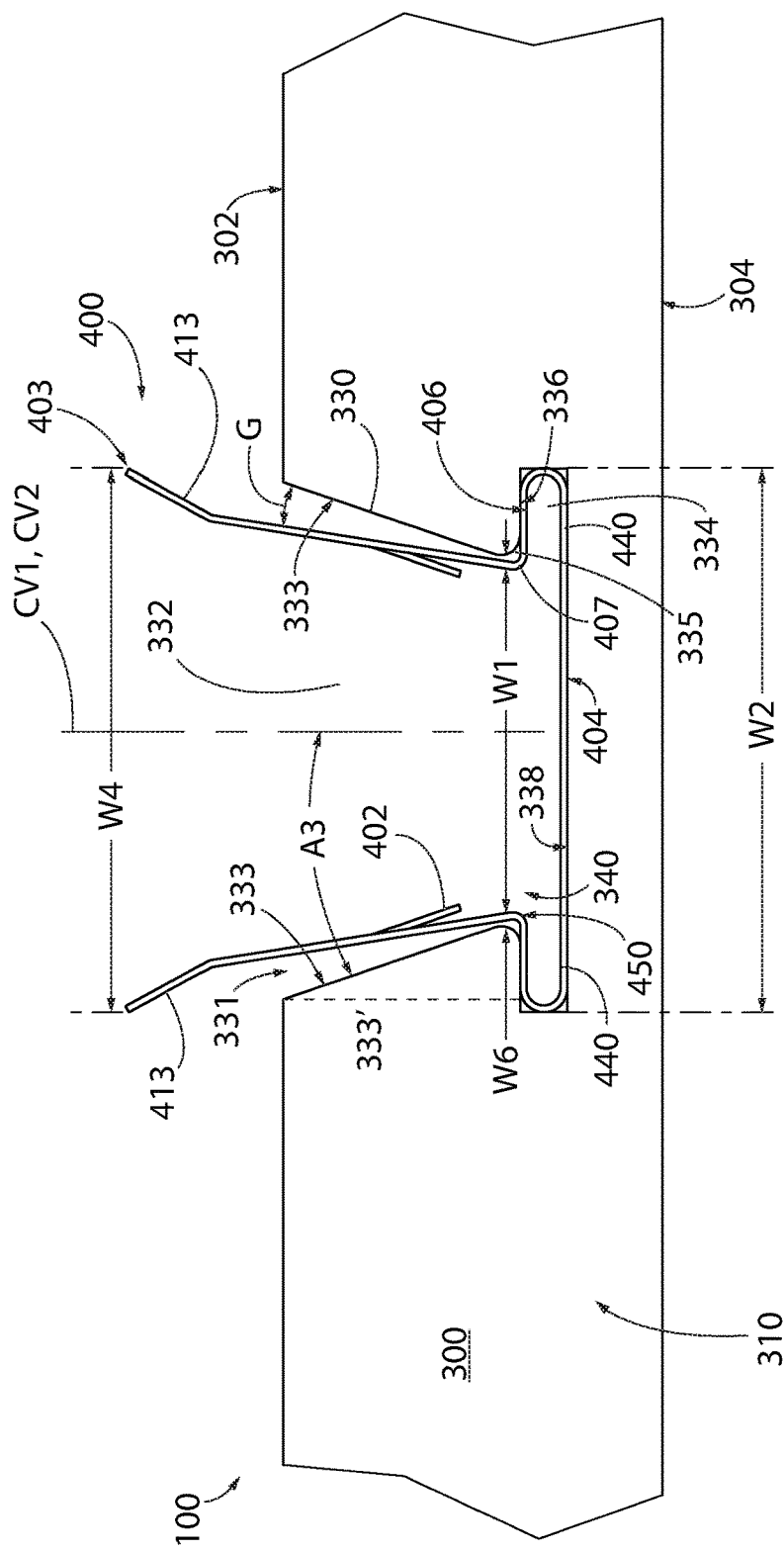
FIG. 7 is an enlarged detail VII taken from FIG. 6.
Figure 14:
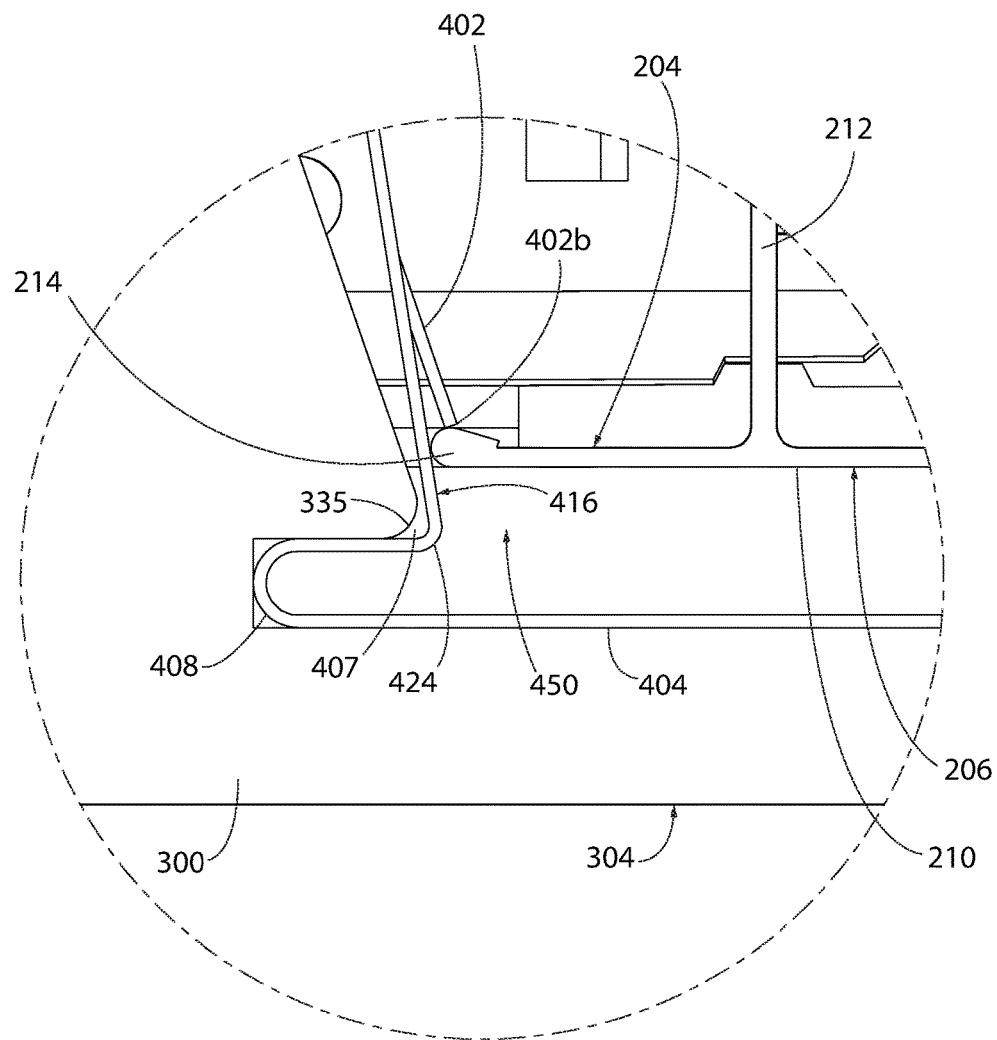
FIG. 14 is an enlarged detail XIV taken from FIG. 13.

In one embodiment, as shown in the figures, angled sidewalls 333 are desired which forms a pair of inwardly projecting protrusions 335 configured to be received at least partially in and engage a pair of outwardly open notches 407 of the retaining clip 400 (see, e.g. FIGS. 2, 7, and 14). The protrusions 335 create a pair of opposing shoulders in channel 330 that engage retaining clip 400. This ensures a snug fit for tightly securing the clips 400 in the channel 330 to minimize possible rotation of the retaining clip 400 with respect to the channel 330 when locking the ceiling tile 300 to the support grid 200. The engagement between the protrusions 335 and notches 407 further creates a pivot point around which the angled sidewalls 333 may rotate and expand laterally outwards when being locked to a grid support member 202.

As shown in FIG. 7, the lower mounting receptacle 334 is complementary configured in cross sectional shape to the laterally widened mounting base or flange 408 of retaining clip 400 (see also FIG. 2 of retaining clip). This securely holds the retaining clip 400 in the mounting channel 330 of the ceiling tile 300. The mounting receptacle 334 is located between the bottom surface 304 and top surface 302 of the ceiling tile. In one arrangement, mounting receptacle 334 may be spaced vertically apart from and does not penetrate bottom surface 304 of ceiling tile 300 so that the overhead support grid 200 will be completely concealed from view beneath the ceiling tile (see also FIG. 13).

Mounting receptacle 334 defines a downward facing bearing surface 336 which engages upward facing top surface 406 on retaining clip 400. Upward facing bearing surface 338 of mounting receptacle 334 engages downward facing bottom surface 404 of retaining clip 400. Mounting receptacle 334 communicates with upper receptacle 332 to allow the resiliently flexible mounting wings 413 of retaining clip 400 to extend upwards through the channel 330 for engaging the support grid 200. The mounting receptacle 334 has a width W2 which is sized just slightly larger than width W3 of mounting flange 408. This allows the mounting flange 408 to be slideably inserted and moved within channel 330 without excessive looseness that might allow the ceiling tile 100 to wobble when installed in the support grid 200.

A narrow throat portion 340 is formed between upper and lower receptacles 332, 334 by the horizontal gap created between the inward protrusions 335 on each sidewall 333 of the mounting channel 330, as shown in FIG. 7. The throat portion 340 has a width W6 which is smaller than the width W3 of the retaining clip bottom mounting flange 408 (see also FIG. 2). This prevents the retaining clip 400 from being withdrawn vertically from the ceiling tile channel 330 to ensure that the ceiling tile 300 remains secured to the overhead grid support members 202. Width W6 of the throat portion 340 is therefore smaller than width W2 of the lower receptacle 334.

Any suitable number and arrangement of channels 330 may be provided so long as the ceiling tile 300 may be securely fastened to the overhead support grid 200 with retaining clips 400. In various embodiments, at least two channels 330 arranged in intersecting or parallel relationship to each other may be used so that the retaining clips are not all arranged in the same vertical mounting plane to avoid rotation of the ceiling tile and provide secure installation. More mounting channels 330 may be desired for a secure mount depending on the size and shape of the ceiling tiles used. In one exemplary arrangement shown in FIG. 5, multiple intersecting channels 330 are provided. As shown each mounting channel 330 may include one or more retaining clips 400 with at least some of the clips disposed near the peripheral sides 306, 308, 310, and 312 of the ceiling tile proximate to where the ceiling tile will abut an adjacent tile for providing a relatively tight flush joint.

FIGS. 1-4 show a ceiling tile retaining clip 400 in greater detail. Retaining clip 400 has a generally truncated V-shaped body that defines a vertical centerline CV1 and longitudinal axis LA which generally coincides and aligns with the longitudinal axis of a grid support member 202 and axially elongated mounting channels 330 formed in the ceiling tiles 300 when the retaining clip is coupled to both the support member and ceiling tile. Retaining clip 400 further defines a pair of axial ends 442 oriented transversely to longitudinal axis LA. Retaining clip 400 has an axial length L1 which may be less than the length of a mounting channel 330 which may be measured along the width or length dimension D1 of the ceiling tile 300 (see also FIG. 5). This allows the retaining clip 400 to be mounted in a plurality of possible mounting positions on the ceiling tile. Accordingly, mounting channel 330 has a length that is at least as long as length L1 of retaining clip 400, and preferably longer than twice the length of L1 to provide multiple mounting locations or positions for the retaining clip.

Retaining clip 400 further includes two opposing resiliently flexible and laterally movable upright mounting elements such as mounting wings 413 extending upwards from a common mounting base such as flange 408. The mounting flange 408, being captured by the mounting channel 330 of the ceiling tile 300, is intended to remain relatively stationary in position during the process of mounting the ceiling tile to the support grid 200 whereas the mounting wings 413 are elastically deformable to lock the ceiling tile to the support grid, as further described herein.

The body of the retaining clip may be formed as a single unitary structure in which the mounting wings 413 and mounting flange 408 are all integral portions of the unitary body. In other possible embodiments, the mounting wings 413 may be separate elements coupled to mounting flange 408 in any suitable manner such as welding, solder, fasteners, interlocked structures, etc.

Referring generally now to FIGS. 1-4, 7, 13, and 14, the mounting wings 413 are spaced laterally apart to define a widened entrance or top opening 422 having a width W4 (measured between top edges 403) that is sized to receive the bottom flange 210 of a grid support member 202 when inserted vertically downwards into the retaining clip. Accordingly, width W4 is larger than the lateral width W5 of the bottom mounting flange 210 of the grid support member 202. Each mounting wing 413 includes an upper section 412 defining an upper free terminal edge 403, a middle section 411, and a lower end 410 which conjoins bottom mounting flange 408. In some embodiments, upper section 412 of each mounting wing 413 may be flared outwards about a bend line 409 at an angle A4 to the middle section 411. Angle A4 may be between 0 and 90 degrees, and preferably between 0 and 45 degrees in various embodiments. Each mounting wing 413 further defines a pair of inner bearing surfaces 416 which face inwards towards each other and vertical centerline CV1 defined by the retaining clip 400. The bearing surfaces 416 are configured and arranged to slideably engage bottom flange 210 of a grid support member 202 during the ceiling tile mounting process, as further described herein.

Mounting wings 413 may be slanted and angled outwards away from vertical centerline CV1 and diverge by a progressively increasing horizontal distance from centerline CV1 in moving vertically upward away from the bottom mounting flange 408, as shown. In one embodiment, each mounting wing 413 may be disposed at an angle A1 from vertical centerline CV1 between 0 and 90 degrees, and more preferably between 0 and 45 degrees. The angled wings 413 define an interior cavity 420 therebetween configured and dimensioned to receive bottom flange 210 at least partially into the cavity (see, e.g. FIG. 13). In one embodiment, cavity 420 may have a frusto-conical shape in transverse cross section.

Bottom mounting flange 408 of retaining clip 400 defines an opposing pair of laterally outward extending engagement protrusions 440 configured to engage lateral end portions of lower mounting receptacle 334 in the ceiling tile 100. Mounting flange 408 includes an outer bottom surface 404, opposing outer top surface 406, opposing inner top surface 441, and a pair of opposing longitudinally-extending lateral ends 405 oriented parallel to longitudinal axis LA. The distance between the ends 405 defines a mounting flange width W3. Each mounting wing 413 is disposed at an angle A5 to the top surface 406 of the mounting flange 408. In some embodiments, angle A5 may be between 0 and 90 degrees which creates the angled or sloped inner bearing surfaces 416 inside the retaining clip opposite outer surfaces 401 of the mounting wings 413. The inner bearing surfaces 416 may be substantially parallel to outer surfaces 401 creating a substantially uniform thickness T2 for each mounting wing 413 (see also FIG. 2).

In one embodiment, bottom mounting flange 408 of retaining clip 400 may have an at least partially open interior space defined between the vertically spaced apart top and bottom surfaces 406, 404 of the flange. The mounting flange 408 may form a generally V-shaped shoulder or corner 424 (which may be slightly rounded) forming a laterally narrowed throat portion 450 of the retaining clip 400 and outwardly open notches 407 configured for engaging mounting channel 330, as described herein. The inwardly projecting corners 424 are resiliently flexible and vertically movable to a degree upon applying a generally downward force against the top edges 403 of the mounting wings 413. Accordingly, top surface 406 of mounting flange 408 is in turn resiliently deformable to a degree with respect to the bottom surface 404 due to the open interior space formed between the surfaces. This may assist with sliding and then maintaining the retaining clips 400 in a desired mounting position within the longitudinally extending channels 330 formed in the ceiling tiles 300. For example, a clip 400 may be inserted into a channel 330 through a peripheral side 306, 308, 310, or 312. The installer may then press downwards with a force against the mounting wings 413 which temporarily and resiliently deforms the corners 424, thereby displacing them slightly downwards to relieve some of the frictional pressure between the adjacent top surface 406 of the mounting flange 408 and the downward facing bearing surface 336 in the lower receptacle of the ceiling tile channel (reference FIG. 7). This allows the clip 400 to slide more easily within the channel 330. When a desired position of the clip 400 is reached, the installer releases the mounting wings 413 thereby removing the downward force. The top surface of retaining clip 400 springs back upwards and increases the frictional force against the bearing surface 336 to help frictionally retaining the clip in position with channel 330 until the ceiling tile 300 is mounted to the overhead support grid 200.

It will be appreciated that in other possible embodiments, the bottom mounting flange 408 of retaining clip 400 may be solid without an interior space and vertical deformability between the top and bottom surfaces 406, 404.

Referring to FIGS. 1-4, retaining clip 400 further includes at least one opposing pair of resiliently movable locking tabs 402 which are each configured to engage grid support member 202 for locking the ceiling tile 100 to the support grid 200. Locking tabs 402 may each be hingedly connected to a mounting wing 413 at a top hinged end 402a and have a bottom free end 402b which engages upward facing bearing surface 204 on the bottom flange 210 of the grid support member 202, as further shown in FIG. 13. In one embodiment, the free ends 402b of tabs 402 are arranged to engage the opposing longitudinally extending lateral edges 214 of the bottom flange 210.

As best shown in FIG. 2, locking tabs 402 project inwards from each mounting wing 413 of retaining clip 400 and are disposed at an angle A2 to the wings. In one non-limiting embodiment, angle A2 may be between 0 and 45 degrees. The tabs 402 are movable laterally outward by engagement with the bottom flange 210 of the grid support member 202 when inserted into the retaining clip 400. The grid support member 202 creates a laterally outward force against the locking tabs 402 to temporarily deflect and spread the tabs apart. The locking tabs 402 elastically return inwards towards an undeflected position upon disengagement from the bottom flange 210 of the grid support member 202. The tabs 402 may be rigidly structured with respect to the mounting wings 413 (e.g. by making the vertical length of the tabs relatively short) so that the grid support member 202 deflects both the tabs and mounting wing upon contact. In other embodiments, the tabs 402 may be movable with respect to the mounting wings 413 to a degree such that the grid support member 202 deflects either the tabs alone upon contact or both the tabs and mounting wings. Any of the foregoing constructions are satisfactory so long as the locking tabs 402 are deflected and spread apart by the grid support member 202.

Figure 13:
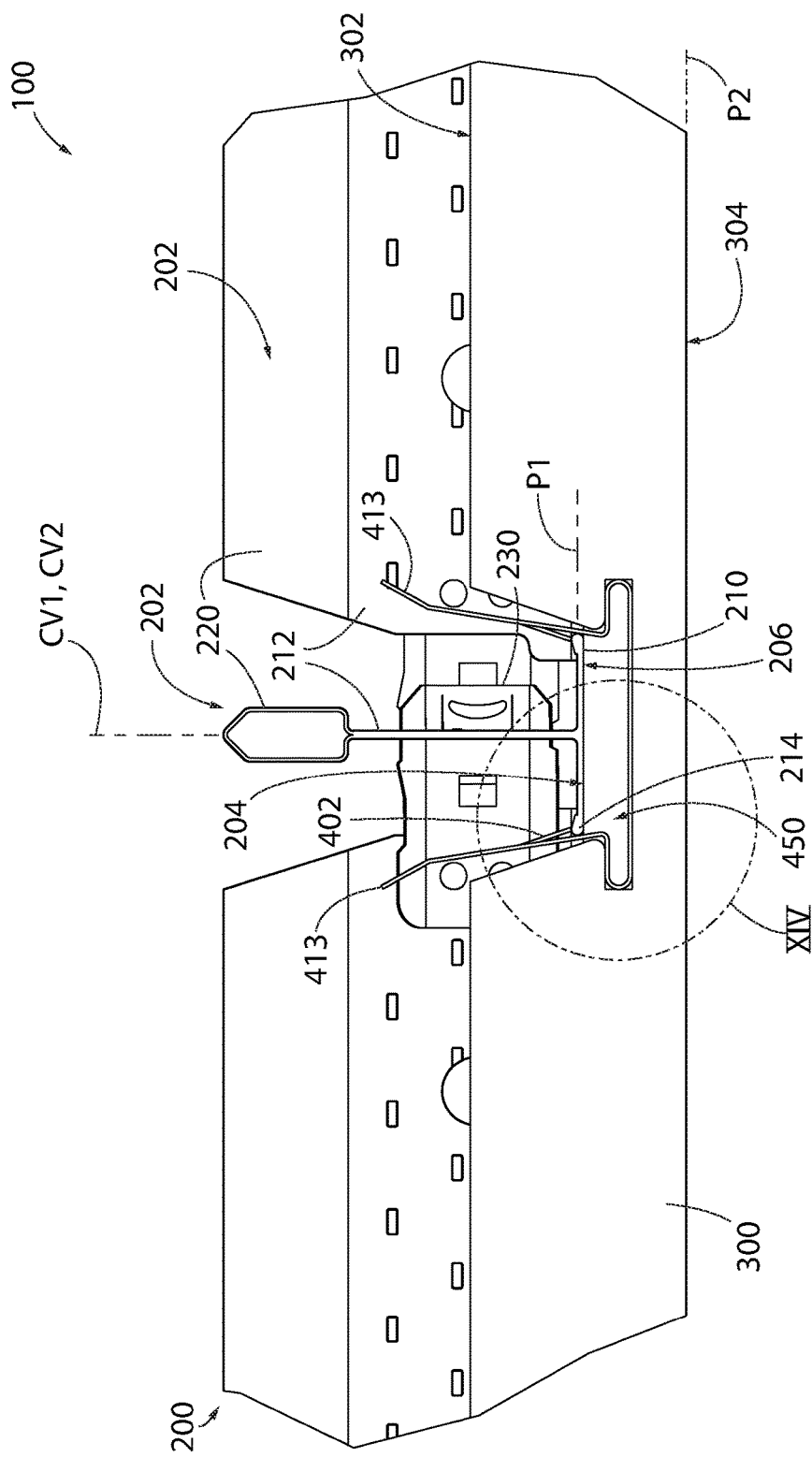
FIG. 13 is an enlarged detail XIII taken from FIG. 12.

The locking tabs 402 are disposed between the top edges 403 and bottom mounting flange 408 of the retaining clip 400 at a position that is located between the top and bottom surfaces 302, 304 of the ceiling tile when the retaining clip is mounted therein (see, e.g. FIG. 13). This provided a stable ceiling tile mount and minimizes the total combined height of the ceiling tile and grid support member combination for compact installations. In one embodiment, the locking tabs may be located more proximate to the bottom mounting flange 408 of retaining clip 400 than the top edges 403 at a position adjacent to throat portion 450 where the width of the retaining clip cavity 420 is less than the width W5 of the grid support member bottom flange 210 to trap the flange beneath the locking tabs (see also FIGS. 2, 7, and 13-15).

The locking tabs 402 may be formed as an integral unitary structural part of the mounting wings 413 by creating a three-sided rectilinear cut in the wing and bending the tabs inwards away from the wings towards vertical centerline CV1. This embodiment formed a cutout window 425 in the mounting wings 413 below the hinged end 402a of each locking tab 402. Each locking tab 402 is laterally moveable into and out of its respective window 425.

In other possible embodiments contemplated, locking tabs 402 may be formed as separate elements which are attached to mounting wings 413 by any suitable means to form a hinge such as with fasteners, soldering, welding, adhesives, or other. In one preferred embodiment, the locking tabs 402 are integrally formed from a part of mounting wings 413 in the manner described above for simplicity of manufacture and cost-effectiveness. Any suitable number of locking tabs 402 may be provided. Each mounting wing 413 preferably includes at least one locking tab 402.

Figure 10:
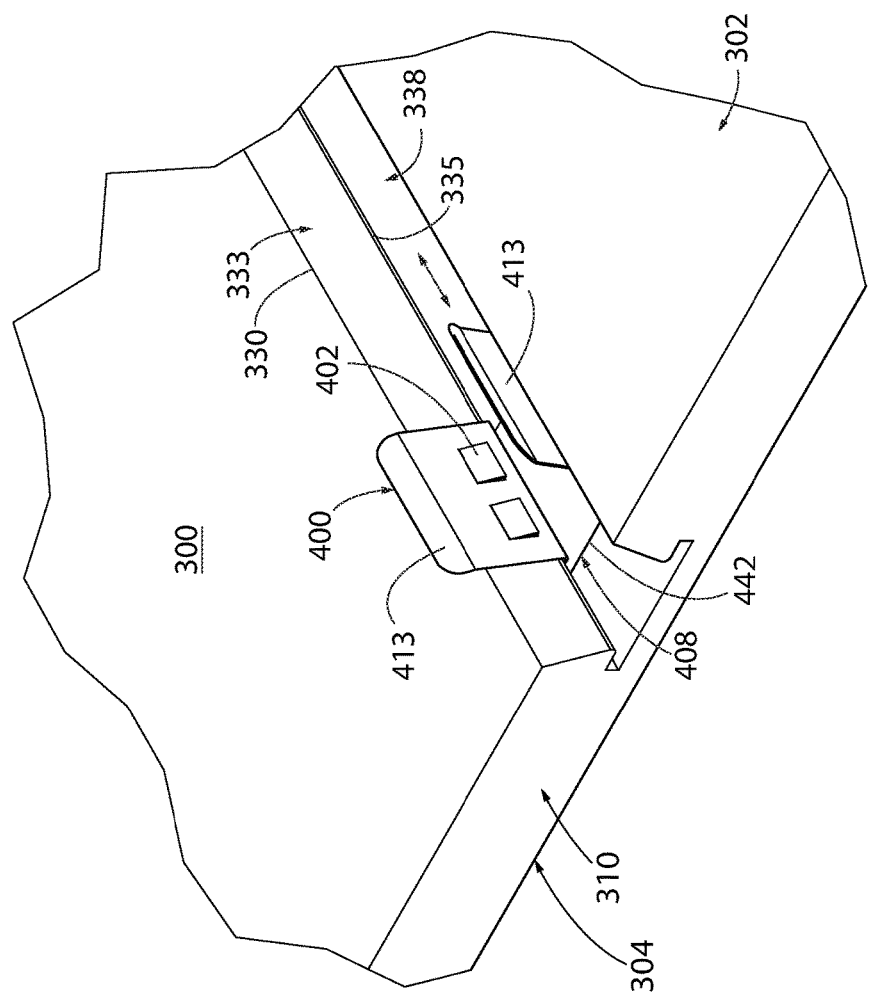
FIG. 10 is an enlarged detail X taken from FIG. 9.
Figure 11:
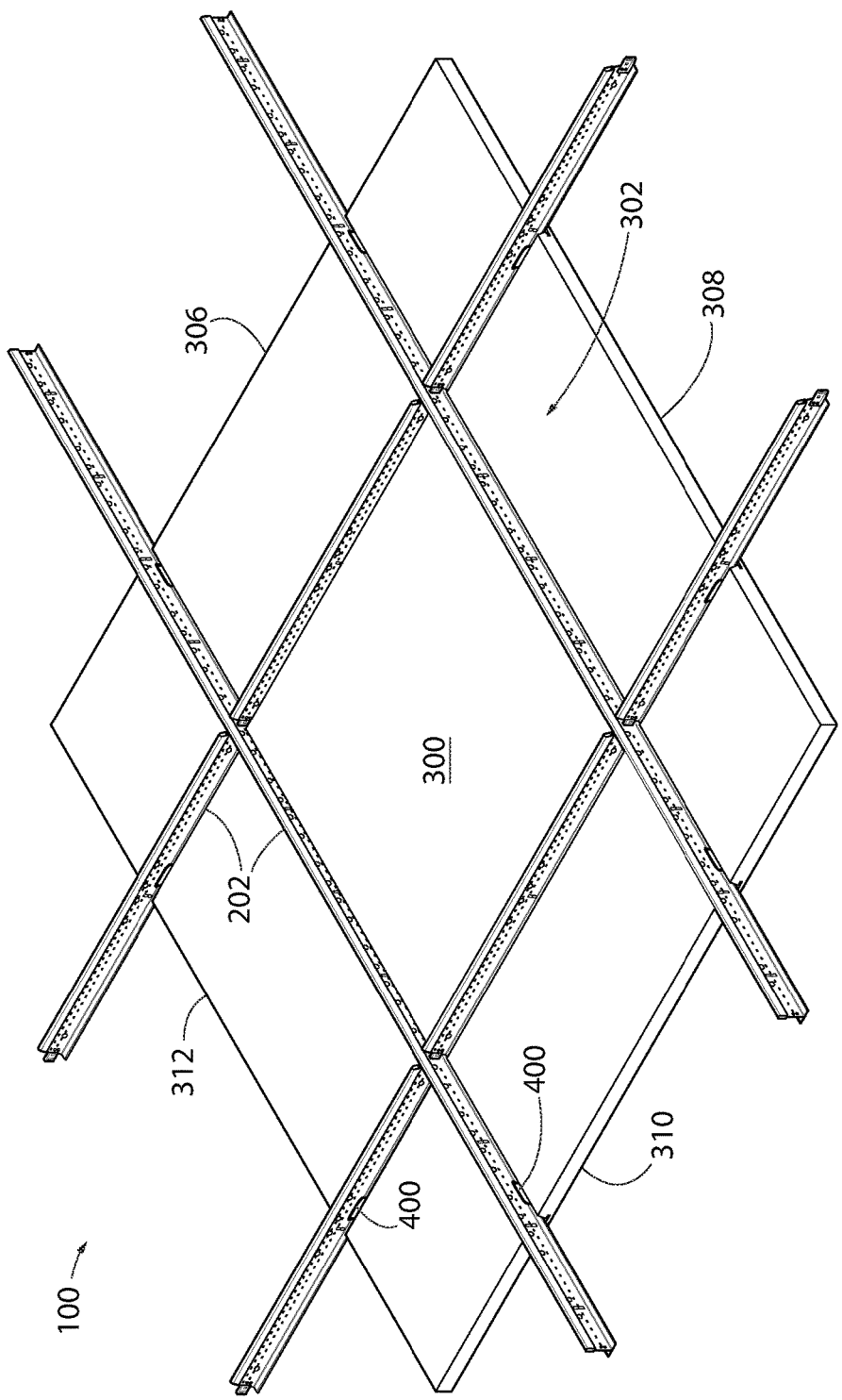
FIG. 11 is a top perspective view the fully assembled ceiling system with the ceiling tile mounted to the grid support members using the retaining clips.
Figure 12:
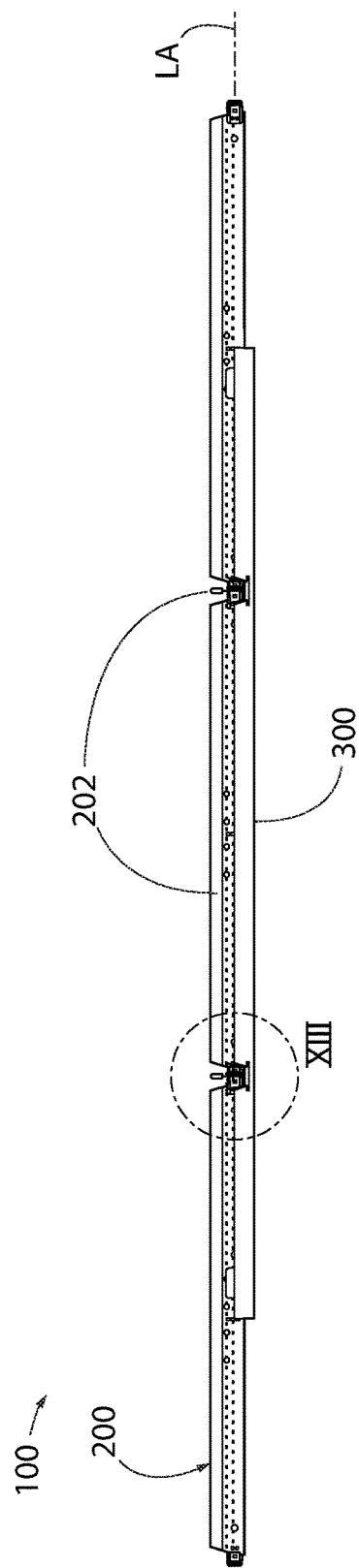
FIG. 12 is a side elevation view thereof.

When retaining clip 400 is mounted in a mounting channel 330 of the ceiling tile 300, the upper portion and top edges 403 of mounting wings 413 extend vertically above the top surface 302 of the ceiling tile as shown for example in FIGS. 7, 10, and 13. This positions the mounting wings 413 to cleanly receive and engage a grid support member 202 being inserted through the top opening 422 of the retaining clip.

Retaining clips 400 may be made of any suitable resiliently deformable metallic or non-metallic material having an elastic memory which allows mounting wings 413 and locking tabs 402 to be laterally deflected by grid support members 202 and then return towards the original undeflected position. In one preferred embodiment, retaining clips 400 may be made from spring steel or other resiliently deformable metal. In other possible embodiments, a suitably strong and resilient plastic material may be used. The retaining clips 400 may be fabricated by any suitable method (s) used in the art such as without limitation stamping, bending, extrusion, cutting, and others depending on the shape and material of construction intended for the clips.

A method or process for mounting a ceiling tile to an overhead support grid of a ceiling system will now be described. In one embodiment, the ceiling system is a concealed grid ceiling system 100. As further describe below, the grid support member 202 is vertically movable from an entrance position to a locked position in the retaining clip wherein the grid support member is locking engaged with the retaining clip.

Figure 8:
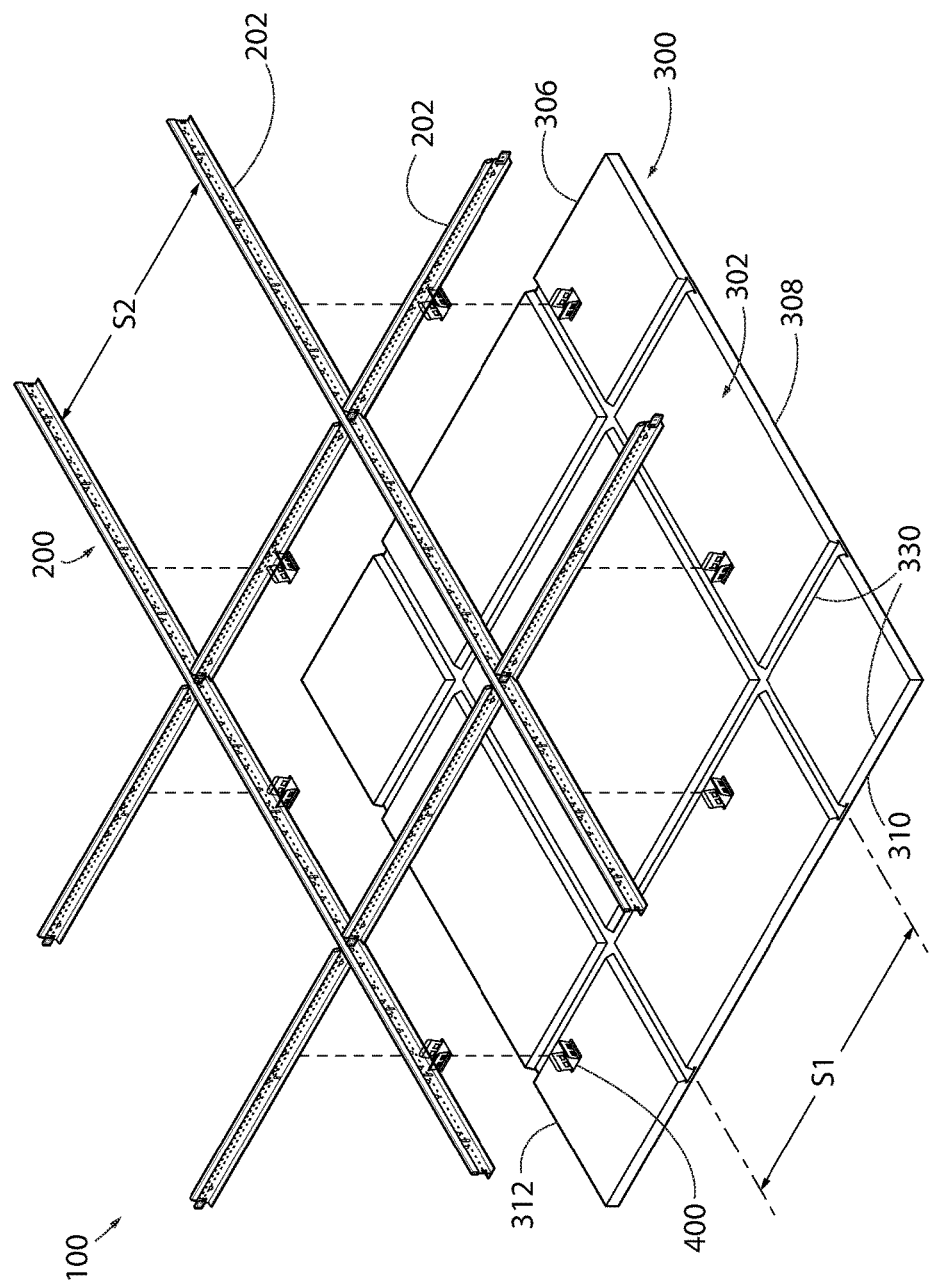
FIG. 8 is an exploded top perspective view of an unassembled ceiling system including grid support members forming a support grid, retaining clips, and a ceiling tile.

The method begins with first providing the ceiling system components, as shown for example in FIG. 8. This includes a support grid comprised of a plurality of grid support members 202 which have been preassembled and already mounted from or to an overhead support structure in the configuration shown in one exemplary embodiment, a ceiling tile 300, and a plurality of retaining clips 400.

Referring generally to FIGS. 5-13, the method continues by next installing the retaining clips 400 in the mounting channels 330 in the ceiling tile 300. The clips 400 are each laterally and slideably inserted through open ends of the mounting channels 330 formed through peripheral sides 306, 308, 310, and/or 312 of the ceiling tile 300. After initial insertion of a clip 400 into a channel 330, the installer may optionally press downwards against the mounting wings 413 to relieve the frictional engagement between the upward facing top surfaces 406 of the clip mounting flange 208 and downward facing surfaces in the lower mounting receptacle 334 of the channels 330, in the manner already described herein. The retaining clips 400 may be slid along the length of the channels between a continuum of possible axial mounting positions in the channels between the peripheral sides of the ceiling tile 300. When the desired mounting position is reached, the retaining clip 400 may be released by the installer. The clips 400 are maintained in position by frictional engagement with the mounting channels 330. The clips 400 are positioned and ready for mounting to the support grid 200. The upright mounting wings 413 of the retaining clips 400 are in an initial undeflected position.

Figure 9:
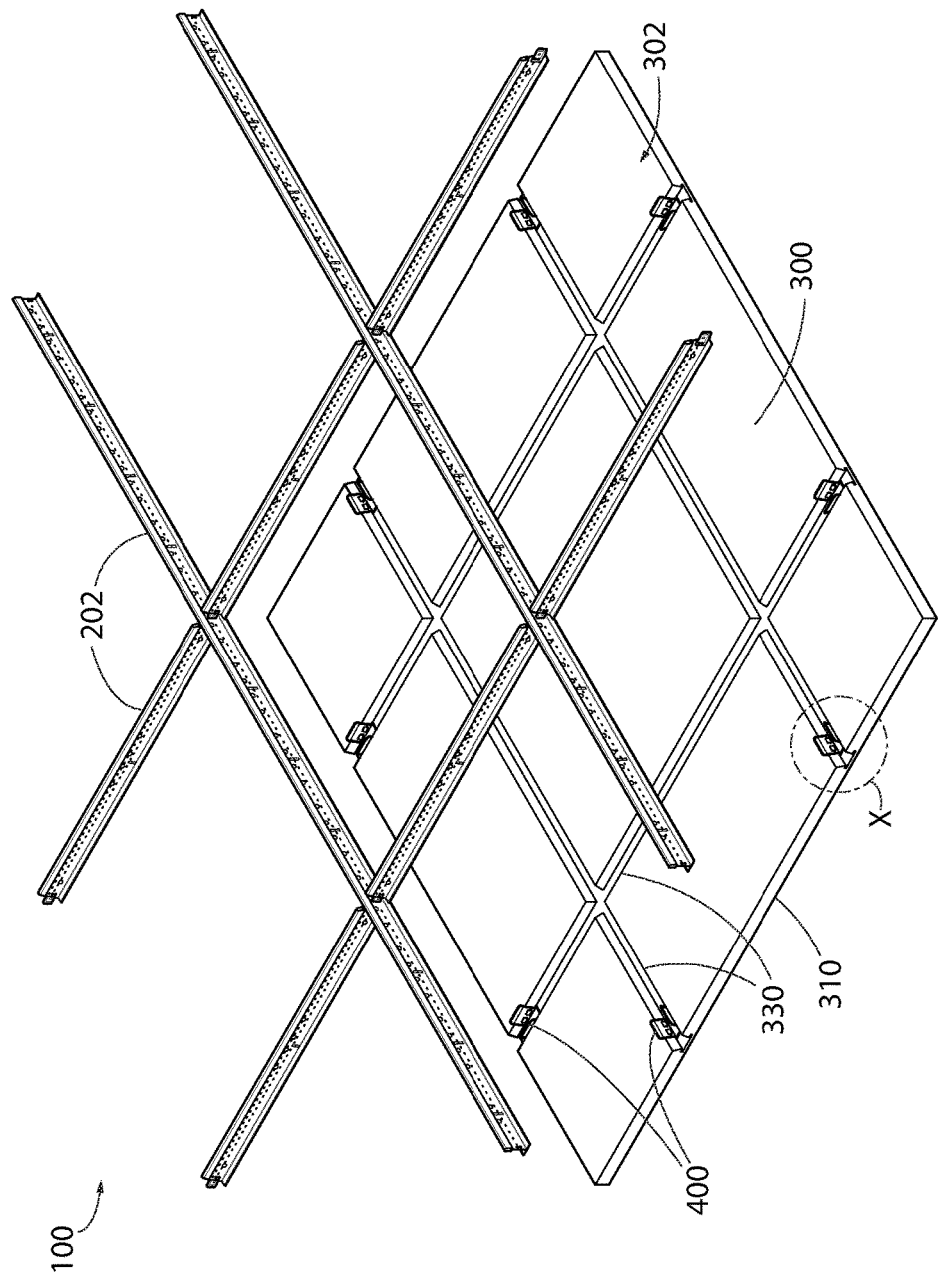
FIG. 9 is an exploded top perspective view thereof with the retaining clips installed in mounting channels formed through the top of the ceiling tile.

In one embodiment, the retaining clips 400 are preferably located so that a clip is positioned proximate to the peripheral sides of the ceiling tile in each of the mounting channels 330 (see, e.g. FIGS. 5, 9, and 10). In some embodiments, the retaining clips 400 may be spaced inwards in the channels 330 away from the peripheral sides, as shown. This retaining clip 400 position ensures that the peripheral side regions of the ceiling tile are securely mounted to the overhead support grid 200 to form relatively tight joints with and substantially flush bottom surfaces between adjacent tiles for aesthetic reasons. Additional intermediate retaining clips 400 may be provided between the peripherally-located clips for added support, as needed depending on the size and weight of the ceiling tile 300.

With the retaining clips 400 now installed in the foregoing mounted positions in mounting channels 330, the ceiling tile 300 is raised vertically upwards towards the support grid 200 so that the ceiling tile is proximate to the grid (see, e.g. FIG. 9). The horizontal position and orientation of the ceiling tile 300 may be adjusted so that the retaining clips 400 are each vertically aligned with a corresponding grid support member 202. Since the installer is located below the ceiling tile 300 during installation, the support members 202 above the tile cannot generally be viewed directly. However, because the grid support members 202 each form axially aligned runners and cross-pieces with remaining exposed support members, the installer can approximate the proper horizontal position of the ceiling tile as needed.

The installer next raises the ceiling tile 100 vertically upwards against the overhead support grid 200, preferably creating light contact initially. The horizontal position and orientation of the ceiling tile 300 may be adjusted so that the bottom flanges 210 of the grid support members 202 are horizontally and vertically centered over the top openings 422 of the retaining clips 400 so that the vertical centerlines CV1 and CV2 of the retaining clips and ceiling tile mounting channels 330 are substantially aligned. The widened top opening 422 of the retaining clips 400 facilitates this positioning. Because the top edges 403 of the retaining clips 400 are raised above the top surface 302 of the ceiling tile, the installer can generally determine by feel that the bottom flanges 210 of the grid support members 202 are properly aligned with the top openings 422 of the retaining clips 400. At this point in the installation process, the retaining clips 400 are not lockingly engaged with the grid support members 202.

With the retaining clips 400 now properly aligned with the grid support members 202, the ceiling tile 300 is further raised vertically upwards towards the support grid 200. The bottom flange 210 of each grid support member 202 travels downwards in cavity 420 from the top opening 422 of the retaining clip 400 towards the bottom mounting flange 408 of the retaining clip. As the cavity 420 of the retaining clip 400 gradually narrows towards the bottom (see, e.g. FIG. 7 entrance width W4 to throat portion 450 width W1), the longitudinally extending lateral edges 214 of the bottom flange 210 moves downwards and may slidingly engage one or both inner bearing surfaces 416 of the retaining clip 400 depending on the width W5 of the grid support member mounting flange 210 and of the cavity at different portions. Accordingly, in some embodiments, the opposed lateral edges 214 of the bottom flange 210 may mutually engage portions of the inner bearing surfaces 416 on each mounting wing 413 above the locking tabs 402, which would deflect the elastic mounting wings 413 laterally outwards in opposing directions and narrows the width of gap G formed on each side of the retaining clip (reference FIGS. 7 and 13). In other embodiments, the opposed lateral edges 214 of the bottom flange 210 may not engage portions of the inner bearing surfaces 416 on each mounting wing 413 above the locking tabs 402, in which case no deflection of the mounting wings would occur.

Eventually, lateral edges 214 of the bottom flange 210 on the grid support member 202 approach and slidingly engage the locking tabs 402 of the retaining clip 400. This gradually deflects the tabs 402 laterally outwards farther and farther as the support member 202 progresses downward in the retaining clip. In some embodiments, the locking tabs 413 may be somewhat rigidly structured in relation to the mounting wings 413 so that the grid support member 202 deflects and spreads the mounting wings outward with the locking tabs. In other possible embodiments, the locking tabs 402 alone may be deflected towards the mounting wings 413 or both the locking tabs and mounting wings may be spread apart by the mounting flange 210 of the grid support member 202.

In any of the foregoing deflection scenarios, the locking tabs 402 are spread apart by sufficient horizontal distance to allow the opposed lateral edges 214 of the bottom flange 210 on the grid support member 202 to pass by the locking tabs. Once the lateral edges 214 reach a position below free end 402b of the retaining clip 400 (see also FIGS. 1-4), the locking tabs 402 snap back inwards engaging the top surface 204 of the bottom flange 210 near the lateral edges 214 of grid support member 202, as shown in FIGS. 13 and 14. The mounting wings 413 and/or locking tabs 402 alone may each return inwards to a substantially undeflected position. The ceiling tile 300 is now snap-fit and lockingly engaged with the overhead support grid 200 in a fully mounted position. The locking tabs 402 of the retaining clip 400 are substantially aligned in the same horizontal plane P1 as the bottom mounting flanges 210 of the grid support members 202 when the ceiling tile 300 is fully mounted to the support grid 200. As best shown in FIG. 14, the lateral edges 214 of the grid support member 202 are trapped between the free ends 402b of locking tabs 402 and inner bearing surface 416 in the narrowed throat portion 450 of the retaining clip 400 because the throat portion has a smaller width W1 than width W5 of the grid support member mounting flange 210. The grid support member 202 cannot be vertically withdrawn from the retaining clip 400 without first forcing the locking tabs 402 back outwards to disengage the tabs from the bottom mounting flange 210, and then raising the grid support member 202 upwards by simultaneously lowering the ceiling tile 300. When the ceiling tile is mounted to the support grid 200, the locking tabs 402 of the retaining clip 400 are generally accessible from only above the ceiling tile 300.

It should be noted that the foregoing ceiling tile snap-fit mounting mechanism creates an audible "click" to confirm to the installer that the ceiling tile 300 has been fully and properly mounted. Advantageously, this assists signals installers who cannot directly see the engagement between the retaining clips 400 and the grid support members 202.

The foregoing ceiling tile installation process may be repeated as necessary to add additional ceiling tiles 300 to the support grid 200.

It will be appreciated that the ceiling tile 300 mounting system described herein advantageously does not limit the shape of ceiling tiles that may be used. The mounting is controlled by the pattern/arrangement and lateral spacing of the overhead grid support members 202 and their mating mounting channels 330 formed in the top surface 302 of the ceiling tile 100 which hold the retaining clips 400. The arrangement of the grid support members 202 and mounting channels 330 is therefore independent of the shape of the ceiling tile used. Accordingly, ceiling tiles 300 may be used having different shapes than the openings 208 formed by the grid support members 202 and the layout of the mounting channels 330.

Although a square rectilinear ceiling tile is shown herein for describing one possible non-limiting embodiment, the invention is not limited to such rectilinear shapes (e.g. square, rectangular) alone. Other polygonal shapes (e.g. diamond, triangular, hexagon, etc.) and combinations of shapes may be used for ceiling tiles and mounted to an overhead support grid in accordance with the ceiling tile mounting system disclosed herein.

Second Inventive Concept—Ceiling System with Concealed Support Grid

A ceiling system includes a grid support member, and first and second ceiling panels abutted at a joint. In the factory-supplied condition, each panel has a facing sheet already adhesively bonded to a central region of the panel. Perimeter portions of the facing are left un-bonded to an annular peripheral region of the surface surrounding the central region. This allows seams to be made in the field. The facing sheet comprises a cantilevered flap extending beyond a peripheral edge of the panel. During field installation, the flap of a first panel extends across the joint overlapping the second panel's un-bonded facing sheet in the peripheral region. The double thickness of facings is cut to form a seam laterally offset from the joint, which is concealed. A field applied or activated adhesive bonds the facing to the peripheral regions of each panel. A related installation method is disclosed.

Figure 16:
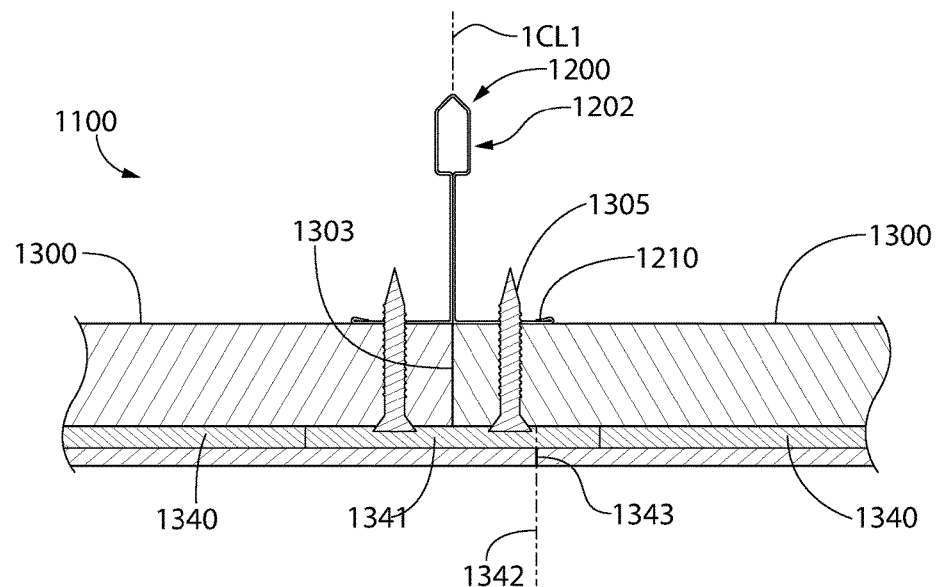
FIG. 16 is a side elevation cross-sectional view of a ceiling system according to the present disclosure comprising a grid support member and ceiling panels with peripheral edges forming a butt joint therebetween.
Figure 31:
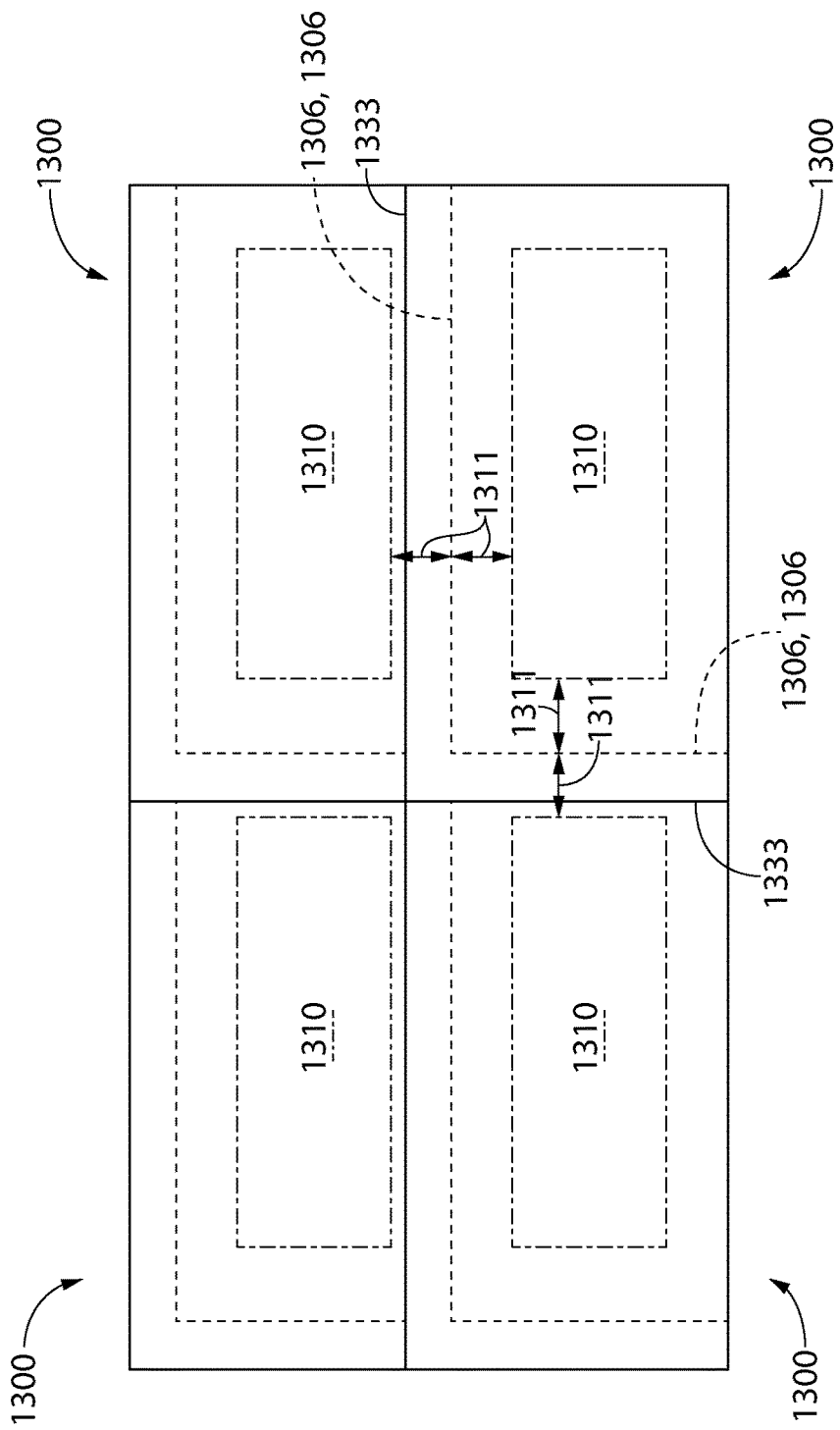
Figure 32:
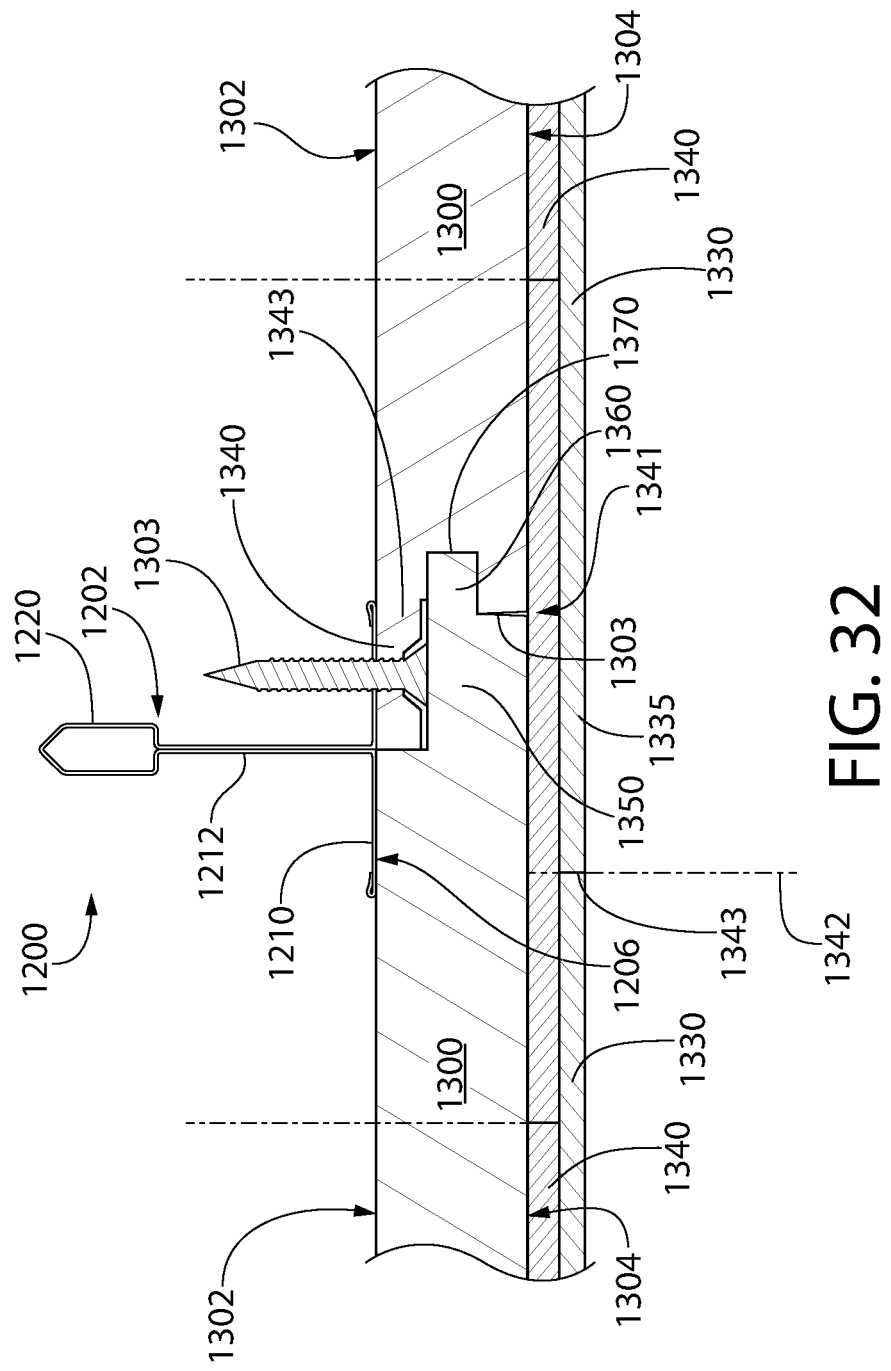
FIG. 32 is a side elevation cross sectional view showing an alternative construction of ceiling panels with peripheral edges having a hybrid edge detail forming an interlocked joint therebetween.

FIG. 16 depicts an exemplary embodiment of a ceiling system 1100 according to the present disclosure. The ceiling system 1100 includes an overhead support grid 1200 including a plurality of overhead longitudinal grid support members 1202 and ceiling panels 1300 supported by the grid support members. The grid support members 1202 are mountable in a suspended manner from an overhead building support structure. The system may include at least two panels 1300 having abutted peripheral edges which form a joint 1303 therebetween. In one embodiment, the joint may be formed beneath the grid support member 1202 as seen in FIG. 31. The panels 1300 may be directly mounted to the grid support members 1202 in one arrangement by any suitable means, for example without limitation threaded fasteners 1305 which are driven through the panel and grid support member as shown. In embodiments as shown in FIG. 32, an interlock fit between the ceiling panels 1300 allows a first panel to be secured to the grid support member 1202 while the other panel is supported by the peripheral edge of the first panel. Other suitable panel mounting arrangements and methods are possible to hang the panels and form the joint.

Figure 22:
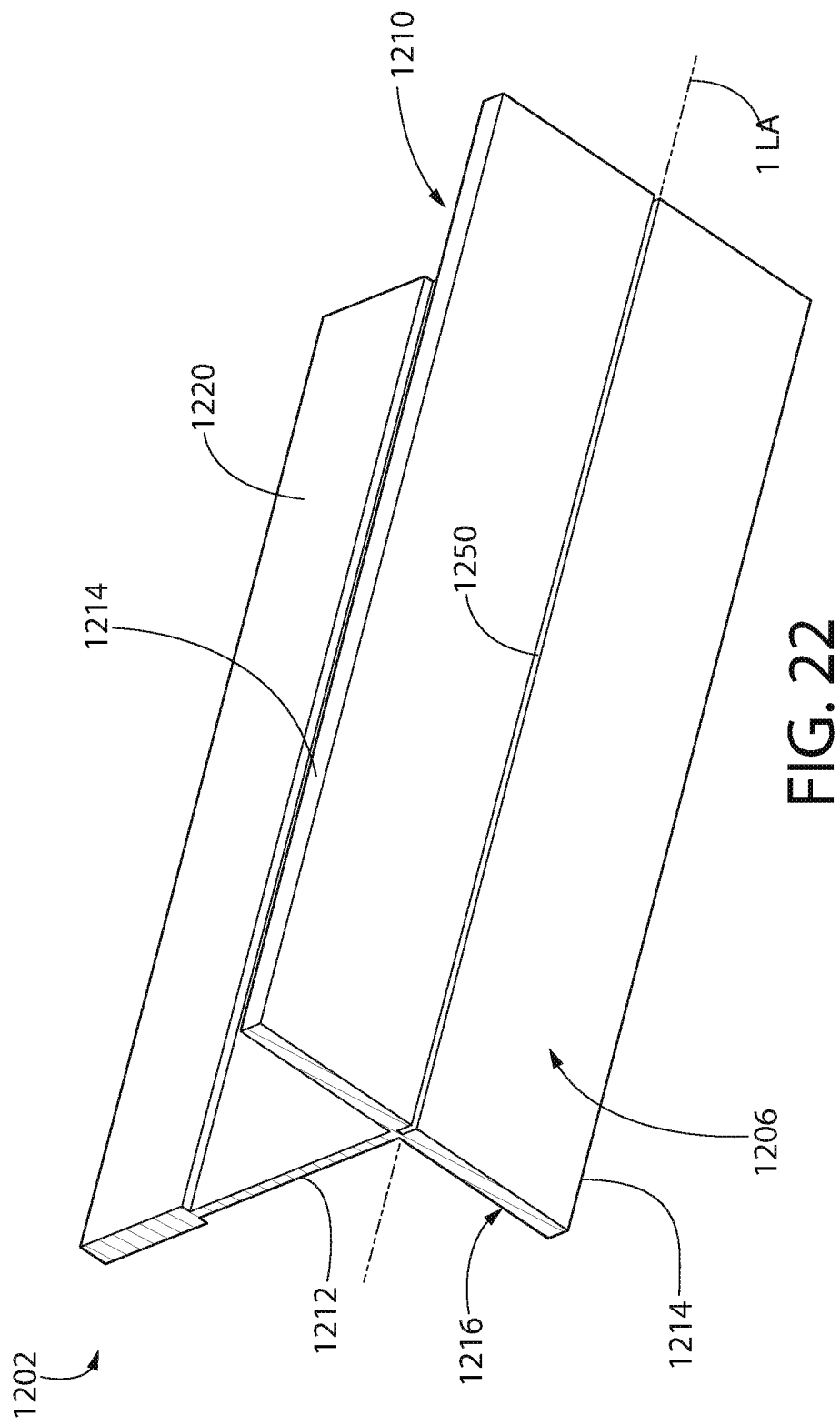
FIG. 22 is a bottom perspective view of the grid support member.

Referring additionally to FIGS. 16 and 22, grid support members 1202 are elongated in shape having a length greater than their width (e.g. at least twice), and in various embodiments lengths substantially greater than their widths (e.g. 3 times or more). The grid support members 1202 may form "runners" or "rails" and are laterally spaced apart and oriented parallel to each other to position a ceiling panel 1300 therebetween. In some embodiments, the longitudinal grid support members 1202 may be maintained in a substantially parallel spaced apart relationship to each other by lateral grid support members (not shown) attached between adjacent (but spaced apart) grid support members 1202 at appropriate intervals using any suitable permanent or detachable manner of coupling.

In one embodiment, grid support members 1202 may be horizontally oriented when installed. It will be appreciated, however, that other suitable mounted orientations of grid support members 1202 such as angled or sloped (i.e. between 0 and 90 degrees to horizontal) may be used. Accordingly, although support members 1202 may be described in one exemplary orientation herein as horizontal, the invention is not limited to this orientation alone and other orientations may be used.

Grid support members 1202 may be T-shaped (e.g. T-rails) in transverse cross section. The grid support members have an inverted T-shaped configuration when in an installed position suspended from an overhead building ceiling support structure. The grid support members 1202 may be suspended from the building ceiling support structure via an appropriate hanger mechanism, such as for example without limitation fasteners, hangers, wires, cables, rods, struts, etc.

Grid support members 1202 in one non-limiting configuration may each include a longitudinally-extending horizontal bottom flange 1210, an enlarged top stiffening channel 1220, and a vertical web 1212 extending upwards from the flange to the stiffening channel. In some embodiments, the top stiffening channel 1220 may be omitted. The grid support members 1202 each define a respective longitudinal axis LA and axial directions. Bottom flange 1210 has opposing portions which extend laterally outwards from web 1212 and terminate in opposed longitudinally extending parallel edges 1214. Web 1212 may be centered between the edges 1214 and vertically aligned with the centerline 1CL1 of the grid support member in one non-limiting embodiment. In other embodiments, the web 1212 may be laterally offset from centerline 1CL1. Bottom flange 1210 further defines a bottom surface 1206 facing downwards away from the flange and towards a room or space below the support grid 1200. Bottom surface 1206 defines a horizontal ceiling reference plane or "grid face" for the overhead support grid 1200. Flange 1210 further defines a top surface 1216 opposite the bottom surface for attaching and supporting the ceiling panel 1300 in some embodiments.

Grid support members 1202 may be made of any suitable metallic or non-metallic materials structured to support the dead weight or load of ceiling panels 1300 without undue deflection. In some non-limiting embodiments, the grid support members may be made of metal including aluminum, titanium, steel, or other. In one embodiment, the grid support members 1202 may be a standard heavy duty 15/16 inch aluminum T-rail. Other shapes of grid support member structures that may be used include solid or hollow square or rectangular structural cross-sections and others.

Referring now FIGS. 16-21, ceiling panel 1300 may have a generally flattened rectilinear acoustic panel body 1301 with a substantially greater horizontal width and length than vertical thickness as shown. Ceiling panel 1300 includes a top surface 1302, bottom surface 1304, and peripheral edges 1306 extending therebetween along four sides of the panel. In various embodiments, the peripheral edges may have various edge profiles including straight edges, angled or sloped edges, stepped tegular edges, shiplap edges, tongue and groove edges, or hybrid edges as shown in FIG. 32 combining a shiplap and tongue and groove features. Other edge profile configurations are possible. Top and bottom surfaces 1302, 1304 may be generally planar or flat and arranged substantially parallel to each other in one non-limiting embodiment. In other arrangements, the top and bottom surfaces may be angled with respect to each other.

Ceiling panels 1300 have acoustic panel bodies 1301 may be constructed of any suitable sound-absorbing material including without limitation mineral fiber board, fiberglass, jute fiber, wood, composites, or other. In addition, the ceiling panels 1300 may have any suitable dimensions and shapes (in top plan view) including without limitation square or rectangular with unequal length sides.

Figure 18:
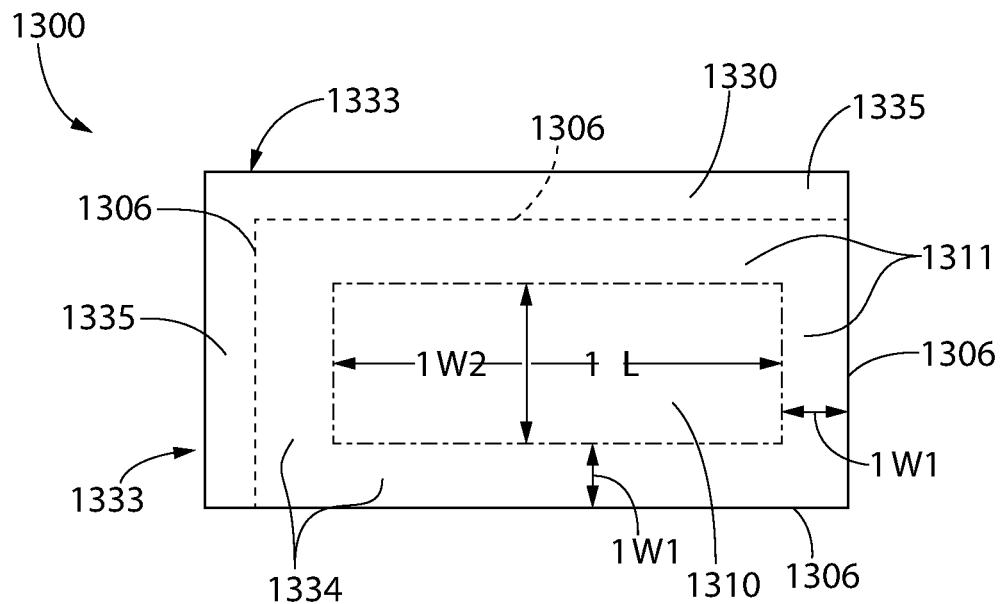
FIG. 18 is a top plan view of the ceiling panel.
Figure 19:
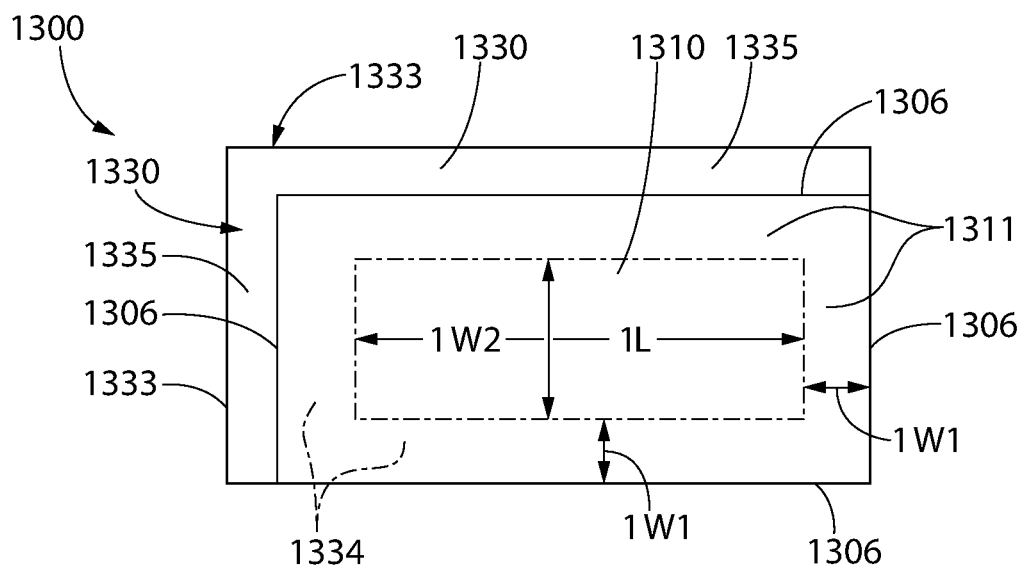
FIG. 19 is a bottom plan view thereof.
Figure 20:
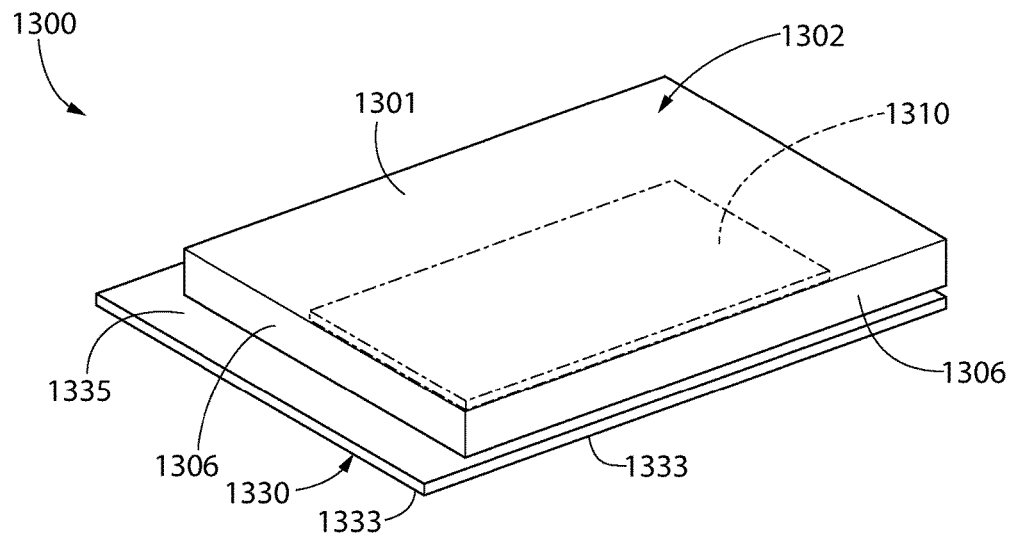
FIG. 20 is a top perspective view thereof.
Figure 21:
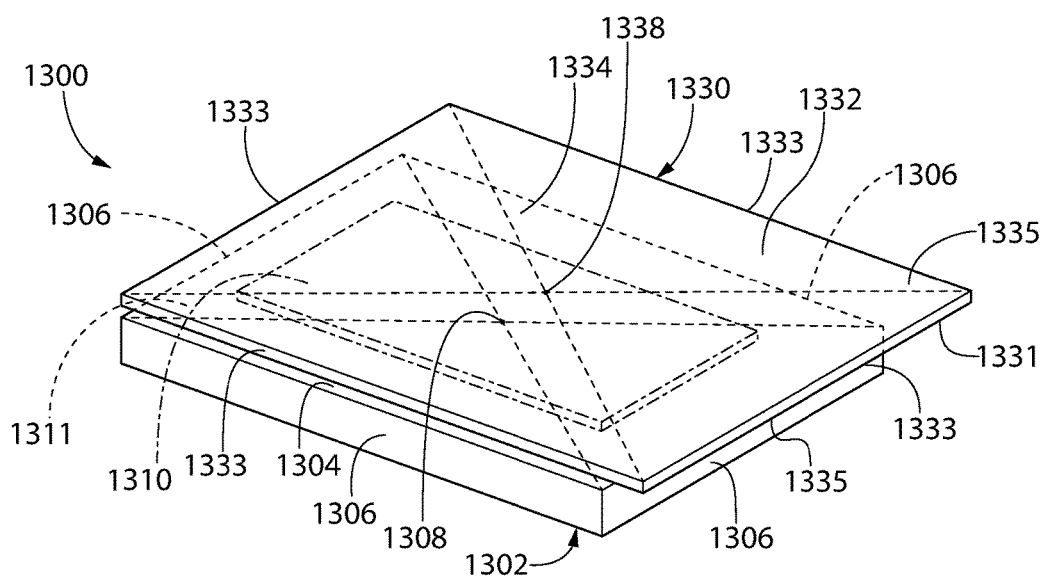
FIG. 21 is a bottom perspective view thereof.

The bottom surface 1304 of the ceiling panel 1300 defines a central region 1310 and annular peripheral region 1311 which surrounds the central region. The peripheral region 1311 extends between the central region and each of the peripheral edges 1306 of the panel forming a frame around the central region, as best shown in FIGS. 18 and 19. The central region 1310 and peripheral region may each have a rectilinear shape in bottom plan view for reasons which will become apparent. In one, peripheral region 1311 has a width 1W1 which is smaller than the width 1W2 and length 1L of the central region 1310. The width 1W2 provides a corresponding distance between the peripheral edges 1306 of the ceiling panel 1300 and the central region 1310 for fitting and cutting adjoining facing sheets during the field installation.

Ceiling panel 1300 further includes a factory-mounted bottom facing sheet 1330 which is attached to the bottom surface 1304 of panel body 1301 during fabrication of the panel at the factory prior to shipping. This ensures that the facing sheet has the proper orientation and dimensions desired with respect to the panel body 1301. In one embodiment, the facing sheet 1330 covers at least the entire bottom surface 1304 of the ceiling panel 1300. Facing sheet 1330 has a thin flat structure and may be rectilinear in shape (bottom plan view) including a top surface 1331, opposing bottom surface 1332, and plurality of perimeter edges 1333 extending therebetween around the sheet. The perimeter edges 1333 are straight in one embodiment such that each edge is oriented perpendicular to the two adjoining edges which meet at the corners of the sheet. Preferably, the facing sheet is formed of a single monolithic unitary sheet of material rather than being an amalgamation of separate sheets seams together. In other less preferred but suitable embodiments, however, the facing sheet 1330 may be formed of two or more sheets of material seamed together.

In one non-limiting embodiment, facing sheet 1330 may be adhesively bonded to only the central region 1310 of the bottom surface 1304 of ceiling panel 1300 at the factory with a suitable factory applied thin adhesive film or layer 1340. Industrial adhesives which may be used include Swift® tak water-based adhesives from H.B. Fuller Company and others. The annular perimeter portions 1334 of the facing sheet 1330 (which correspond in position to at least the underlying annular peripheral portion 1311 of the panel bottom surface 1304) are not adhesively bonded to the peripheral portion to allow for field fitting, cutting, and seaming of the facing during installation of the ceiling system 1100, as further described herein.

Figure 6:
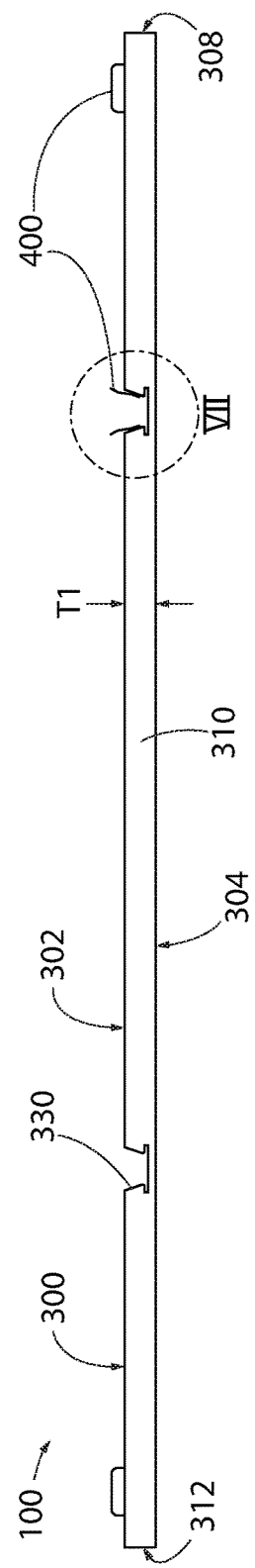
FIG. 6 is a side elevation view thereof.

As demonstrated by FIG. 6, the acoustic panel body 1301 may have a panel center point 1308, which is a point on the bottom surface 1304 of the acoustic panel body 1301 and equidistant between opposing peripheral edges 1306 of the acoustic panel body 1301. The facing sheet 1330 may have a sheet center point 1338, which is a point on the bottom surface 1334 of the facing sheet 1330 that is equidistant between opposing peripheral edges 1333 of the facing sheet 1330. The panel center point 1308 and the sheet center point 1338 may be offset from one another by a distant that is parallel to the bottom surface 1304 of the acoustic panel body 1301.

In some embodiments, the bottom facing sheet 1330 may be in the form of a scrim comprised of laminated non-woven glass fibers in a resin matrix. This type construction is suitable for high end acoustical panels to impart a smooth visual appearance, durability, and dimensional stability. Other suitable scrim materials may be used for the bottom facing sheet 1330 and are available from suppliers such as Owens Corning, Lydall, Ahlstrom, and Johns Manville. Such materials may include films, sheets, woven materials and open cell foamed materials.

Figure 17:
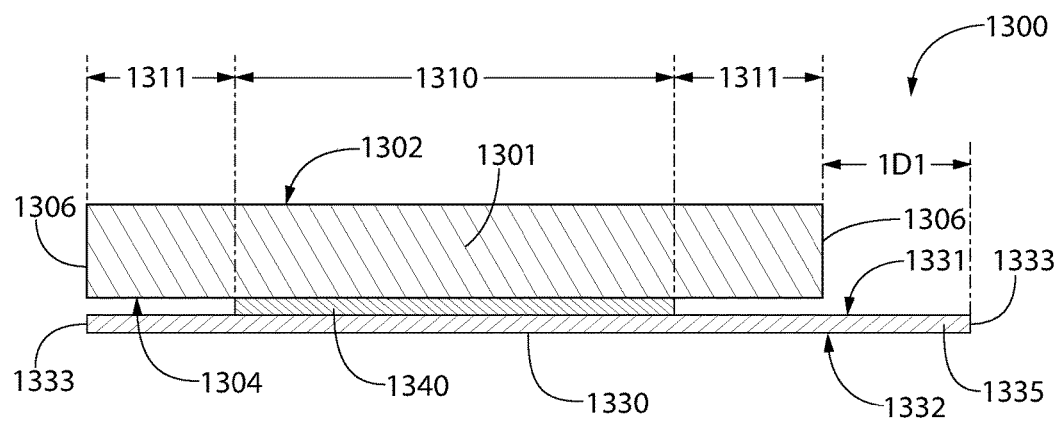
FIG. 17 is a side elevation cross section view of one of the ceiling panels of FIG. 16.

Referring to FIGS. 16-27, the perimeter portion 1334 of bottom facing sheet 1330 in one embodiment forms at least one cantilevered extension or flap 1335 that projects laterally outwards in a horizontal direction beyond at least one peripheral edge 1306 of the ceiling panel 1300 by a distance 1D1 (identified in FIG. 17). Accordingly, bottom facing sheet 1330 has a larger horizontal length or width in at least one direction measured between opposite perimeter edges 1333 than the corresponding length or width of the ceiling panel 1300 in that same direction measured between opposite peripheral edges 1306. In one embodiment, the flap 1335 is continuous and extends in uninterrupted manner along the entire peripheral edge 1306 of the ceiling panel from corner to corner as shown. The unsupported flap 1335 allows the facing sheet 1330 to extend across and over the joint 1303 beneath the grid support member 1202 to an adjoining ceiling panel 1300 and at least partially across the peripheral region 1311 of that adjoining panel, thereby concealing the panel joint.

In some embodiments, two laterally extending cantilevered flaps 1335 are formed from bottom facing sheet 1330 on adjacent peripheral edges 1306 of the ceiling panel 1300 which meet at a corner, as shown in the illustrated embodiment. Accordingly, a long side and an adjoining short side of the panel each include a facing flap 1335. The perimeter portion 1334 of the facing sheet on the remaining panel peripheral edges 1306 opposite each of the flaps does not extend beyond their respective peripheral edge, and in some embodiments may terminate at a point before the peripheral edge somewhere within the outer peripheral region 1311 on the ceiling panel bottom surface 1304. The peripheral region 1311 forms a cutting zone for cutting and seaming the facing sheets from two adjoining ceiling panels. When the ceiling panels 1300 are installed in the ceiling system 1100 as shown in FIGS. 28-31 to be further described herein, this arrangement of flaps on two sides alone is sufficient to cover the ceiling panel joints without leaving any portions of the panel bottom surfaces exposed, while minimizing the amount of excess facing which needs to be removed by the installer. However, in other embodiments contemplated, the facing sheet 1330 may be configured to form unsupported cantilevered flaps 1335 along all peripheral edges 1306 of the panels 1300.

A method for installing a ceiling system and seaming factory-installed facing during field installation of the system according to the present disclosure will now be described. FIGS. 23-27 illustrate sequential steps in one non-limiting embodiment of the process; however, it will be appreciated that variations are possible. The grid support member 1202 from which either one or both of the ceiling panels are supported (depending on the edge profile design of the panels selected) is shown only in FIGS. 23 and 24 for clarity in showing the remaining steps in the facing seaming process.

Figure 23:
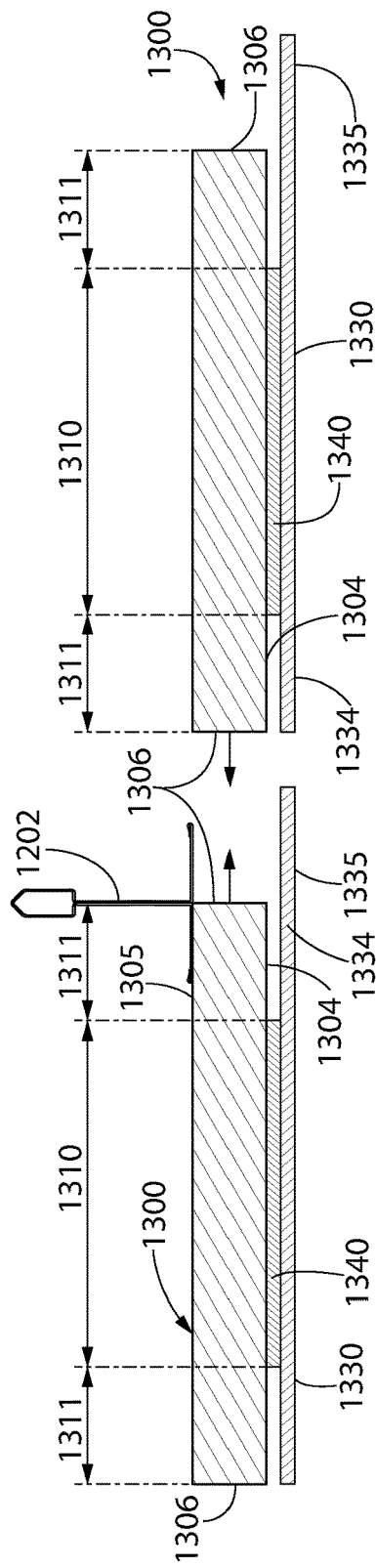
Figure 24:
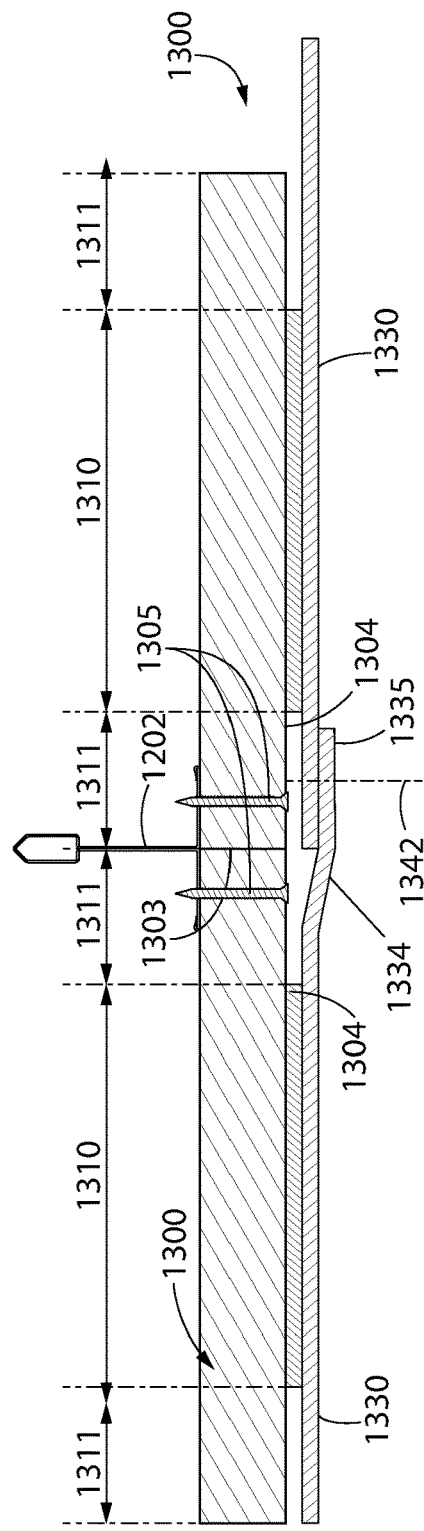

Referring to FIG. 23, first and second ceiling panels 1300 to be joined are provided and transported to the field installation site. Each panel includes a facing sheet 1333 which is pre-mounted to the bottom surfaces 1304 in the factory with the factory-applied adhesive layer 1340 as already described herein. The facing sheet is only adhesively bonded to the bottom surface central region 1310 of each panel, and not the peripheral regions 1311. The panels 1300 are positioned beneath grid support member 1202, which is mounted to an overhead ceiling support structure of the building. The first ceiling panel 1300 may be mounted to the grid support member via fasteners 1305 or another suitable mounting mechanism by pulling back the facing sheet to access bottom surface of ceiling panels for installing mounting hardware. The peripheral edges 1306 of the panels are then abutted (or interlocked in the embodiment of FIG. 32) by laterally engaging the edge of the second ceiling panel with the first, thereby forming field joint 1303 between the panels as shown in FIG. 24. Once positioned, the second ceiling panel 1300 may then be mounted to the grid support member 1202 and/or first ceiling panel for support.

As seen in FIG. 24, the adjoining ceiling panels 1300 are oriented and mounted so that peripheral edge 1306 of one first panel has a cantilevered facing flap 1335 adjacent the joint (e.g. left panel in this figure) and the other second panel (right panel) has a mating edge that does not have a flap (i.e. facing sheet 1330 not extending beyond the peripheral edge of the second panel). The flap 1335 extends across and under the joint 1303 and overlaps the un-bonded or un-adhered perimeter portion 1334 of the facing sheet 1330 on the second ceiling panel 1300, thereby forming a double thickness of facing material in the peripheral region 1311 of the second panel's bottom surface 1304.

The next step involves establishing a cut line 1342 in the double thickness of facings 1333 which is laterally offset from the panel joint 1303 and lies somewhere within the peripheral region 1311 of the second (right) ceiling panel 1300. As shown in FIG. 10, a knife blade or other sharp edged cutting tool 1345 is run linearly along the cut line 1342 (i.e. into the sheet shown in the figure) to cut through the overlapping double facings 1330 of the first ceiling panel 1300 (i.e. flap 1335) and second ceiling panel. The excess severed pieces or end segments 1343, 1344 of the facing sheets 1330 (which would be strips of facing in actuality) are then removed and discarded, thereby leaving an abutment seam 1343 between the adjoining facings 1330 which is located in the peripheral region 1311 of the second ceiling panel (right) as shown in FIG. 26. The ceiling panel joint 1303 is concealed beneath the facing sheets; specifically the facing sheet 1330 of the first ceiling panel on the right. The seam 1343 is laterally offset from the ceiling panel joint.

Figure 27:
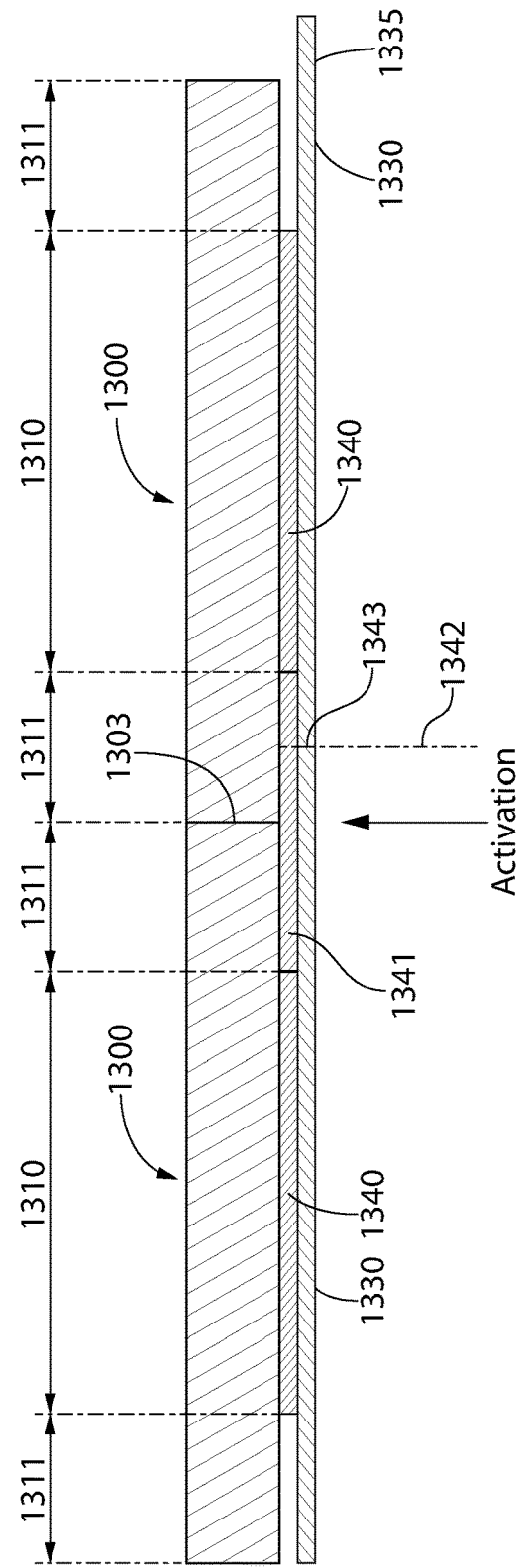
Figure 28:
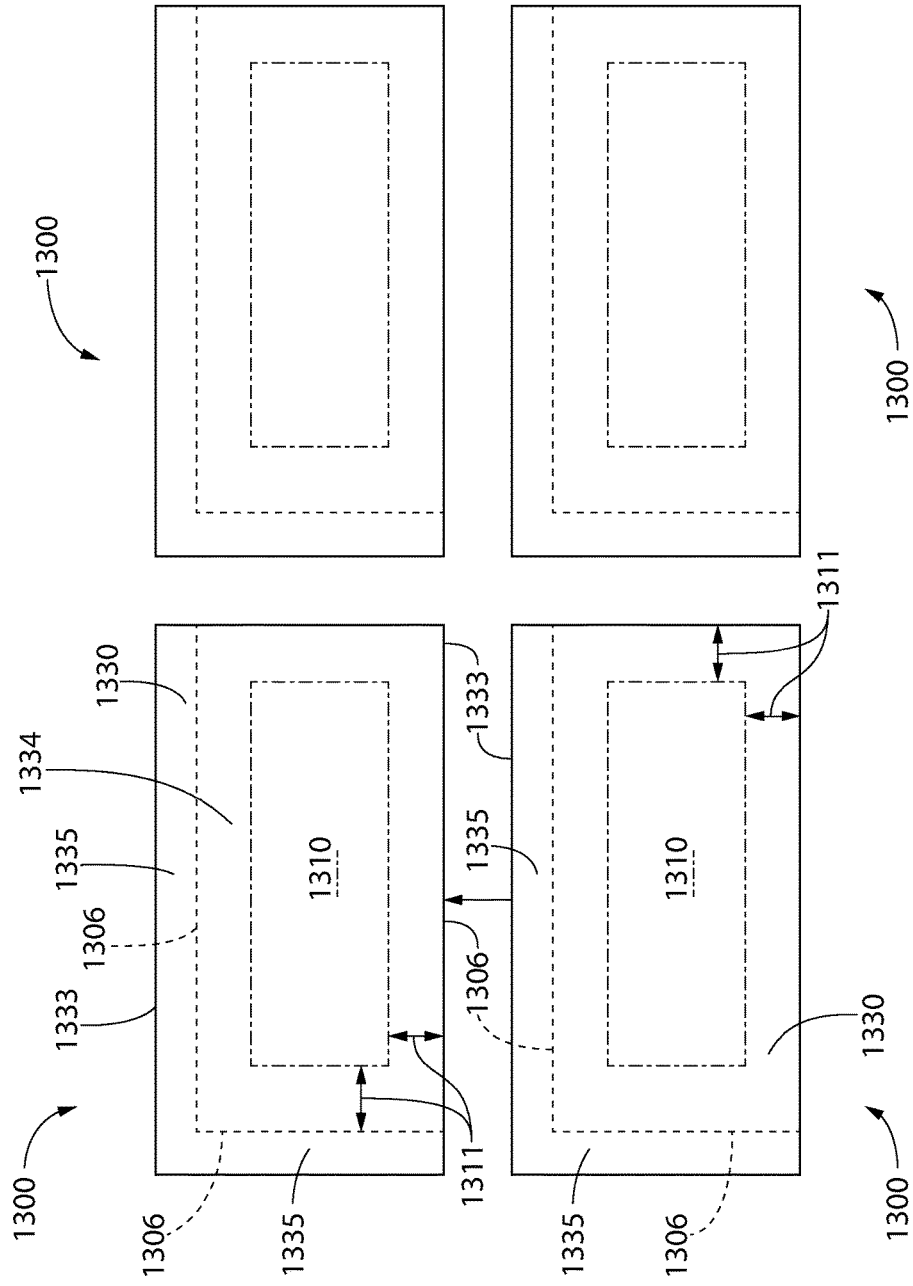
FIGS. 28-31 are bottom plan views illustrating sequential steps in a method for assembling an array of ceiling panels prior to cutting and trimming the facing sheets on the bottom surfaces of the panels.
Figure 29:
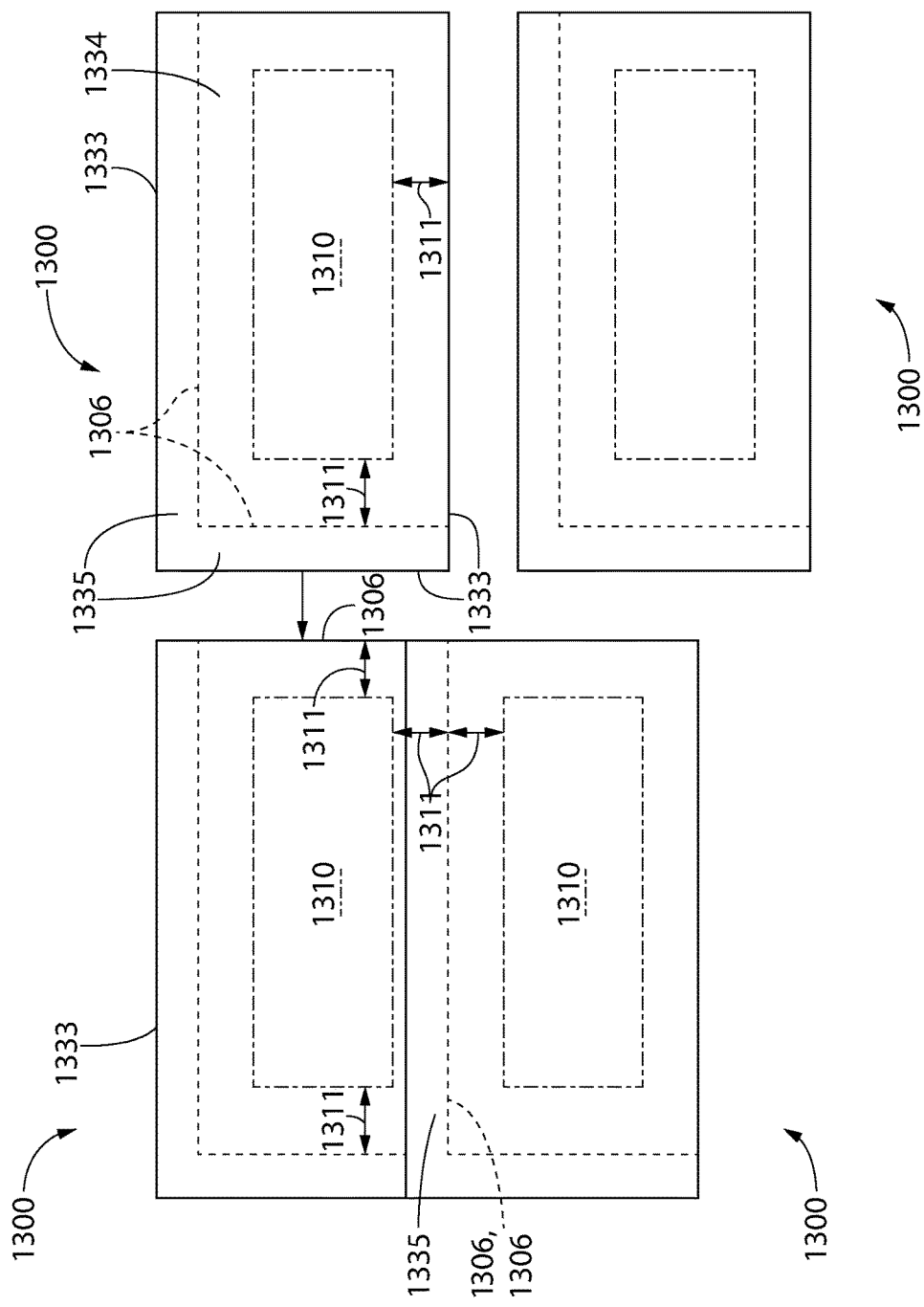
Figure 30:
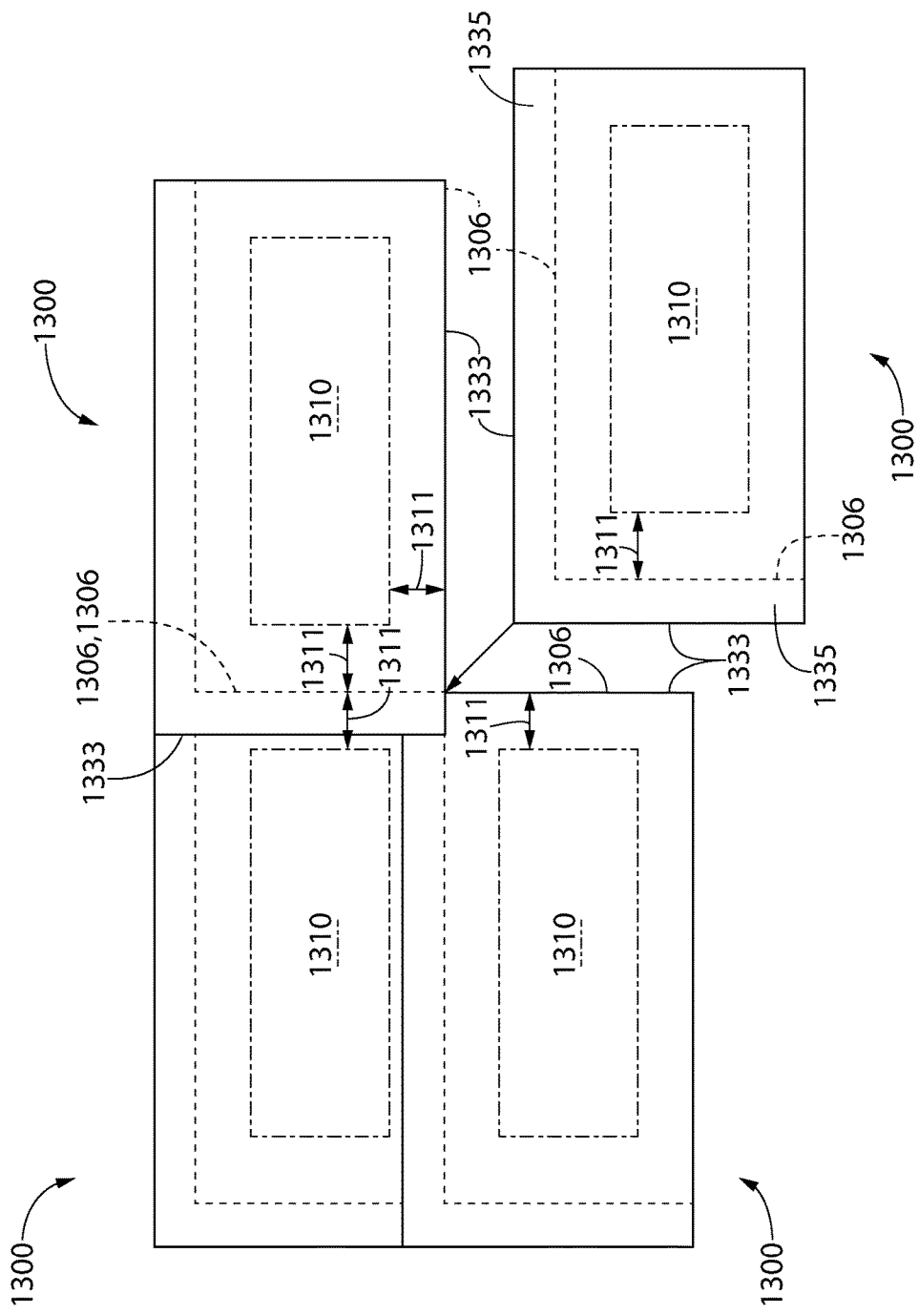

For attaching and bonding the perimeter portions 1334 of the facing sheets 1330 to bottom surfaces 1304 of both the first and second ceiling panels of each panel, a suitable adhesive layer 1341 is then applied and/or activated in the field to the peripheral regions 1311 of each panel. The facing sheets are contacted with the field adhesive layer to complete the facing bonding and seaming process, as shown in FIG. 27. The field applied or activated adhesive layer 1341 covers the portions of the ceiling panels in the joint area between the central regions 1310 which were previously already adhered to the panels at the factory. In some embodiments, an inactivated adhesive layer may be pre-applied to the peripheral regions of the ceiling panel bottom surfaces 1304 in the factory prior to shipment, which is then activated in the field by the installer for bonding the facing to the panels. Either approach is acceptable.

Numerous types of field applied or activated adhesive layers 1341 may be used, such as for examples without limitation heat or ultraviolet activated adhesives, pressure sensitive adhesives, spray adhesives, and hot melt adhesives (e.g. heat activated or applied hot). Yet other field adhesives and bonding methods that may be used also includes double-sided adhesive strips or tape. The field applied or activated adhesive layer 1341 may be a permanent type of adhesive, or alternatively a semi-permanent and releasable adhesive to allow the facing sheet to lifted at the seams 1343 if necessary for adjustments or access to the ceiling panel and mounting hardware above the facing.

In one embodiment, the type of factory-applied adhesive layer 1340 used to bond the facing sheets 1330 to the central regions 1311 of the ceiling panel bottom surfaces 1304 may be different than the type of field adhesive layer 1341 used. Certain adhesives are better suited for installation in a factory under precisely controlled fabrication and adhesive curing conditions rather than in the field requiring quickly curing or activated adhesives to enhance ceiling system installation productivity.

It is important to note that the thicknesses of the adhesive layers 1340 and 1341 have been intentionally exaggerated for illustration purposes only to clearly show the boundaries between the factory applied adhesive in the central region 1310 of the ceiling panels 1300 and the field applied or activated adhesives in the surrounding annular peripheral regions 1311. In actuality, the thickness of the adhesive layers is de minimis such that the facing sheet 1330 lies substantially in the same horizontal plane as the bottom surface 1206 of the grid support member bottom flange 1210. Accordingly, there would be no clearly discernible gaps between the facing sheet and bottom surface of the ceiling panels. The adhesive layers 1340 and 1341 should therefore not be construed or interpreted as actual physical structures such as spacers or other members sometimes used in ceiling panel construction to accommodate insertion of a portion of the bottom flange into the gap for mounting the panels.

It will be appreciated that numerous variations in the foregoing ceiling panel installation and facing seaming process and sequence are possible.

Additional ceiling panels 1300 may be installed in a similar manner, as shown schematically in the bottom plan views of FIGS. 28-31. These figures depict one embodiment of sequential steps for mounting and assembling an array of panels. The ceiling panel peripheral edges 1306 are shown in dashed lines beneath the facing sheets 1330. It bears noting that the perimeter edges 1333 of the cantilevered facing flaps 1335 are each positioned in a peripheral region 1311 of the adjoining ceiling panel across the panel joint 1303 which form facing seams 1343 lying in the same regions.

The foregoing facing seaming process may similarly used and followed for interlocking panels as shown in FIG. 32 which include hybrid panel edge profiles which combine including shiplap and tongue and groove feature. One abutting ceiling panel 1300 includes an upper shiplap profile or feature 1340 adjacent top surface 1302 and the mating panel includes a lower shiplap profile or feature 1350 offset and spaced vertically apart/downward from the top surface of each panel 1300. The panel 1300 with the upper shiplap feature 1340 (right panel) includes a laterally open groove 1370 in the panel peripheral edge which receives a laterally outward projecting cantilevered tongue 1360 formed on the mating edge of the panel having the lower shiplap feature 1350 as shown. Joint 1303 between the panels 1300 has a compound rectilinear shape.

The peripheral edges 1333 including a lower shiplap feature 1350 may further include a male shiplap feature comprising a laterally outward projecting cantilevered tongue 1360 configured for insertion into a mating female shiplap feature comprising a laterally open groove 1370 formed in an adjoining ceiling panel peripheral edge 1333 (see, e.g. FIGS. 23 and 9).

Accordingly, the type of panel edge details used is not limiting of the invention or restrictive.

Third Inventive Concept—Faced Ceiling System

A ceiling system in one embodiment conceals joints between adjoining ceiling panels to provide a monolithic ceiling appearance. The system includes the support structure and ceiling panels each having a top surface, bottom surface, and peripheral edges. In one embodiment, the peripheral edges of the panels may have a hybrid edge detail including a first edge profile and a second edge profile different than the first. A facing material, bonded to the bottom surfaces of ceiling panels after securement to the support structure, has a continuous uninterrupted extent to cover and conceal multiple panels and joints. The facing may be adhesively bonded to the panels.

The present ceiling system 2100 will now be described for convenience without limitation to a suspended type ceiling system having a grid-type ceiling panel support system which is hung from an overhead building structure. However, the ceiling system is not limited in its scope or applicability to such grid systems. Accordingly, the support grid may be directly surface mounted to the building structure in certain embodiments. Alternatively, the ceiling panels themselves may be directly surface mounted to the building structure or framing members (e.g. wood or metal joists, studs, or other elements). Therefore, the present invention is explicitly not restricted for use with suspended type ceiling systems alone.

Figure 33:
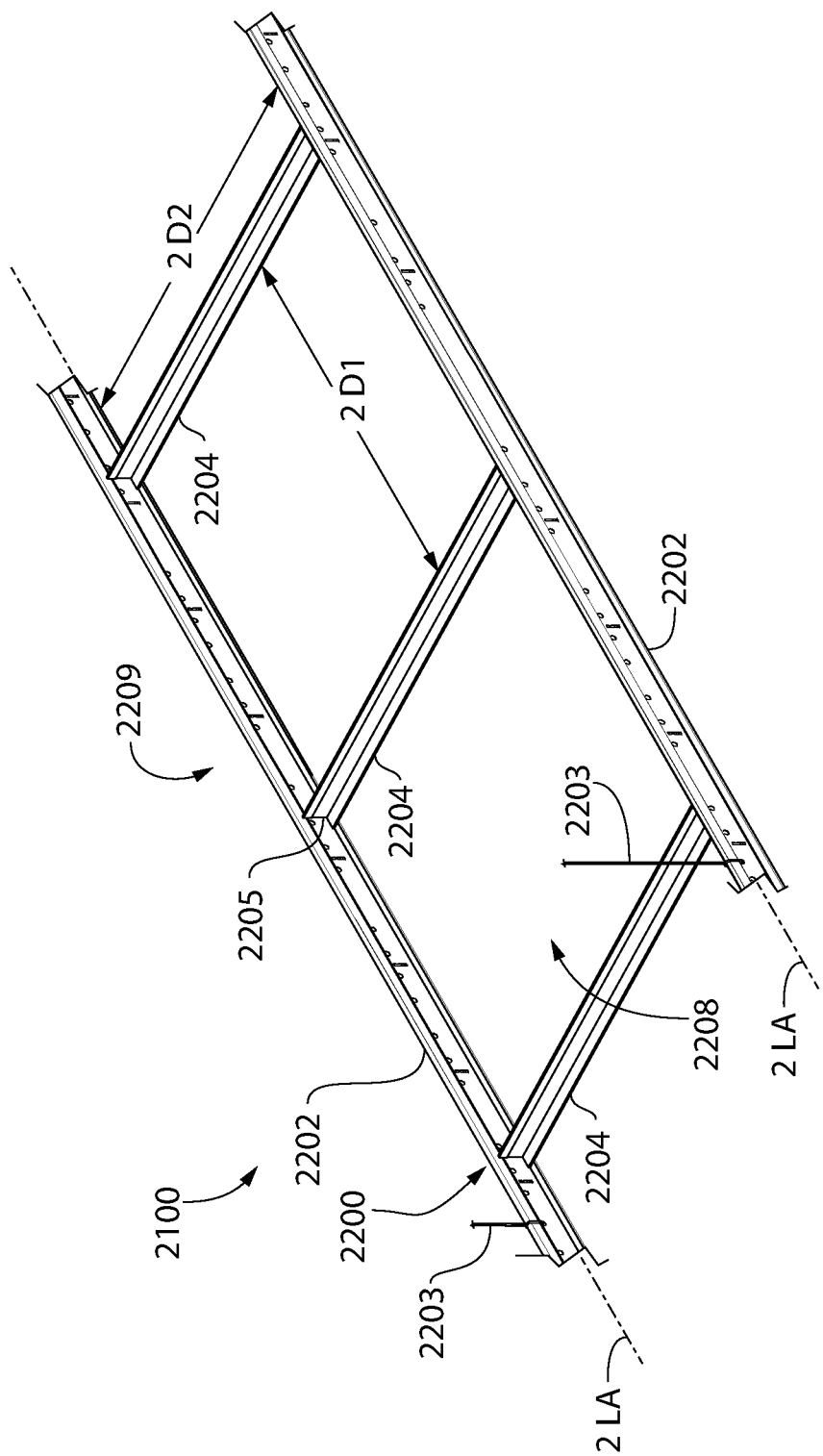
FIG. 33 is a perspective view of a ceiling panel support structure in the form of a suspended support grid formed by intersecting longitudinal and lateral grid support members.
Figure 34:
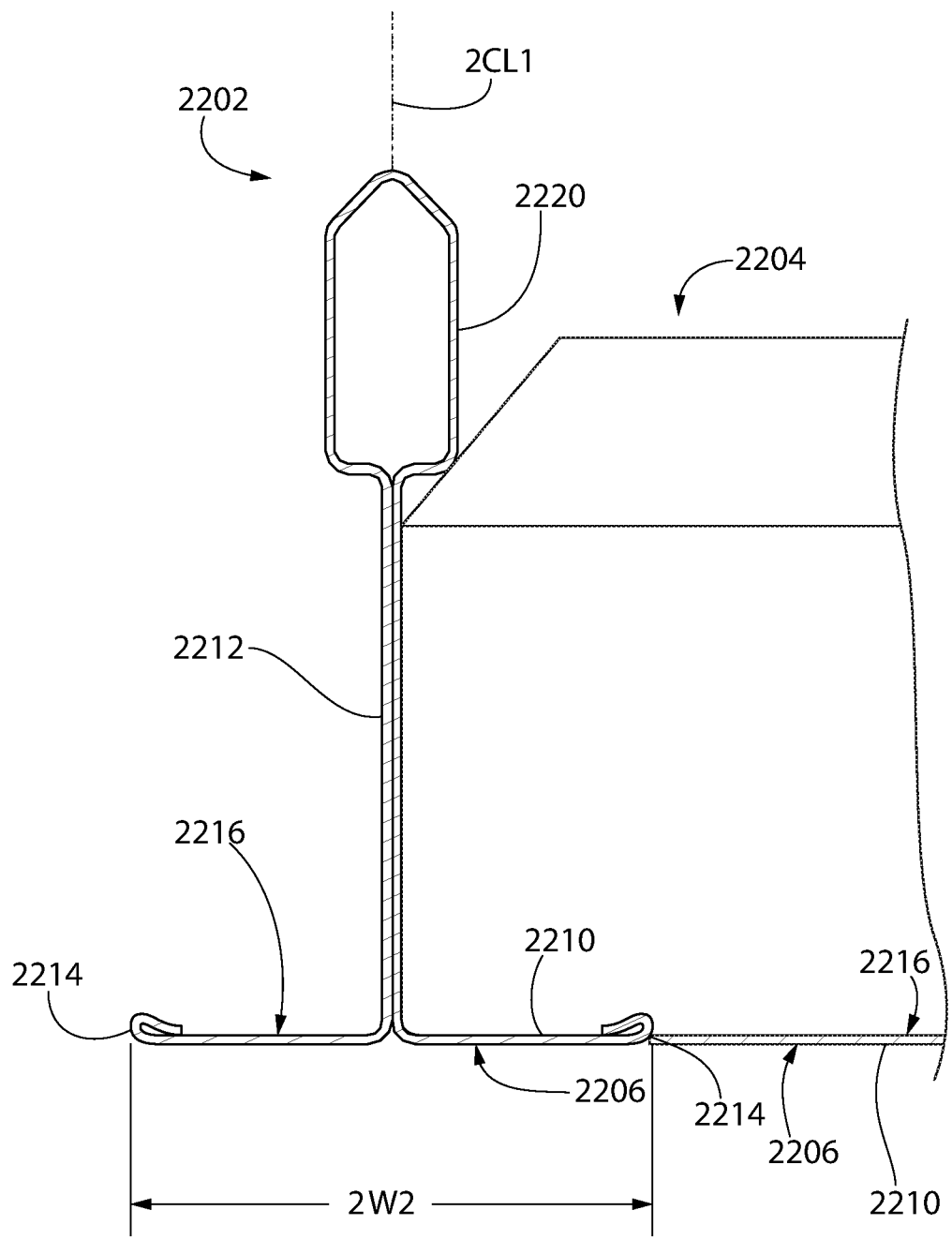
FIG. 34 is a side cross-sectional view of intersecting longitudinal and lateral grid support members.

Referring initially now to FIGS. 33 and 34, the ceiling system 2100 generally includes an overhead grid support system 2200 forming a ceiling support structure for mounting a plurality of ceiling tiles or panels. In one embodiment, the grid support system 2200 may be configured for mounting in a suspended manner from an overhead building structure via appropriate hanger elements 2203, such as for example without limitation fasteners, hangers, wires, cables, rods, struts, etc. Grid support system 2200 defines a support grid 2209 comprising a plurality intersecting longitudinal grid support members 2202 (e.g. main beams) and lateral grid support members 2204 (e.g. cross tees). The longitudinal grid support members 2202 may be referred to as main beams because these grid members in some embodiments alone may be hung by hanger elements 2203 from an overhead building structure, thereby providing support for the entire grid. The lateral grid support members 2204 may be referred to as cross tees because these grid members are generally but not necessarily supported only by the longitudinal grid support members 2202 without hanger attachment to the overhead structure.

Longitudinal and lateral grid support members 2202, 2204 are elongated in shape having a length greater than their respective width (e.g. at least twice), and in various embodiments lengths substantially greater than their widths (e.g. 3 times or more). Longitudinal grid support member 2202 may have a substantially greater length than lateral grid support member 2204 and form "runners" or "rails" which are maintained in a substantially parallel spaced apart relationship by the lateral grid support members. The lateral grid support members 2204 may be attached to and between adjacent (but spaced apart) longitudinal grid support members 2202 at appropriate intervals using any suitable permanent or detachable coupling means. The combination of interconnected longitudinal and lateral grid support members 2202, 2204 provides strength and lateral stability to the grid support system 2200. In one non-limiting example, the grid support system 2200 may be a metal drywall grid system or suspended grid system available from Armstrong World Industries.

In one embodiment, grid support members 2202 and 2204 may be horizontally oriented when installed. It will be appreciated, however, that other suitable mounted orientations of grid support members 2202, 2204 such as angled or sloped (i.e. between 0 and 90 degrees to horizontal) may be used. Accordingly, although support members 2202, 2204 may be described in one exemplary orientation herein as horizontal, the invention is not limited to this orientation alone and other orientations may be used.

Longitudinal and lateral grid support members 2202, 2204 intersect to form an array of grid openings 2208 which receive and essentially are closed by ceiling tiles or panels 2300 when positioned within the openings. In some embodiments, the grid support members 2202, 2204 may be arranged in an orthogonal pattern wherein the support members intersect at right angles (i.e. perpendicular) to form rectilinear grid openings 2208 such as squares or rectangles (in top plan view).

Figure 39:
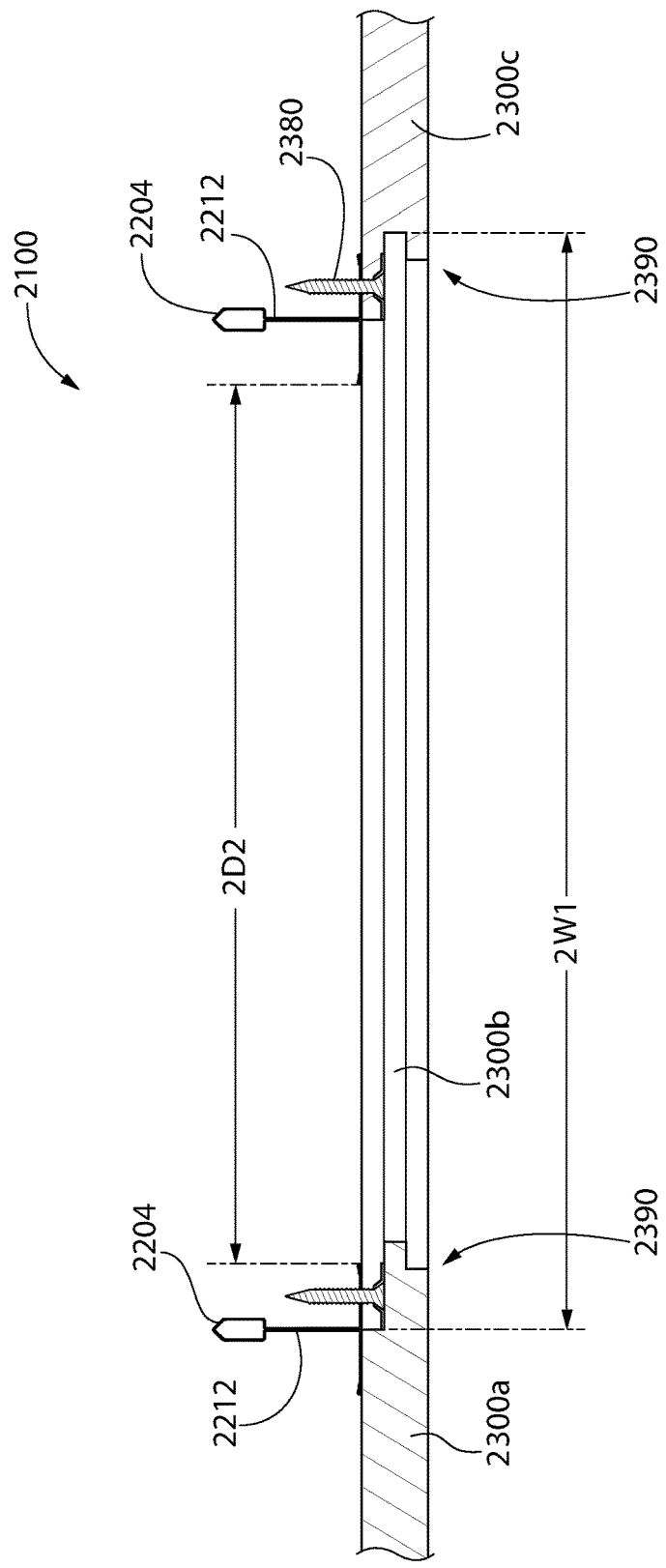
FIG. 39 is a side partial cross-sectional view of a ceiling system with ceiling panels having the hybrid edge detail.

The terminal ends 2205 of the lateral grid support members 2204 have end connections configured for permanent or detachable connection to the vertical webs 2212 of the longitudinal grid support members 2202 at right angles to form a rectilinear grid pattern (see, e.g. FIGS. 34 and 39). Non-limiting examples of suitable connection means include permanent connection such as without limitation welding, soldering, etc., or detachable connection such as without limitation clips, brackets, threaded fasteners, interlocking tabs/slots, etc. Accordingly, the present invention is not limited by the manner of attachment or coupling used. The terminal ends 2207 of the longitudinal grid support members 2202 have end connections configured for permanent or detachable end-to-end connection to the terminal ends of adjoining longitudinal grid support member to form continuous spans of the main beams (see, e.g. FIGS. 34 and 39). Similar permanent or detachable end connection means as those described above may be used.

It will be appreciated that some lateral grid support members 2204 may be run the same direction between and parallel to main beam longitudinal grid support members 2202, as shown for example in FIG. 33. Accordingly, the lateral grid support members 2204 are not limited in their use to only arrangement at right angles to the longitudinal grid support members 2202.

FIG. 34 is a transverse cross-sectional view of a longitudinal grid support member 2202; the lateral grid support members 2204 having a similar but not necessarily identical configuration in one embodiment. Referring to FIGS. 33 and 34, grid support members 2202, 2204 may be T-shaped (e.g. T-rails) in transverse cross section. The grid support members have an inverted T-shaped configuration in an installed position suspended from an overhead building structure. Grid support members 2202, 2204 may each include a longitudinally-extending horizontal bottom flange 2210, an enlarged top stiffening channel 2220, and a vertical web 2212 extending upwards from the flange to the stiffening channel. In some embodiments, the top stiffening channel 2220 may be omitted from grid support members 2202 and/or 2204.

The longitudinal and lateral grid support members 2202, 2204 each define a respective longitudinal axis 2LA and axial directions; the lateral grid support members 2204 generally but not necessarily being arranged transversely thereto. In one implementation, bottom flange 2210 is oriented substantially horizontally when in an installed hung position (see, e.g. FIGS. 39 and 40) and has opposing portions which extend laterally outwards from web 2212 and terminate in opposed axially extending longitudinal edges 2214. Web 2212 may be centered between the edges 2214 and vertically aligned with the vertical centerline 2CL1 of the grid support member in some embodiments. In other embodiments, the web 2212 may be laterally offset from centerline 2CL1 of the grid support member 2202 or 2204 including being substantially aligned with one longitudinal edge 2214 of the grid support member 2202 or 2204 forming a structural angle shape.

Figure 35:
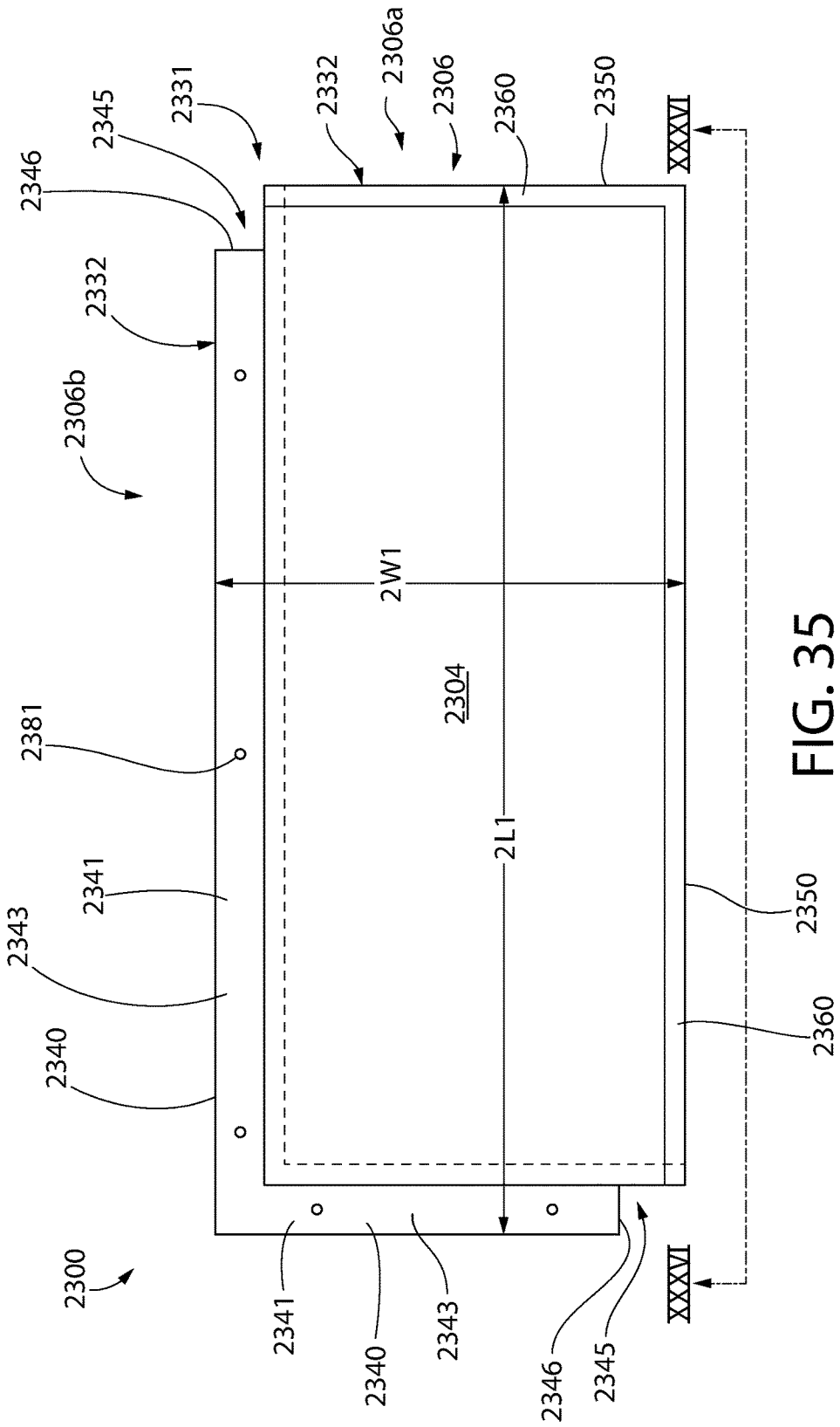
FIG. 35 is a bottom plan view of a ceiling panel with hybrid edge detail according to the present disclosure.

With continuing reference to FIGS. 33-35, the bottom flanges 2210 of grid support members 2202, 2204 each includes a downward facing bottom surface 2206 that defines the "grid face" typically visible from the occupied room or space below the grid support system 2200 if not concealed. Bottom surface 2206 defines a horizontal ceiling reference plane for the overhead grid support system 2200. Flange 2210 further defines an upward facing top surface 2216, which in some embodiments may be used for supporting a portion of the ceiling panels thereon. Longitudinal grid support members 2202 may be configured similarly or the same as lateral grid support members 2204, or each may be different. Regardless of the configurations used for grid support members 2202 and, 2204, each may include bottom flanges 2210 and downward facing flange surfaces 2206 which preferably lie in the same horizontal plane in one embodiment when hung from an overhead building structure. Furthermore, a lower portion of the bottom flanges 2201 at the terminal ends 2205 of the of lateral grid support members 2204 may further be omitted when fabricated or notched/cut off in the field. This facilitates flush mating with the longitudinal edges 2214 of longitudinal grid support members 2202 and the adjoining grid faces at intersections between longitudinal and lateral grid support members 2202, 2204 forming a substantially continuous grid face.

Grid support members 2202, 2204 may be made of any suitable metallic or non-metallic materials structured to support the dead weight or load of ceiling panels 2300 without undue deflection. In some non-limiting embodiments, the grid support members may be made of metal including aluminum, titanium, steel, or other. In some non-limiting embodiments, the grid support members 2202, 2204 may be a standard heavy duty 15/16 inch aluminum T-rail having a 15/16 inch grid face or 9/16 inch T-rail having a narrow 9/16 inch grid face. Other types of grid support members may be used preferably with a sufficiently sized grid face for properly fastening or attaching the ceiling panels thereto.

Features of the ceiling panels mountable on the foregoing ceiling support grid will now be described in further detail. Referring generally to FIGS. 35-41, a plurality of ceiling panels 2300 are attached to and supported by the grid support system 2200 in openings 2208.

Ceiling panels 2300 may include grid-concealment features in one embodiment being configured and dimensioned to hide or conceal at least a portion of the ceiling support surface or grid face when mounted to the longitudinal and lateral grid support members 2202, 2204 of the grid support system 2200. Accordingly, ceiling panels 2300 may be used to provide a monolithic ceiling appearance which hides the ceiling support or grid surface when viewed from the occupied building space created below, as further described herein.

Referring now FIGS. 35-41, ceiling panels 2300 may have a generally flattened body with a substantially greater horizontal width 2W1 and length 2L1 than vertical thickness as shown. Ceiling panel 2300 has a body including a top surface 2302 facing upward toward the grid support member when mounted, an opposing bottom surface 2304, and peripheral sides 2306 extending therebetween along the perimeter of the ceiling panel. Top and bottom surfaces 2302, 2304 may be generally planar and arranged substantially parallel to each other in one non-limiting embodiment. In the exemplary non-limiting embodiment shown, ceiling panel 2300 has a rectangular shape having a length 2L1 and longitudinal peripheral sides 2306b which are larger than width 2W1 and lateral peripheral sides 2306a. In other embodiments, however, square ceiling panels 2300 may be used.

Figure 36:
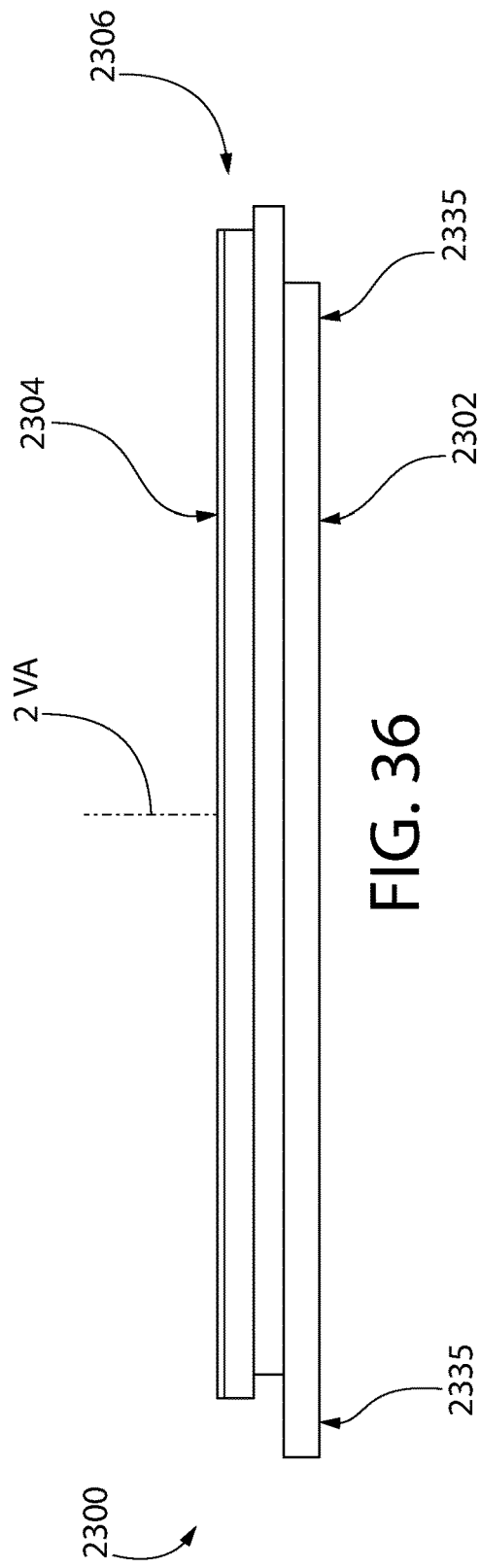
FIG. 36 is a side elevation view thereof.
Figure 37:
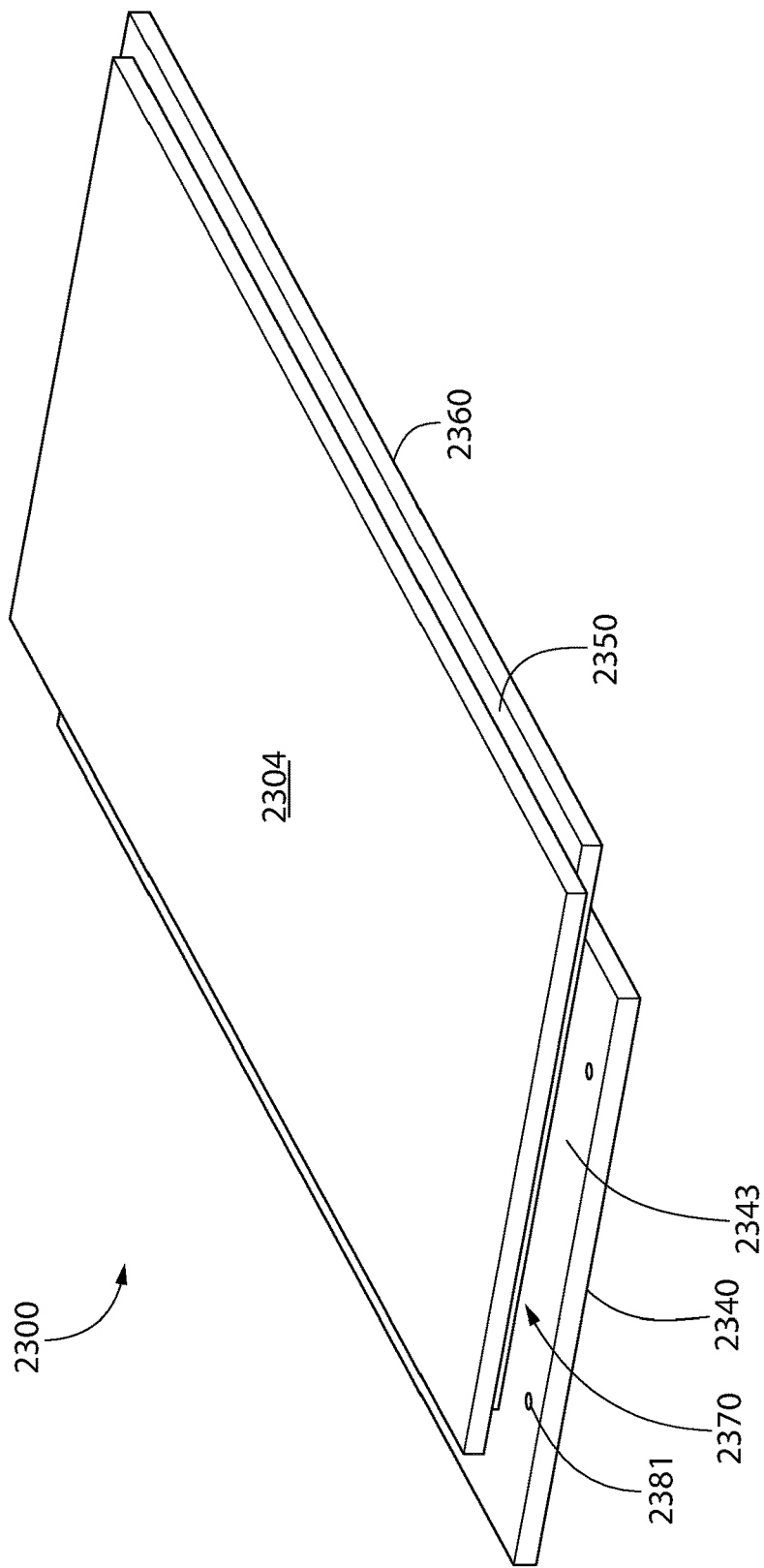
FIG. 37 is bottom perspective view thereof.
Figure 38:
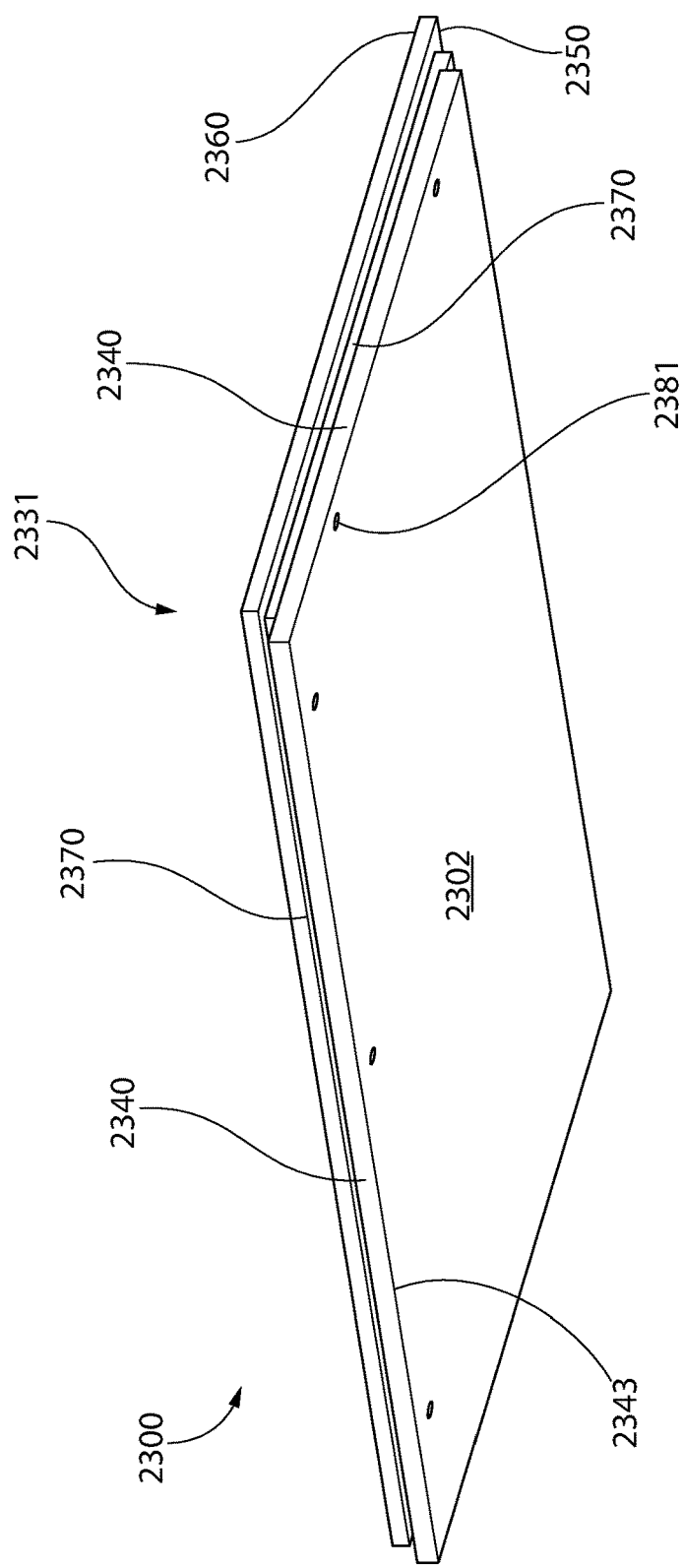
FIG. 38 is a top perspective view thereof.

For clarification, it bears noting that the ceiling panel shown in FIGS. 36 and 38 is oriented so that top surface 2302 (normally hidden from view in the interior space formed below the ceiling system) is facing downward and the exposed bottom surface is facing upward for better revealing the edge details. This is opposite to the installed position of the ceiling panels shown in FIGS. 39-41, in which the panel is inverted 180 degrees for mounting to the grid support system 2200 (i.e. top surface 2302 facing upwards and bottom surface 2304 facing downwards).

In some embodiments, ceiling panels 2300 may have a rectilinear shape, such as without limitation square or rectangular. Each ceiling panel 2300 includes four corners 2331 and peripheral edges 2332 extending around the perimeter of the panel. Edges 2334 define outward facing peripheral edge surfaces configured to interlock with adjoining ceiling panels 2300 when mounted to the grid support system 2200, as further described herein.

The ceiling panels 2300 are configured and dimensioned to hide the grid face of the overhead support grid 2209 (i.e. bottom surface 2206 of the grid support members 2202 and 2204). Accordingly, referring to FIGS. 33-41, ceiling panels 2300 each have a horizontal longitudinal length 2L1 (measured parallel to longitudinal axis 2LA) which is larger than the corresponding horizontal longitudinal distance 2D1 (measured parallel to longitudinal axis 2LA) between the inner longitudinal edges 2214 (i.e. closest distance) of two adjacent albeit spaced apart grid lateral grid support members 2204. In some embodiments, ceiling panels 2300 may each further have a horizontal lateral width 2W1 (measured transversely to longitudinal axis 2LA) which is larger than the corresponding horizontal lateral distance D2 (measured transversely to longitudinal axis 2LA) between the inner longitudinal edges 2214 (i.e. closest distance) of two adjacent albeit spaced apart grid longitudinal grid support members 2202. In one embodiment, width 2W1 is substantially equal to distance D2 plus more than the width 2W2 of each of the two flanges 2210 of the longitudinal grid support members 2202 which support both opposite longitudinally-extending peripheral sides 2306 of the panel (see, e.g. FIGS. 33, 34, and 39) Similarly, in one embodiment, length 2L1 is substantially equal to distance 2D1 plus more than the width 2W2 of each of the two flanges 2210 of the lateral grid support members 2204 which support both opposite laterally-extending sides 2306 of the panel. In one implementation, one peripheral edge 2332 of each ceiling panel 2300 may terminate at a point coextensive with or beyond the outermost longitudinal edge 2214 of the first of each pair of adjacent but spaced apart longitudinal and lateral grid support members 2202, 2204. The opposite peripheral edge 2332 of each ceiling panel 2300 may terminate at a point coextensive with the vertical web 2212 of the second of each pair of adjacent but spaced apart longitudinal and lateral grid support members 2202, 2204.

Accordingly, when adjoining ceiling panels 2300 are installed in the overhead support grid 2209 which are configured and dimensioned in the foregoing manner, the peripheral edge portions 2332 of the panels overlap and extend entirely beneath the flange bottom surfaces 2206 of both the two opposing longitudinal grid support members 2202 and two opposing lateral grid support members 2204 surrounding each grid opening 2208, thereby completely concealing the grid face. Perimeter regions of top surface 2302 of each ceiling panel 2300 define upward facing substantially planar peripheral top surfaces 2335 which may either contact or fall in close proximity to bottom surfaces 2206 of grid support members 2202 and 2204 when the ceiling panel is mounted therefrom (see, e.g. FIGS. 36, 39, and 40).

The ceiling panels 2300 may have a composite-structured hybrid peripheral edge detail including a combination of a tongue-and-groove and shiplap configurations. The hybrid edges of adjoining panels are configured to both interlock via the tongue-and-groove portion of the edge detail and hide the ceiling panel support surfaces or grid faces via the shiplap portion of the edge detail.

Referring to FIGS. 35-41, each peripheral edge 2332 preferably but not necessarily includes a shiplap portion comprising either an upper shiplap profile or feature 2340 adjacent top surface 2302 or a lower shiplap profile or feature 2350 offset and spaced vertically apart/downward from the top surface of each panel 2300 (best shown in FIG. 41). The upper shiplap features of one ceiling panel 2300 has a complementary configuration and arrangement to the lower shiplap features 2350 on an adjoining panel so that the assembled shiplap edges form a completed shiplap joint or seam when mutually engaged.

In one exemplary non-limiting embodiment as shown, each ceiling panel 2300 may include two peripheral edges 2332 having a male upper shiplap feature 2340 and two peripheral edges 2332 having a female lower shiplap feature 2350. In one configuration, the upper shiplap features 2340 may be formed on two orthogonally adjoining peripheral edges 2332 (i.e. oriented perpendicular to each other) which intersect at a first corner 2331. Similarly, the lower shiplap feature 2350 may be formed on two orthogonally adjoining peripheral edges (i.e. oriented perpendicular to each other) which intersect at a second corner 2331 diagonally opposite to the first corner 2331. The upper shiplap features 2340 may be continuous in structure on the two adjoining peripheral edges 2332 including at the first corner. Similarly, the lower shiplap features 2350 may be continuous in structure on the two adjoining peripheral edges 2332 including at the second corner.

It will be appreciated that other arrangements of the shiplap features on different peripheral edges may be used in other embodiments. Accordingly, the ceiling panel is not limited to the shiplap arrangement shown herein.

In one embodiment, each upper shiplap feature 2340 may be defined by a cantilevered lateral extension 2341 of a respective first ceiling panel edge 2332 (reference FIGS. 35-41 with particular initial emphasis on FIG. 9 showing the disassembled shiplap joint of FIG. 40 between two adjoining panels 2300a, 2300b). The top of the extension 2341 may be flush with and coextensive with the top surface 2302 of the main body of the ceiling panel 2300, thereby creating a continuous planar top surface 2302. Other configurations may be used.

Upper shiplap feature 2340 includes a laterally outward facing upper end surface 2342 and downward facing bottom surface 2344 arranged to engage a mating lower shiplap feature 2350 of an adjoining ceiling panel 2300. Bottom surface 2344 may be oriented substantially parallel to top surface 2302 of ceiling panel 2300. In other embodiments, bottom surface 2344 may be obliquely oriented to top surface 2302. The lateral extension 2341 preferably has a width sufficient to cover and at least a portion of the grid bottom flange 2210 (i.e. grid face or surface 2206) to which the ceiling panel is attached. In one embodiment, end surface 2342 may be vertically aligned approximately with the web 2212 of the grid support member 2202 or 2204 to which it attached (see, e.g. FIGS. 39 and 40). In other embodiments, the end surface 2342 of lateral extension 2341 may align elsewhere on the flange 2210.

In one configuration, the lateral extension 2341 further defines a mounting flange 2343 for attachment to the grid bottom flange 2210 (see, e.g. FIGS. 39 and 40). The mounting flange 2343 is configured and arranged for permanent or detachable engagement with grid flange 2210. Non-limiting examples of suitable attachment means include permanent joining such as without limitation non-releasable adhesives, etc., or detachable joining such as without limitation threaded fasteners 2380 (shown), clips, brackets, interlocking tabs/slots, releasable adhesives, etc. If fasteners 2380 are used, mounting holes 2381 may be provided to facilitate attaching the ceiling panel 2300 to the support grid. The invention is not limited in scope or applicability by the method used to attach the mounting flange to the grid support members.

With continuing reference to FIGS. 35-41, the lower shiplap feature 2350 may be defined by an end recess 2351 formed in a respective second ceiling panel edge 2332. Lower shiplap feature 2350 includes a horizontal upward facing seating surface 2352, laterally outward facing end surface 2355, and a vertical upper stop wall 2354 adjacent to the top surface 2302 of ceiling panel 2300. Seating surface 2352 may be oriented substantially parallel to top surface 2302 of ceiling panel 2300. In other embodiments, seating surface 2352 may be obliquely oriented to top surface 2302. Seating surface 2352 of lower shiplap feature 2350 is arranged to engage bottom surface 2344 of an upper shiplap feature 2340 when the ceiling panel joint is fully assembled, as shown in FIGS. 39 and 40.

Stop wall 2354 may be oriented perpendicular to and intersects top surface 2302 of the ceiling panel 2300 at one end. At the other end, stop wall 2354 intersects and may be oriented perpendicular to seating surface 2352 as best shown in FIG. 41. In other embodiments contemplated, stop wall 2354 may be obliquely oriented to the top surfaces 2302 and 2352 of the ceiling panel 2300 and lateral extension 2351, respectively. The stop wall 2354 is laterally/horizontal spaced inward and vertically offset from the end surface 2355 of the peripheral edge 2332. Stop wall 2354 may be oriented parallel to end wall 2355 in some embodiments. In other embodiments, stop wall may be obliquely oriented to end wall 2355.

The tongue-and-groove portion of the ceiling panel edge detail will now be further described. In one embodiment, the peripheral edges 2332 including a lower shiplap feature 2350 may further include a male shiplap feature comprising a laterally outward projecting cantilevered tongue 2360 configured for insertion into a mating female shiplap feature comprising a laterally open groove 2370 formed in an adjoining ceiling panel peripheral edge 2332 (see, e.g. FIGS. 40 and 41). The free terminal end of tongue 2360 defines the peripheral edge end surface 2355 of the ceiling panel. Tongue 2360 defines an edge recess 2361 and lower stop wall 2362 disposed at and adjoining the bottom surface 2304. Stop wall 2362 is spaced laterally inwards from and vertically offset from end surface 2355 of the ceiling panel edge. In one embodiment, the lower stop wall 2362 is spaced inward from end surface 2355 by a distance less than the spacing between end surface 2355 and the upper stop wall 2354. In one embodiment, lower stop wall 2361 may be oriented parallel to upper stop wall 2354, and in further embodiments also parallel to end wall 2355. Other orientations including oblique may be used.

Lateral groove 2370 defines a recessed vertical stop wall 2371 arranged to abut the tongue 2360 of an adjoining panel, and more particularly the end surface 2355 of the tongue as shown in FIG. 40. Stop wall 2371 is laterally offset inward and spaced apart from the end surface 2342 of the cantilevered lateral extension 2341. Stop wall 2371 limits the insertion depth of the tongue into the groove. A laterally outward facing lower end surface 2372 adjoins the groove 2370 and bottom surface 2304 of the ceiling panel 2300. In one embodiment, end surface 2372 is laterally offset inward and spaced apart from the top end surface 2342 of the cantilevered lateral extension 2341. In one embodiment, end surface 2372 is spaced inward from top end surface 2342 by a distance less than the spacing between end surface 2372 and the recessed stop wall 2371. In one embodiment, lower end surface 2372 may be oriented parallel to upper end surface 2342, and in further embodiments also parallel to recessed stop wall 2371. Other orientations including oblique may be used.

In one embodiment, the lateral extension 2341 (and mounting flange 2343 defined by the extension) may have an L-shaped configuration as show in the bottom plan view of FIG. 35. The lateral extension 2341 is therefore arranged on the perimeter of the ceiling panel on two adjacent and orthogonal peripheral edges 2332. In certain embodiments, the terminal ends 2346 of the lateral extensions may have a length less than the peripheral edge 2332 on which it is disposed. Accordingly, the terminal ends 2346 may be longitudinally or laterally offset from the parallel peripheral edges of an adjacent ceiling panel to form a corner space or notch 2345 for receiving a portion of the lateral extension 2341/mounting flange 2343 of an adjoining and interlocking panel (see, e.g. FIGS. 42 and 43).

The protruding tongue 2360 portions of the ceiling panels 2300 may have also an L-shaped configuration in bottom plan view. The tongues 2360 may have a length substantially equal to the length of the peripheral edge 2332 on which they are disposed (see, e.g. FIG. 35).

FIG. 39 shows ceiling panel joints formed with the hybrid edge detail disclosed herein. This figure shows the ceiling panel joints formed on the shorter peripheral sides 2306a of a central ceiling panel 2300b. Ceiling panel 2300b is interlocked with two adjoining ceiling panels 2300a and 2300c (shown hatched in cross-section for clarity) on opposite peripheral edges of ceiling panel 2300b. FIG. 40 is a detailed view of the left joint; the right joint being similar. FIG. 41 is an exploded or disassembled view of the joint of FIG. 40.

Referring to FIGS. 39-40, one peripheral edge 2332 (left) of the central ceiling panel 2300b is threadably fastened to a first lateral grid support member 2204 using the mounting flange 2343 defined by lateral extension 2341 of the upper shiplap feature 2340 and fasteners 2380. With respect to the shiplap portion of the hybrid edge details, the upper shiplap feature 2340 of ceiling panel 2300b is seated on the lower shiplap feature 2350 of ceiling panel 2300a such that bottom surface 2344 of the upper feature is engaged with seating surface 2352 of the lower feature. The seating surface 2352 defines a stepped configuration dimensioned to receive the upper shiplap feature 2350 so that the top surfaces of adjoining ceiling panels 2300 are substantially flush with each other. End surface 2342 abuttingly contacts or alternatively may be disposed preferably at least proximate to upper stop wall 2354.

Advantageously, when the shiplap features of the ceiling panels 2300a, 2300b are joined, the lower shiplap feature 2350 is arranged to completely conceal the otherwise exposed heads of the fasteners 2380, thereby eliminating the need to spackle or otherwise hide the head of the fastener for forming a monolithic ceiling appearance.

With respect to the tongue-and-groove portion of the hybrid edge details, tongue 2360 of ceiling panel 2300a is inserted in and engaged with lateral groove 2370 of ceiling panel 2300b. End surface 2355 of tongue 2360 abuttingly contacts or alternatively may be disposed preferably at least proximate to recessed stop wall 2371 in groove 2370 to provide secure interlocked engagement between the adjoining peripheral edges 2332 of each panel. Lower end surface 2372 of ceiling panel 2300b abuttingly contacts or alternatively may be disposed preferably at least proximate to lower stop wall 2362 of ceiling panel 2300a.

It should be noted that the remaining peripheral edge 2332 (right) of the central ceiling panel 2300b is supported only by tongue-and-groove engagement with ceiling panel 2300c, thereby eliminating the need to fasten this peripheral side 2306 of ceiling panel 2300b to the support grid. The same joint configuration and arrangement as described above is used for joining the longitudinal peripheral sides 2306b of ceiling panel 2300b to adjoining ceiling panels (see, e.g. FIGS. 42 and 43). Accordingly, the hybrid edge details according to the present disclosure allow each ceiling panel to be attached to a grid support member along only two of the four peripheral sides, thereby advantageously reducing installation time and costs.

Ceiling panels 2300 may be constructed of any suitable material or combinations of different materials, which in certain embodiments preferably have acoustical properties. Some non-limiting examples of ceiling panel materials that may be used include, without limitation, mineral fiber board, fiberglass, metals, polymers, wood, composites, combinations thereof, or other. Embodiments of ceiling panels 2300 have a sufficiently high noise reduction coefficient (NRC) and ceiling attenuation class (CAC) rating to be characterized as an acoustical substrate in contrast to gypsum-based drywall having substantially lower NRCs (e.g. 0.05) characteristic of sound reflecting, not absorbing materials. NRC is a measure of sound energy absorption of a material. An NRC rating of 0 is a perfect sound reflection material. An NRC rating of 1 is a perfect sound absorption material. CAC is a measure for rating the performance of a ceiling material as a barrier to block airborne sound transmission through the material to/from the plenum above the ceiling.

In some embodiments, ceiling panels 2300 according to the present disclosure may have an NRC of at least 0.50 and/or CAC of at least 230 depending on the desired acoustical characteristics of the ceiling system. In a certain embodiment, the NRC rating may be at least 0.70. The shiplap and tongue-in-groove edge details may be formed by any fabrication process or combination of processes capable of making the details. Non-limiting examples include cutting, routing, milling, casting, molding, etc.

In some embodiments contemplated, ceiling panels 2300 may be composite structures formed from two or more separately formed layers or sheets of material which are bonded or joined together to form a complete panel. For example, referring to FIGS. 35-38 and 41 in a three layer/sheet construction, a top layer/sheet comprising the top surface 2302, upper shiplap feature 2340 and mounting flange 2343 could be one layer/sheet. A bottom layer/sheet comprising the bottom surface 2304 could be a second layer/sheet. And a middle or core layer/sheet forming the tongue-and-groove features on opposing sides could be a third layer/sheet. Any suitable method could be then used to join the sheets together, including as possible examples without limitation depending on the layer/sheet materials used adhesive bonding, fasteners, welding, soldering, etc.

Figure 42:
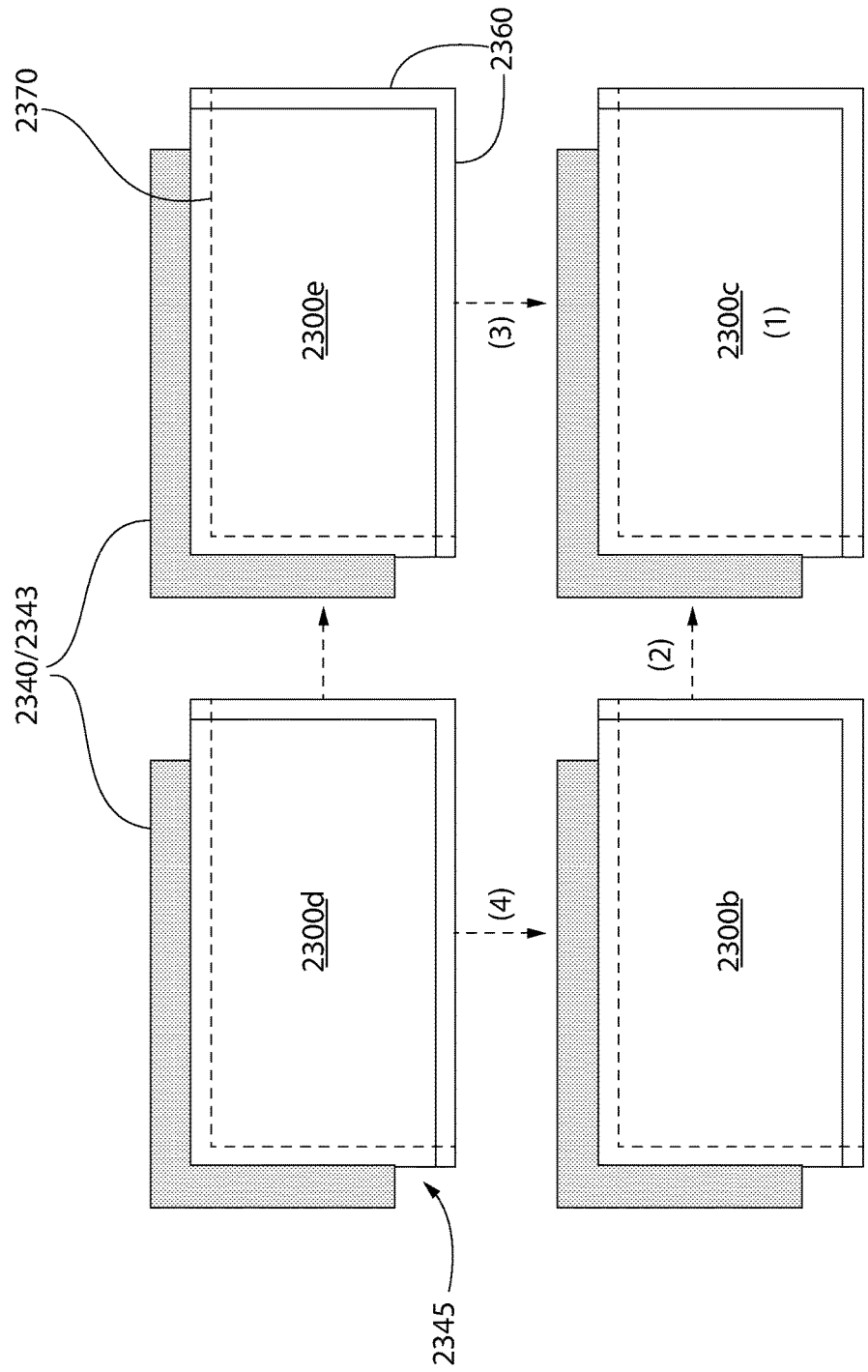
FIG. 42 is an exploded bottom plan view of a ceiling panels showing one non-limiting embodiment of an assembly or installation sequence.
Figure 43:
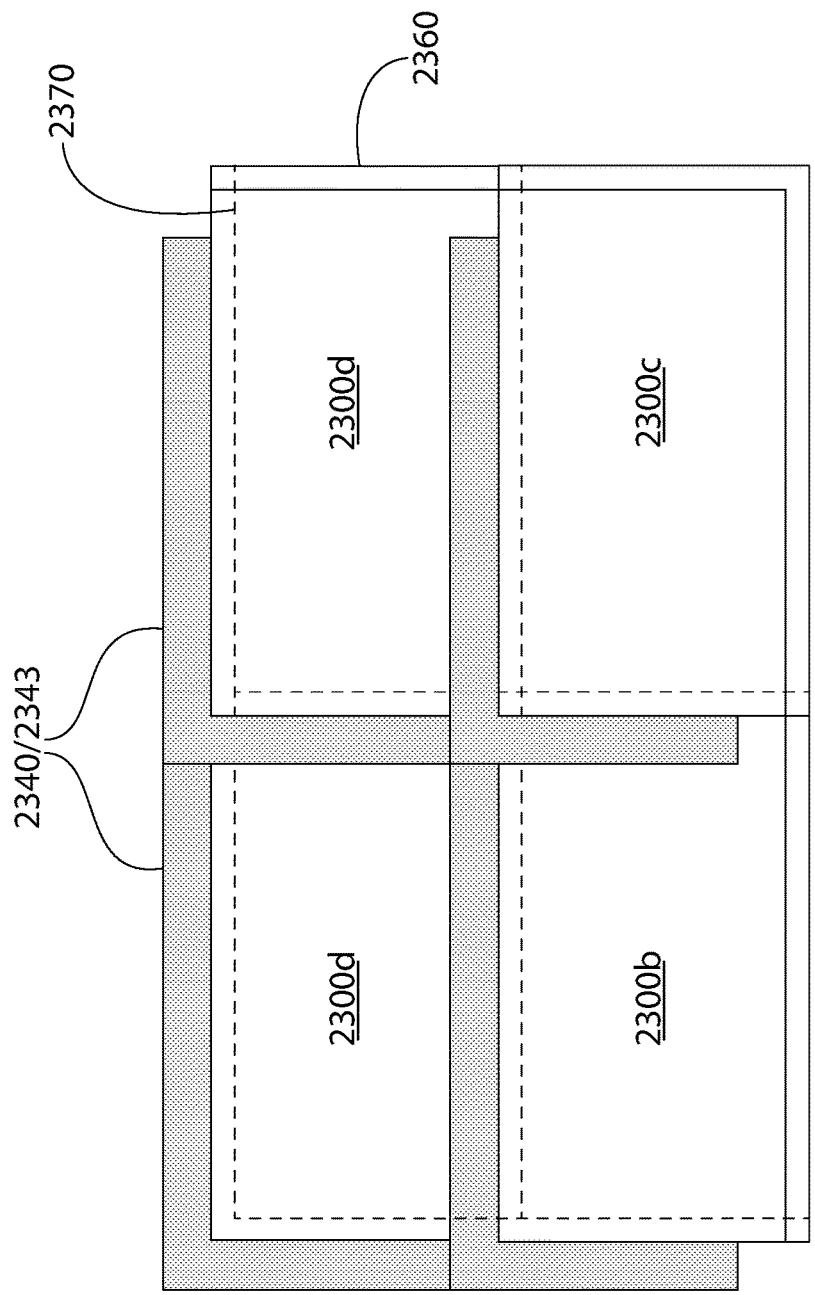
FIG. 43 is a bottom plan view showing the assembled ceiling panels.

An exemplary method for installing a ceiling system that conceals the ceiling support structure will now be described. In order to form a monolithic appearance for ceiling system 2100, the ceiling panels 2300 are mounted and assembled in an alternating sequence using the mounting flanges 2342, and tongue-and-groove and shiplap edge details disclosed herein. FIGS. 42 and 43 are bottom plan views of exemplary ceiling panels 2300 in a preassembly exploded view and assembled view, respectively.

The grid support system 2200 is first installed using a combination of longitudinal and lateral grid support members 2202, 2204 in the manner described herein and shown in FIG. 33. For this exemplary method, it will be assumed without limitation that the ceiling panels and the grid openings 2208 are rectangular in shape. The same installation methodology may be used if the ceiling panels were square.

The present method begins with first installing a row of ceiling panels 2300 along the longitudinal direction between pairs of lateral grid support members 2204. For a suspended ceiling system, the grid support members are first hung from an overhead building structure. Alternatively, in some embodiments, the grid support members may be surface mounted directly to the building structure, or alternatively the surface of the building structure itself may be used for direct attachment of the ceiling panels 2300 if the surface is sufficiently flat. The present method, however, will be described for convenience without limitation to a suspended-type ceiling system. The grid support members 2202, 2204 are installed in an arrangement similar to FIG. 33 with grid openings 2208 formed to receive ceiling panels 2300 therein.

Referring now to FIGS. 39-42, the method continues by now mounting the ceiling panels. In step (1), a first ceiling panel 2300c is centered below a first grid opening 2208. The longitudinal and lateral mounting flanges 2343 of panel 2300c (which includes upper shiplap feature 2340) are positioned beneath and then attached along two peripheral sides 2306 to bottom flanges 2210 of intersecting longitudinal and lateral grid support members 2202, 2204 (see also FIG. 35). Fasteners 2380 may be used in one embodiment to secure the ceiling panel 2300c to the grid support members. The mounting flange 2383 of ceiling panel 2300c covers approximately one-half the bottom grid surface 2206 (i.e. grid face) of the grid support member. The other half of the grid surface 2206 remains exposed at this point in the ceiling installation process. The upper end surface 2342 of the ceiling panel 2300c is aligned approximately with the vertical web 2212 of the grid support member. This ceiling panel will now be used as the "base or foundation" panel for then sequentially installing the remaining ceiling panels, preferably in a predetermined order or sequence.

A second ceiling panel 2300b is next installed in step (2) and connected to ceiling panel 2300c (see FIG. 10). The lateral tongue 2360 on panel 2300b is fully inserted into the lateral groove 2370 presented beneath the mounting flange 2343 of ceiling panel 2300c already attached to the support grid 2209. This supports the tongued lateral side of ceiling panel 2300b, which itself is not attached directly to the grid support member 2202 or 2204 (see, e.g. FIGS. 39-40). This assembly step also engages the lower slap feature 2350 formed above tongue 2360 with the upper shiplap feature 2340 of ceiling panel 2300c.

It bears noting that the foregoing single step (2) achieves several objectives. First, referring to FIG. 36 (showing joint similar in configuration to present joint formed between ceiling panels 2300b and 2300c), the top surface 2302 of ceiling panel 2300b covers the remaining previously exposed one-half of the grid support member bottom surface 2206 to which mounting flange 2343 of ceiling panel 2300c was attached in step (1). The lower shiplap feature 2350 of ceiling panel 2300b covers the exposed head of fastener 2380. Preferably, the lower shiplap feature 2350 should have a length or lateral projection sufficient to cover the fastener. Furthermore, a relatively narrow and tight seam or joint 2390 is formed between the bottom surfaces 2304 of ceiling panels 2300b, 2300c which lie in the same horizontal plane. This is intended to eliminate the need for applying joint compound or spackling to hide the seam which preferably is tight enough to be concealed by application of the final finish coating or paint. If spackling is require, a single thin application would be sufficient without the need for taping the joint and successive iterations of spackling and sanding typically encountered with wide drywall joints. In some embodiments, slightly beveled or chamfered corner may be provide between the bottom surface 2304 and peripheral sides 2360 along the entire perimeter of each ceiling panel to conceal any slight irregularities in the edges between adjoining ceiling panels.

Additional ceiling panels may then continue to be installed in the same longitudinal row (direction) using the same process described and shown in steps (1) and (2). Following completion of the longitudinal row of ceiling panels, a second longitudinal row of laterally adjacent ceiling panels is next illustrated in the present installation process. It will be appreciated however that a full longitudinal row of ceiling panels need not be installed until adjacent longitudinal row ceiling panels can be installed. Alternatively, lateral rows of ceiling panels may be installed first. Furthermore, various select sections of ceiling panels may be installed by mounting panels in the both the longitudinal and lateral directions, as illustrated below.

Referring now to FIGS. 39-42, ceiling panels located laterally adjacent to already installed ceiling panels 2300b and 2300c will be installed next. A third ceiling panel 2300e is installed in step (3) which is connected to previously-mounted ceiling panel 2300c. The longitudinal tongue 2360 on panel 2300e is fully inserted into the longitudinal groove 2370 presented beneath the longitudinal mounting flange 2343 of ceiling panel 2300c already attached to the support grid 2209. The longitudinal and lateral mounting flanges 2343 of panel 2300e are positioned beneath and then attached along two peripheral sides 2306 to bottom flanges 2210 of intersecting longitudinal and lateral grid support members 2202, 2204 (see also FIG. 3). Ceiling panel 2300e is now fully perimeter mounted and supported by both the support grid 2209 and ceiling panel 2300b. The longitudinal and lateral mounting flanges 2343 of panel 2300e are positioned beneath and then attached along two peripheral sides 2306 to bottom flanges 2210 of intersecting longitudinal and lateral grid support members 2202, 2204 (see also FIG. 3). Panel 2300e is now fully perimeter mounted and supported.

A fourth ceiling panel 2300d may next be installed in step (4) by connecting the panel to both previously-mounted ceiling panels 2300b and 2300e. The longitudinal and lateral tongues 2360 of panel 2300d are inserted into the longitudinal and lateral grooves 2370 of ceiling panels 2300b and 2300e, respectively. The longitudinal and lateral mounting flanges 2343 of panel 2300d are positioned beneath and then attached along two peripheral sides 2306 to bottom flanges 2210 of intersecting longitudinal and lateral grid support members 2202, 2204 (see also FIG. 35). Panel 2300d is now fully perimeter mounted and supported. The process may be continued by mounting additional ceiling panels either longitudinally or laterally adjacent to the installed panel.

FIG. 43 shows the four installed ceiling panels 2300b, 2300c, 2300d, and 2300e. As illustrated by panel 2300d, a portion of the mounting flanges 2383 of four panels contact the four grid support members 2202, 2204 defining each grid opening of the ceiling support grid 2209. Viewed another way, panel 2300d is completely framed by the four mounting flanges.

It will be appreciated that ceiling panels preferably are installed in an order or sequence in which there is always a previously-mounted ceiling panel having an exposed mounting flange 2343 available. This is because the mounting flanges cannot be fastened to the support grid 2209 if there already is an installed panel covering the grid face due to the shiplap edge detail. Ceiling panels may be cut or otherwise factory formed to allow installation along the perimeter of the ceiling system 2100 adjacent the vertical walls of the building space where the normal installation method and sequence using the hybrid edge details cannot be fully used.

According to further aspects of the invention, a multi-layered final facing system may be provided for ceiling panels 2300 which creates the exposed bottom surface of the ceiling system visible to room occupants. The facing system is intended and configured to preserve or enhance the acoustical properties (e.g. NRC, CAC, etc.) of the ceiling panel substrate.

Figure 44:
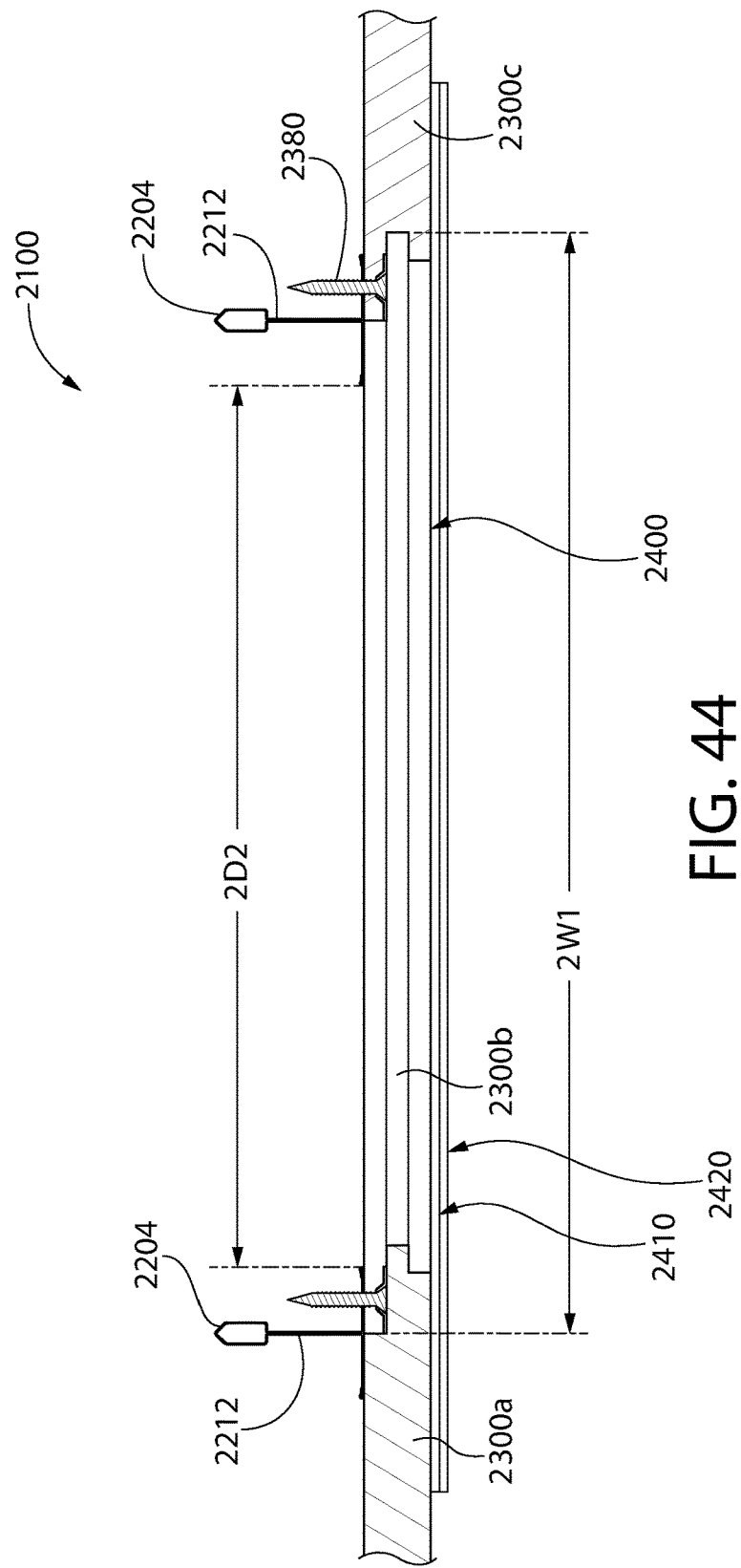
FIG. 44 is a side elevation view of a ceiling panel with hybrid edge detail according to the present disclosure having a field applied final facing system.

Referring to FIG. 44, the facing system initially includes an appropriate treatment applied to the bottom surface 304 of the ceiling panel substrate to prepare the surface for placement and proper adherence or bonding of the final scrim layer or facing 2420 to the panel. In some embodiments, the surface treatment layer 2400 applied to the ceiling panel substrate may include coatings or facing with filled, unfilled, and/or painted nonwoven scrim. Examples of suitable surface treatment materials used may include, for example without limitation, non-woven fiberglass or polymeric scrim possessing sufficient inherent repellency or filled, treated or coated scrim for repellency, typically in the thickness range of about and including but not limited to 0.010 to 0.125 inches. Highly open coatings with a low air flow resistance (<100 mks Rayls) may be used to enhance sound absorption. The surface treatment layer 2400 may be applied in the factory or the field in various implementations. The surface treatment may be beneficial for use in situations when the open nature of the acoustic substrate (panel) would readily absorb the adhesive applied in field applications. The surface treatment layer 2400 preferably provides sufficient hold out for the adhesive (i.e. anti-penetration into the substrate) while allowing for adhesion of the facing and acoustical performance In some embodiments, the joints or seams 2390 formed between adjoining interlocked ceiling panels such as shown in FIG. 44 may optionally be taped prior to application of the final facing if desired; however, this is not necessary in all situations when using the final facing system described herein.

In one exemplary embodiment, the final facing layer 2420 is preferably but not necessarily adhered to the hung treated ceiling panel substrate in the field such as by use of a suitable adhesive. This allows concealment of the field-formed joints between 2390 between ceiling panels 2300 after they are hung from the support grid 2209. The adhesive layer 2410 is applied directly to the surface treatment layer 2400 using a suitable thickness of adhesive to properly bond the final facing layer 2420 to the treated substrate. In various embodiments, permanent or releasable type adhesives may be used and applied by any suitable means (e.g. spraying, rolling, etc.). Suitable adhesives that may be used in field applications for adhesive layer 2410 include for example, without limitation, a shear thinning adhesive with high wet tack such as used in wall paper (e.g. Roman Pro-880 clear strippable wallcovering adhesive from Roman Decorating Products or others). For pre-applied facing (factory applied finished face), an activated adhesive such as a hot melt film may be used. Other suitable adhesives may include solvent or water activated adhesives, pressure sensitive adhesive tapes, or applied polymer emulsion adhesives.

The final facing 2420 provides the aesthetic look and the appropriate acoustical characteristics for the specified application. In some embodiments, suitable materials that could be used for facing 2420 are nonwoven (glass filled or pre-painted), fabric, or perforated materials. Other suitable facing materials include fiberglass or polymeric non-wovens (filled or unfilled/finished or unfinished), fabrics, or perforated films. Exemplary non-limiting thicknesses that may be used for the final facing material are thicknesses in a range from about and including 0.010 to 0.150 inches. The limiting factors on types and thicknesses of facing materials used include economics, acoustics, and final visual appearance.

Depending on the type of facing product used, facing 2420 may be embodied in sheets or rolls of material for application to the ceiling panels in the field. In some non-limiting examples, rolls of facing 4 feet in width may be provided.

The facing 2420 may have a rectilinear shape in some embodiments. In certain non-limiting exemplary embodiments, the final facing 2420 may have a width larger than at least one of the width 2W1 and length 2L1 of the ceiling panels 2300. The facing 2420 may also have a length (the dimension perpendicular to the width of facing) larger than at least one of the width 2W1 and length 2L1 of the ceiling panels 2300. In some embodiments, the length of the facing 2420 is larger than both the width 2W1 and length 2L1 of the ceiling panels 2300.

Figure 15:
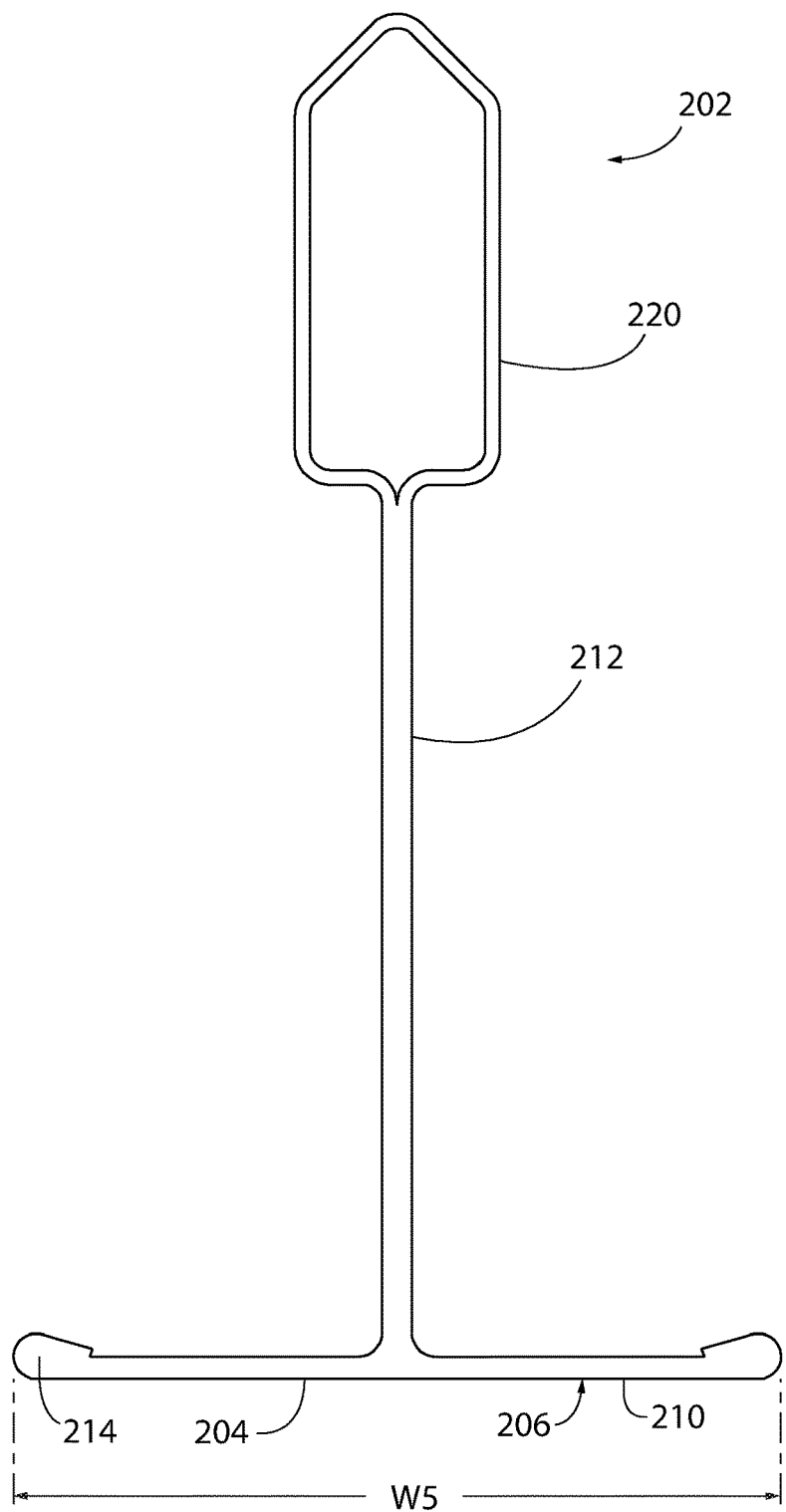
FIG. 15 is an end elevation view of the grid support member.

An exemplary method for facing a ceiling system in the field (i.e. jobsite) to create a monolithic appearance will now be described with reference to FIGS. 13-15. These figures show sequential bottom plan views of the ceiling system 2100 during application of the final facing 2420. The grid support system 2200 and ceiling panels 2300 are first installed using the mounting flanges 2342, and tongue-andgroove and shiplap edge details as already described above and shown in FIGS. 42 and 43.

Figure 45:
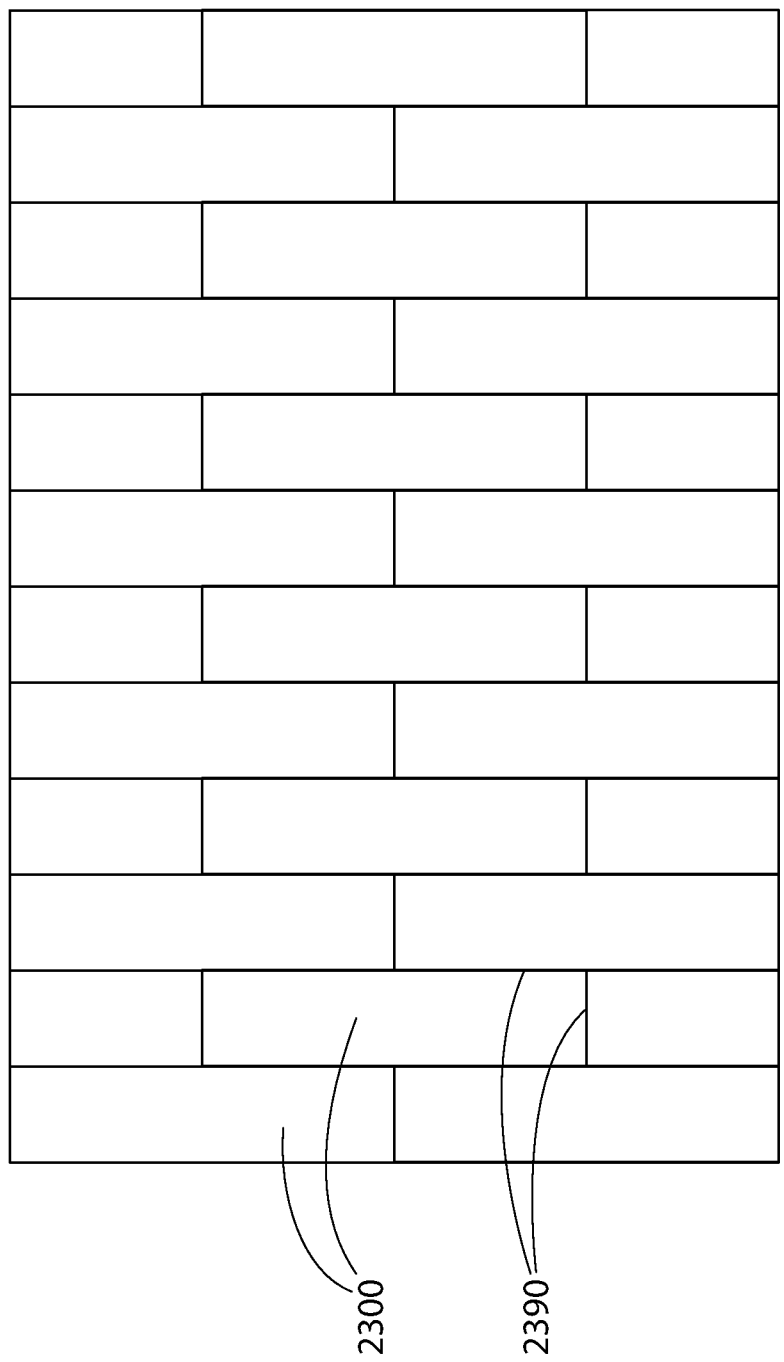

In this exemplary method, it will be assumed for convenience without limitation that the array of ceiling panels 2300 are arranged in a running bond pattern with offset staggered lateral joints 2390 between adjacent longitudinal rows of ceiling panels as shown in FIG. 45. The ceiling panels 2300 may each measure 2 feet wide by 8 feet long in this non-limiting example with the support grid 2209 having grid openings 2208 sized commensurately. As seen, a plurality of longitudinal joints is formed between laterally adjoining peripheral edges of the ceiling panels 2300. Similarly, a plurality of lateral joints is formed between longitudinally adjoining peripheral edges of the ceiling panels. At this juncture in the facing process, the longitudinal and lateral joints 2309 between ceiling panels are still visible.

The facing process begins by first applying a surface treatment layer 2400 to the bottom surfaces 2304 of the ceiling panels before bonding the final facing 2420 thereto. This prepares the surfaces for adhesive mounting of the facing. In some embodiments, depending on the ceiling panel material used, the surface treatment may not be needed to properly bond the facing to the ceiling panel in which case the treatment may be omitted.

An adhesive layer 2410 is next applied to the treated bottom surface 2304 of the ceiling panels 2300. To ensure maximum adhesive strength for bonding the facing 2420 to the ceiling panels, the adhesive and facing may be applied to the ceiling panels working a section or region at a time to prevent excessive drying out of the adhesive.

The final facing 2420 which will be visible to room occupants is next applied. The facing 2420 may be provided in a variety of sizes and formats (e.g. rolls, sheets, etc.). Preferably but not necessarily, the facing 2420 has a continuous uninterrupted length in some embodiments substantially greater than the length 2L1 or width 2W1 of any individual ceiling panel. This allows the facing 2420 to cover the bottom exposed surface area of a plurality of ceiling panels 2300 (see, e.g. FIGS. 46 and 47). In this non-limiting example, the facing 2420 may be 4 feet wide and may be provided in roll form with the length of the facing being substantially greater than the width. Any length or width of final facing may be provided in roll form with the length and width being determined by the design and jobsite requirements, and handling considerations. Non-roll form sheets final facing of any suitable length and width may alternatively be used.

The facing 2420 will be run in a lateral direction in this example (from left to right in FIG. 45); however, in other embodiments the facing be run in the longitudinal direction (from top to bottom in FIG. 13). In other embodiments, the facing 2420 may be run in diagonal directions at an oblique angle to the longitudinal and lateral directions.

The desired length of facing 2420 is first measured and then cut from the roll such as with a utility knife.

Figure 46:
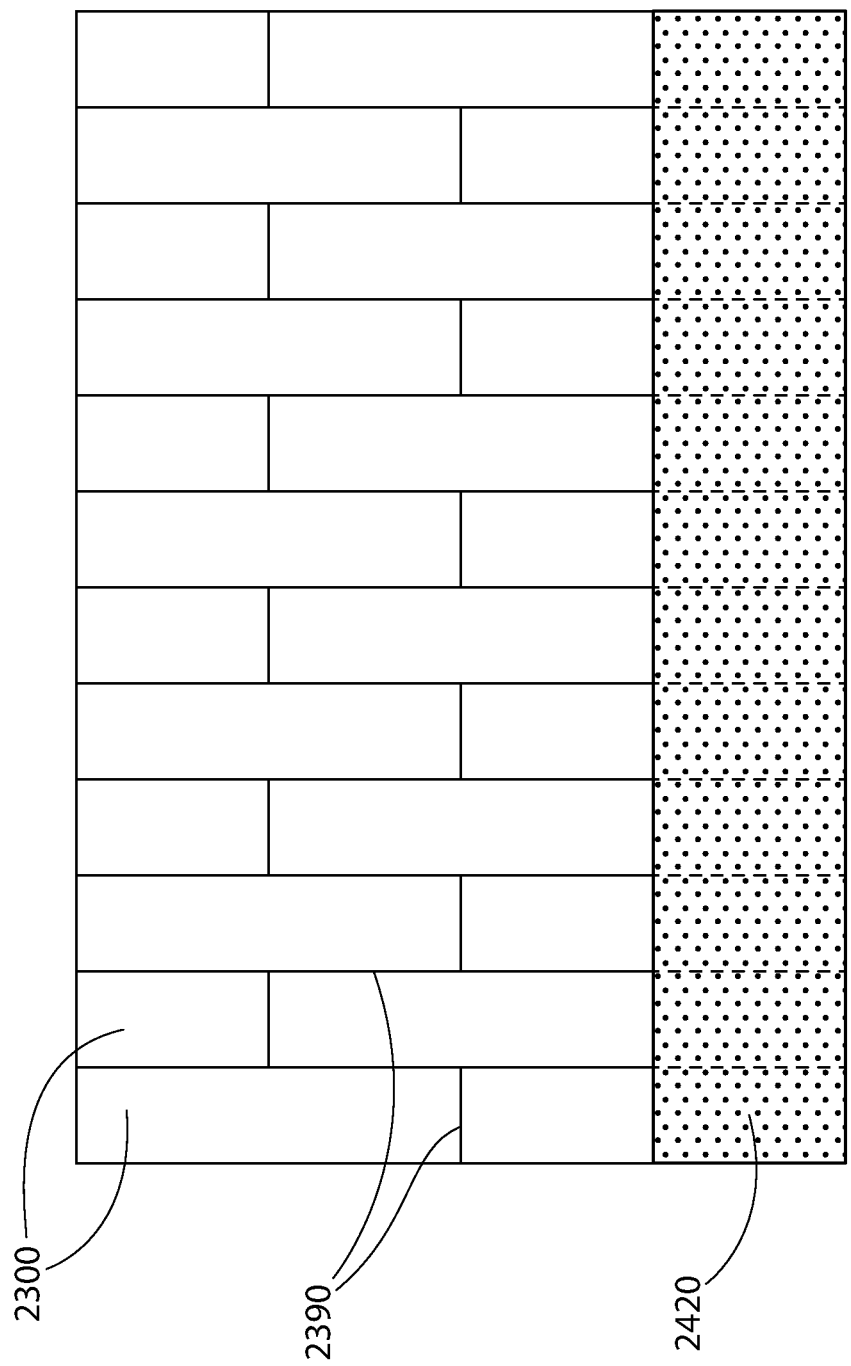

With the adhesive layer already applied to a section of the hung ceiling panels (comprising part or all of the bottom surfaces 2304 of multiple panels), a first lateral row of final facing 2420 is adhesively bonded to the treated or untreated bottom surfaces 2304 of ceiling panels as shown in FIG. 46. The facing 2420 spans across and conceals multiple portions of the longitudinal joints 2390 (represented by dashed lines beneath the facing). In this non-limiting example, the facing 2420 has a length equal to the combined widths 2W1 of 12 ceiling panels. The facing in this non-limiting example also falls directly on or near multiple lateral offset joints as seen along the top peripheral edge of the facing thereby partially or completely concealing those joints. In other embodiments contemplated, facing 2420 with a larger width than 4 feet used in this non-limiting example (e.g. 5 or 6 feet) may be used which would cover additional lateral joints completely.

Second and additional lateral rows of facing 2420 are applied to the remaining ceiling panels 2300 in a similar manner until the entire exposed bottom surfaces 2304 of the ceiling panels are covered, as shown FIG. 47. Preferably, the seams formed between adjoining peripheral edges of rows of facing are abutted as tightly as possible to minimize any gaps therebetween and their visibility.

The final facing 2420 results in a plurality of laterally extending seams formed between adjoining lateral rows facing. This results in a few number of facing seams than the multiple longitudinal and lateral joints 2390 between the ceiling panels 2300. Advantageously, the final facing 2420 with extremely sharp and straight peripheral edges generally allows creation of tighter and narrower seams between adjoining sheets of facing (somewhat analogous to seams between adjoining sheets or runs of wallpaper). These narrow seams are less visually noticeable than joints 2390 between adjoining ceiling panels 2300, thereby creating a monolithic ceiling appearance. If the facing 2420 is a paintable type, the finish coat of paint may entirely fill and conceals any seams between the rows or sheets of facing.

It will be appreciated that the joints 2390 between adjoining ceiling panels 2300 are covered by a single uninterrupted length of facing 2420 which bridges the joints, rather than by applying joint compound tape or a similar material thereby avoiding the use of joint compound altogether for purposes of concealing the joints. Accordingly, the faced ceiling system 2100 with monolithic ceiling appearance described herein advantageously may be installed without use of any joint or spackling compound.

Although ceiling panels 2300 are disclosed herein in one non-limiting embodiment as having a hybrid peripheral edge detail, it will be appreciated that other types of edge details and combinations of different type edge details may be used including edge details such as without limitation butt-joint, shiplap, tongue-and-groove, etc. The present invention is therefore not limited to panels having hybrid edge details alone.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A factory-fabricated ceiling panel comprising:
a panel body comprising a top surface, a bottom surface, a first panel edge extending continuously in a vertical direction between the top and bottom surfaces, and a second panel edge extending continuously between the top and bottom surfaces, the first panel edge being opposite the second panel edge; and
a facing sheet coupled to the panel body by a factory-applied adhesive, the facing sheet being continuous and comprising a first flap having a portion that protrudes beyond the first panel edge and a second flap having a portion adjacent the second panel edge and overlying the bottom surface that is not adhered to the panel body.

2. The ceiling panel of claim 1, wherein the panel body comprises sound-absorbing material selected from the group consisting of mineral fiber board, fiberglass, jute fiber, wood, and composites.

3. The ceiling panel of claim 1, wherein the facing sheet comprises laminated non-woven glass fibers.

4. The ceiling panel of claim 1, wherein the second flap protrudes beyond the second panel edge.

5. The ceiling panel of claim 4, wherein the first flap further comprises a portion overlying the bottom surface and adjacent the first panel edge that is not adhered to the panel body.

6. The ceiling panel of claim 1, wherein the panel body comprises a third panel edge extending between the top and bottom surfaces, and a fourth panel edge extending between the top and bottom surfaces, the third panel edge being opposite the fourth panel edge, the third and fourth panel edges intersecting the first and second panel edges, wherein the facing sheet comprising a third flap having a portion that protrudes beyond the third panel edge.

7. The ceiling panel of claim 6, wherein the facing sheet comprises a fourth flap having a portion that protrudes beyond the fourth panel edge.

8. A factory-fabricated ceiling panel comprising:
a panel body comprising a top surface, a bottom surface, a first panel edge extending continuously in a vertical direction between the top and bottom surfaces of the panel body, the bottom surface of the panel body having a first surface area; and
a facing sheet coupled to the panel body by a factory-applied adhesive, the facing sheet comprising a top surface, a bottom surface, and a first sheet edge extending between the top and bottom surfaces of the facing sheet, the bottom surface of the facing sheet having a second surface area;
the factory-applied adhesive located on a region of the bottom surface of the panel body having a third surface area, whereby the third surface area is less than the first surface area.

9. The ceiling panel of claim 8, wherein the region is inset from the first panel edge of the panel body.

10. The ceiling panel of claim 8, wherein the panel body comprises sound-absorbing material selected from the group consisting of mineral fiber board, fiberglass, jute fiber, wood, and composites.

11. The ceiling panel of claim 8, wherein the facing sheet comprises laminated non-woven glass fibers.

12. The ceiling panel of claim 8, wherein the panel body further comprises a second panel edge extending between the top and bottom surfaces, the region being inset from the second panel edge.

13. The ceiling panel of claim 12, wherein the second panel edge is opposite the first panel edge.

14. A factory-fabricated ceiling panel comprising:
a panel body comprising sound-absorbing material selected from the group consisting of mineral fiber board, fiberglass, jute fiber, wood, and composites, the panel body having a top surface opposite a bottom surface and a plurality of panel edges extending between the top and bottom surfaces of the panel body;
a facing sheet comprising laminated non-woven glass fibers, the facing sheet having a top surface opposite a bottom surface, and a plurality of sheet edges extending between the top and bottom surfaces of the facing sheet; and
the facing sheet coupled to the panel body such that the facing sheet protrudes beyond at least a first one of the panel edges, the facing sheet including a portion that is:
(i) adjacent the first one of the panel edges,
(ii) overlying the bottom surface of the panel body, and
(iii) not adhered to the panel body.

15. The ceiling panel of claim 14, wherein the sound-absorbing material is mineral fiber board.

16. The ceiling panel of claim 14, wherein the facing sheet is coupled to the panel body so that the facing sheet protrudes beyond the first one of the panel edges and a second one of the panel edges, the first and second ones of the panel edges being adjacent to one another.

17. The ceiling panel of claim 16, wherein the facing sheet is coupled to the panel body so that the facing sheet further protrudes beyond a third one of the panel edges, the first and third ones of the panel edges being opposite one another.

* * * * *